(12) United States Patent
Yao et al.

(10) Patent No.: US 10,097,080 B2
(45) Date of Patent: Oct. 9, 2018

(54) SYSTEM AND METHOD PROVIDING OVER CURRENT PROTECTION BASED ON DUTY CYCLE INFORMATION FOR POWER CONVERTER

(71) Applicant: On-Bright Electronics (Shanghai) Co., Ltd., Shanghai (CN)

(72) Inventors: Chao Yao, Shanghai (CN); Yunchao Zhang, Shanghai (CN); Yuan Lin, Shanghai (CN); Zhiqiang Sun, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 373 days.

(21) Appl. No.: 14/638,191

(22) Filed: Mar. 4, 2015

(65) Prior Publication Data

US 2015/0180328 A1 Jun. 25, 2015

Related U.S. Application Data

(60) Division of application No. 13/749,516, filed on Jan. 24, 2013, now Pat. No. 9,553,501, which is a
(Continued)

(30) Foreign Application Priority Data

Dec. 8, 2010 (CN) .......................... 2010 1 0587658
Jan. 15, 2013 (CN) .......................... 2013 1 0015152

(51) Int. Cl.
*H02M 1/32* (2007.01)
*H02H 9/02* (2006.01)
(Continued)

(52) U.S. Cl.
CPC .............. *H02M 1/32* (2013.01); *H02H 9/025* (2013.01); *H02M 1/08* (2013.01); *H02M 3/156* (2013.01); *H02M 3/33507* (2013.01)

(58) Field of Classification Search
CPC ......... H02M 3/33507; H02M 3/33523; H02M 3/335; H02M 3/33515; H02M 3/156;
(Continued)

(56) References Cited

U.S. PATENT DOCUMENTS 3,018,966 A   5/1955  Zelina
3,913,002 A   10/1975 Steigerwald et al.
(Continued)

FOREIGN PATENT DOCUMENTS

CN   2552047 Y    5/2003
CN   1430314 A    7/2003
(Continued)

OTHER PUBLICATIONS

United Stated Patent and Trademark, Notice of Allowance dated Mar. 16, 2016, in U.S. Appl. No. 13/749,516.
(Continued)

*Primary Examiner* — Jue Zhang
*Assistant Examiner* — Kevin H Sprenger
(74) *Attorney, Agent, or Firm* — Faegre Baker Daniels LLP

(57) ABSTRACT

System and method for protecting a power converter. An example system controller for protecting a power converter includes a signal generator, a comparator, and a modulation and drive component. The signal generator is configured to generate a threshold signal. The comparator is configured to receive the threshold signal and a current sensing signal and generate a comparison signal based on at least information associated with the threshold signal and the current sensing signal, the current sensing signal indicating a magnitude of
(Continued)

a primary current flowing through a primary winding of a power converter. The modulation and drive component is coupled to the signal generator.

24 Claims, 32 Drawing Sheets

Related U.S. Application Data continuation-in-part of application No. 13/005,427, filed on Jan. 12, 2011, now Pat. No. 8,559,152.

(51) Int. Cl.
  *H02M 3/335* (2006.01)
  *H02M 1/08* (2006.01)
  *H02M 3/156* (2006.01)

(58) Field of Classification Search
  CPC ............ H02M 3/1563; H02M 3/3385; H02M 3/33561; H02M 7/00; H02M 7/02; H02M 7/42; H02M 7/212; H02M 1/08; H02M 1/4258; H02M 2001/0029; H02M 2001/0038; H02M 2001/0032; H02M 2001/0045; G05F 1/462; G05F 1/465; G05F 1/613; G05F 1/614; G05F 1/575; G05F 1/56; G05F 1/565; G05F 1/573; G05F 1/569; G05F 1/5735; G05F 1/567; G05F 1/445; Y02B 70/126; Y02B 70/16
  USPC ......... 363/21.12–21.13, 21.15, 21.17–21.18; 323/273–279, 281
  See application file for complete search history.

(56) References Cited

U.S. PATENT DOCUMENTS

| | | | |
|---|---|---|---|
| 3,967,173 A | 6/1976 | Stich | |
| 4,356,542 A | 10/1982 | Bruckner et al. | |
| 4,952,853 A | 8/1990 | Archer | |
| 4,975,820 A | 12/1990 | Szepesi | |
| 5,416,689 A | 5/1995 | Silverstein et al. | |
| 5,442,538 A | 8/1995 | Ikeda et al. | |
| 5,550,702 A | 8/1996 | Schmidt et al. | |
| 5,574,392 A | 11/1996 | Jordan | |
| 5,578,908 A | 11/1996 | Persson | |
| 5,796,595 A | 8/1998 | Cross | |
| 5,796,598 A | 8/1998 | Nowak et al. | |
| 5,867,379 A | 2/1999 | Maksimovic et al. | |
| 5,917,714 A | 6/1999 | Ogawa | |
| 6,084,783 A | 7/2000 | Rascon Martinez et al. | |
| 6,292,376 B1 | 9/2001 | Kato | |
| 6,469,917 B1 | 10/2002 | Ben-Yaakov | |
| 6,515,876 B2 | 2/2003 | Koike et al. | |
| 6,611,439 B1 | 8/2003 | Yang et al. | |
| 6,714,425 B2 | 3/2004 | Yamada et al. | |
| 6,737,845 B2 | 5/2004 | Hwang | |
| 6,839,247 B1 | 1/2005 | Yang et al. | |
| 6,842,350 B2 | 1/2005 | Yamada et al. | |
| 6,903,536 B2 | 6/2005 | Yang | |
| 6,914,789 B2 | 7/2005 | Kinoshita et al. | |
| 6,947,298 B2 | 9/2005 | Uchida | |
| 6,954,367 B2 | 10/2005 | Yang et al. | |
| 7,027,313 B2 | 4/2006 | Amei | |
| 7,061,225 B2 | 6/2006 | Yang et al. | |
| 7,099,164 B2 | 8/2006 | Zhu et al. | |
| 7,149,098 B1 | 12/2006 | Chen | |
| 7,342,383 B1 | 3/2008 | Song et al. | |
| 7,362,592 B2 | 4/2008 | Yang et al. | |
| 7,362,593 B2 | 4/2008 | Yang et al. | |
| 7,391,630 B2 | 6/2008 | Acatrinei | |
| 7,394,634 B2 | 7/2008 | Fang et al. | |
| 7,679,938 B2 | 3/2010 | Ye et al. | |
| 7,684,220 B2 | 3/2010 | Fang et al. | |
| 7,719,249 B2 | 5/2010 | Matyas et al. | |
| 7,738,227 B2 | 6/2010 | Fang et al. | |
| 7,746,615 B2 | 6/2010 | Zhu et al. | |
| 7,759,891 B2 | 7/2010 | Serizawa et al. | |
| 7,778,049 B2 | 8/2010 | Morota | |
| 7,791,903 B2 | 9/2010 | Zhang et al. | |
| 8,004,112 B2 | 8/2011 | Koga et al. | |
| 8,018,743 B2 | 9/2011 | Wang et al. | |
| 8,018,745 B2 | 9/2011 | Fang et al. | |
| 8,098,502 B2 | 1/2012 | Mao et al. | |
| 8,102,676 B2 | 1/2012 | Huyhn et al. | |
| 8,416,596 B2 | 4/2013 | Huang | |
| 8,482,946 B2 | 7/2013 | Fang et al. | |
| 8,488,342 B2 | 7/2013 | Zhang et al. | |
| 8,508,142 B2 | 8/2013 | Lin et al. | |
| 8,519,691 B2 | 8/2013 | McCloy-Stevens | |
| 8,559,152 B2 | 10/2013 | Cao et al. | |
| 8,680,884 B2 | 3/2014 | Chobot | |
| 8,824,167 B2 | 9/2014 | Hughes et al. | |
| 8,824,173 B2 | 9/2014 | Fang et al. | |
| 8,917,527 B2 | 12/2014 | Fang et al. | |
| 9,088,218 B2 | 7/2015 | Zhang et al. | |
| 9,136,703 B2 | 9/2015 | Cummings | |
| 9,362,737 B2 | 6/2016 | Yang et al. | |
| 9,401,648 B2 | 7/2016 | Li | |
| 9,548,652 B2 | 1/2017 | Cao et al. | |
| 9,553,501 B2 | 1/2017 | Yao et al. | |
| 9,564,811 B2 | 2/2017 | Zhai et al. | |
| 9,570,986 B2 | 2/2017 | Zhai et al. | |
| 9,577,536 B2 | 2/2017 | Yang et al. | |
| 9,584,005 B2 | 2/2017 | Fang | |
| 9,614,445 B2 | 4/2017 | Zhu et al. | |
| 9,647,448 B2 | 5/2017 | Fang et al. | |
| 2002/0131279 A1 | 9/2002 | Tang | |
| 2003/0099119 A1 | 5/2003 | Yamada et al. | |
| 2003/0156433 A1 | 8/2003 | Gong et al. | |
| 2003/0174520 A1 | 9/2003 | Bimbaud | |
| 2004/0201369 A1 | 10/2004 | Perrier et al. | |
| 2004/0218405 A1 | 11/2004 | Yamada et al. | |
| 2005/0036342 A1 | 2/2005 | Uchida | |
| 2005/0099164 A1 | 5/2005 | Yang | |
| 2006/0055433 A1 | 3/2006 | Yang et al. | |
| 2006/0291258 A1 | 12/2006 | Zhu et al. | |
| 2008/0198638 A1 | 8/2008 | Reinberger et al. | |
| 2008/0257397 A1 | 10/2008 | Glaser et al. | |
| 2008/0298099 A1 | 12/2008 | Huang et al. | |
| 2008/0309380 A1 | 12/2008 | Yang et al. | |
| 2008/0316781 A1 | 12/2008 | Liu | |
| 2009/0021233 A1 | 1/2009 | Hsu | |
| 2009/0128113 A1 | 5/2009 | Ryoo | |
| 2009/0219070 A1 | 9/2009 | Zhang et al. | |
| 2010/0123447 A1 | 5/2010 | Vecera et al. | |
| 2010/0253250 A1 | 10/2010 | Marvelly et al. | |
| 2010/0328831 A1 | 12/2010 | Zhang et al. | |
| 2011/0101953 A1 | 5/2011 | Cheng et al. | |
| 2011/0110126 A1 | 5/2011 | Morrish | |
| 2011/0169418 A1 | 7/2011 | Yang et al. | |
| 2012/0008352 A1 | 1/2012 | Huang et al. | |
| 2012/0075891 A1 | 3/2012 | Zhang et al. | |
| 2012/0119650 A1 | 5/2012 | Lee | |
| 2012/0147630 A1 | 6/2012 | Cao et al. | |
| 2012/0194227 A1 | 8/2012 | Lin et al. | |
| 2012/0224397 A1 | 9/2012 | Yeh | |
| 2012/0281438 A1 | 11/2012 | Fang et al. | |
| 2013/0003421 A1 | 1/2013 | Fang | |
| 2013/0100715 A1 | 4/2013 | Lin et al. | |
| 2013/0135775 A1 | 5/2013 | Yao et al. | |
| 2013/0181635 A1 | 7/2013 | Ling | |
| 2013/0223107 A1 | 8/2013 | Zhang et al. | |
| 2013/0258723 A1 | 10/2013 | Fang et al. | |
| 2013/0294121 A1 | 11/2013 | Fang et al. | |
| 2013/0336029 A1 | 12/2013 | Cao et al. | |
| 2014/0016366 A1 | 1/2014 | Su | |
| 2014/0029315 A1 | 1/2014 | Zhang et al. | |
| 2014/0085941 A1 | 3/2014 | Li et al. | |
| 2015/0023069 A1 | 1/2015 | Zhu et al. | |
| 2015/0055382 A1 | 2/2015 | Yang et al. | |
| 2015/0115919 A1 | 4/2015 | Yang et al. | |
| 2015/0301542 A1 | 10/2015 | Yang et al. | |

(56) References Cited

U.S. PATENT DOCUMENTS

| | | | |
|---|---|---|---|
| 2015/0303787 A1 | 10/2015 | Zhai et al. |
| 2015/0303898 A1 | 10/2015 | Zhai et al. |
| 2015/0340952 A1 | 11/2015 | Manohar et al. |
| 2015/0340957 A1 | 11/2015 | Fang et al. |
| 2015/0357912 A1 | 12/2015 | Perreault et al. |
| 2016/0226239 A1 | 8/2016 | Yang et al. |
| 2016/0336852 A1 | 11/2016 | Fang et al. |
| 2016/0336864 A1 | 11/2016 | Fang et al. |
| 2016/0336868 A1 | 11/2016 | Fang et al. |
| 2017/0141688 A1 | 5/2017 | Zhai et al. |
| 2017/0163026 A1 | 6/2017 | Yang et al. |
| 2017/0179808 A1 | 6/2017 | Zhai et al. |
| 2017/0187294 A1 | 6/2017 | Fang et al. |
| 2017/0194869 A1 | 7/2017 | Yao et al. |
| 2017/0214327 A1 | 7/2017 | Zhu et al. |
| 2017/0214328 A1 | 7/2017 | Zhu et al. |

FOREIGN PATENT DOCUMENTS

| | | |
|---|---|---|
| CN | 2567850 Y | 8/2003 |
| CN | 1448005 A | 10/2003 |
| CN | 1459903 A | 12/2003 |
| CN | 1497827 A | 5/2004 |
| CN | 1815838 A | 8/2006 |
| CN | 1917322 A | 2/2007 |
| CN | 101079576 A | 11/2007 |
| CN | 101295872 A | 10/2008 |
| CN | 101340149 A | 1/2009 |
| CN | 101425750 A | 5/2009 |
| CN | 101499713 A | 8/2009 |
| CN | 101552570 | 10/2009 |
| CN | 100559678 C | 11/2009 |
| CN | 101662223 A | 3/2010 |
| CN | 101295872 B | 4/2010 |
| CN | 201477463 U | 5/2010 |
| CN | 101924536 A | 12/2010 |
| CN | 101964647 A | 2/2011 |
| CN | 101997412 A | 3/2011 |
| CN | 102202449 | 9/2011 |
| CN | 202009514 U | 10/2011 |
| CN | 102364990 A | 2/2012 |
| CN | 102412727 A | 4/2012 |
| CN | 102487246 A | 6/2012 |
| CN | 102545567 A | 7/2012 |
| CN | 102611306 A | 7/2012 |
| CN | 102624237 A | 8/2012 |
| CN | 102625514 A | 8/2012 |
| CN | 102638169 A | 8/2012 |
| CN | 102651613 A | 8/2012 |
| CN | 102761255 A | 10/2012 |
| CN | 102790531 A | 11/2012 |
| CN | 102801300 A | 11/2012 |
| CN | 103036438 A | 4/2013 |
| CN | 103078489 | 5/2013 |
| CN | 103166198 | 6/2013 |
| CN | 103167665 A | 6/2013 |
| CN | 103178717 A | 6/2013 |
| CN | 103368400 A | 10/2013 |
| CN | 103401424 A | 11/2013 |
| CN | 103781256 | 5/2014 |
| CN | 103781257 | 5/2014 |
| CN | 103887980 A | 6/2014 |
| CN | 103916027 A | 7/2014 |
| CN | 103956905 A | 7/2014 |
| CN | 203747681 | 7/2014 |
| CN | 103986336 A | 8/2014 |
| CN | 104022648 | 9/2014 |
| CN | 104617792 A | 5/2015 |
| CN | 104853493 A | 8/2015 |
| CN | 104967328 A | 10/2015 |
| EP | 0871328 B1 | 8/2003 |
| EP | 1317052 B1 | 10/2006 |
| JP | 2003-333839 A | 11/2003 |
| JP | 2006-237519 A | 9/2006 |
| JP | 2006-237619 A | 9/2006 |
| JP | 4064296 | 3/2008 |
| JP | 2009-36750 A | 2/2009 |
| TW | 200929824 | 7/2009 |
| TW | M400069 | 3/2011 |
| TW | 201117670 | 5/2011 |
| TW | 201218860 | 5/2012 |
| TW | 201225495 | 6/2012 |
| TW | 201241591 | 10/2012 |
| TW | 201325304 | 6/2013 |
| TW | I403875 | 8/2013 |
| TW | I434500 | 4/2014 |
| TW | 201429132 | 7/2014 |
| TW | I458232 | 10/2014 |
| TW | 201541845 | 11/2015 |
| WO | WO 2012/147453 | 11/2012 |

OTHER PUBLICATIONS

United Stated Patent and Trademark, Notice of Allowance dated Mar. 21, 2016, in U.S. Appl. No. 13/900,430.
United Stated Patent and Trademark, Notice of Allowance dated Feb. 23, 2016, in U.S. Appl. No. 14/334,553.
Chinese Patent Office, Office Action dated Jan. 25, 2016, in Application No. 201410157557.6.
Taiwan Intellectual Property Office, Office Action dated May 18, 2016, in Application No. 103121063.
Taiwan Intellectual Property Office, Office Action dated May 24, 2016, in Application No. 104110694.
Taiwan Intellectual Property Office, Office Action dated May 23, 2016, in Application No. 104132444.
Taiwan Intellectual Property Office, Approval Report dated May 26, 2016, in Application No. 104125785.
United Stated Patent and Trademark, Notice of Allowance dated Jun. 24, 2016, in U.S. Appl. No. 13/749,516.
United Stated Patent and Trademark, Notice of Allowance dated Jul. 11, 2016, in U.S. Appl. No. 13/900,430.
United Stated Patent and Trademark, Notice of Allowance dated Jul. 14, 2016, in U.S. Appl. No. 14/272,323.
United Stated Patent and Trademark, Notice of Allowance dated Jul. 27, 2016, in U.S. Appl. No. 14/639,607.
United Stated Patent and Trademark, Notice of Allowance dated May 26, 2016, in U.S. Appl. No. 14/334,553.
United Stated Patent and Trademark, Notice of Allowance dated May 27, 2016, in U.S. Appl. No. 13/967,276.
United Stated Patent and Trademark, Office Action dated May 24, 2016, in U.S. Appl. No. 13/969,281.
United Stated Patent and Trademark, Office Action dated Jul. 12, 2016, in U.S. Appl. No. 14/753,079.
United States Patent and Trademark, Notice of Allowance dated Sep. 14, 2016, in U.S. Appl. No. 13/749,516.
United States Patent and Trademark, Notice of Allowance dated Sep. 28, 2016, in U.S. Appl. No. 13/900,430.
United States Patent and Trademark, Notice of Allowance dated Sep. 12, 2016, in U.S. Appl. No. 14/272,323.
United States Patent and Trademark, Notice of Allowance dated Sep. 29, 2016, in U.S. Appl. No. 14/639,607.
United States Patent and Trademark, Notice of Allowance dated Sep. 9, 2016, in U.S. Appl. No. 14/334,553.
United States Patent and Trademark, Notice of Allowance dated Sep. 26, 2016, in U.S. Appl. No. 13/967,276.
United States Patent and Trademark, Notice of Allowance dated Oct. 12, 2016, in U.S. Appl. No. 14/817,081.
United States Patent and Trademark, Notice of Allowance dated Nov. 22, 2016, in U.S. Appl. No. 13/969,281.
United States Patent and Trademark, Notice of Allowance dated Feb. 23, 2017, in U.S. Appl. No. 14/753,079.
Chinese Patent Office, Office Action dated Nov. 26, 2015, in Application No. 201410134395.4.
Chinese Patent Office, Office Action dated Dec. 4, 2015, in Application No. 201410198140.4.
United Stated Patent and Trademark, Notice of Allowance dated Nov. 13, 2015, in U.S. Appl. No. 13/749,516.

(56) References Cited

OTHER PUBLICATIONS

United Stated Patent and Trademark, Notice of Allowance dated Nov. 6, 2015, in U.S. Appl. No. 13/900,430.
United Stated Patent and Trademark, Notice of Allowance dated Jan. 20, 2016, in U.S. Appl. No. 14/334,553.
United Stated Patent and Trademark, Office Action dated Oct. 13, 2015, in U.S. Appl. No. 13/967,276.
United Stated Patent and Trademark, Office Action dated Oct. 30, 2015, in U.S. Appl. No. 13/969,281.
United Stated Patent and Trademark, Office Action dated Jan. 5, 2016, in U.S. Appl. No. 14/272,323.
Taiwan Intellectual Property Office, Office Action dated May 5, 2015, in Application No. 102131370.
United Stated Patent and Trademark, Office Action dated May 14, 2015, in U.S. Appl. No. 13/900,430.
United Stated Patent and Trademark, Office Action dated Jun. 17, 2015, in U.S. Appl. No. 13/749,516.
Chinese Patent Office, Office Action dated Aug. 1, 2014, in Application No. 201310015152.4.
Chinese Patent Office, Office Action dated Jan. 17, 2014, in Application No. 201310306106.X.
Chinese Patent Office, Office Action dated Jan. 3, 2014, in Application No. 201010587658.9.
Taiwan Intellectual Property Office, Office Action dated Mar. 13, 2014, in Application No. 100101960.
United Stated Patent and Trademark, Office Action dated Mar. 9, 2015, in U.S. Appl. No. 13/967,276.
Chinese Patent Office, Office Action dated Aug. 31, 2017, in Application No. 201510249026.4.
United States Patent and Trademark, Notice of Allowance dated Sep. 6, 2017, in U.S. Appl. No. 14/753,079.
United States Patent and Trademark, Notice of Allowance dated Sep. 6, 2017, in U.S. Appl. No. 14/974,695.
United States Patent and Trademark, Office Action dated Aug. 24, 2017, in U.S. Appl. No. 15/371,058.
United States Patent and Trademark, Office Action dated Oct. 5, 2017, in U.S. Appl. No. 15/374,896.
United States Patent and Trademark, Office Action dated Nov. 8, 2017, in U.S. Appl. No. 15/380,693.
United States Patent and Trademark, Office Action dated Oct. 23, 2017, in U.S. Appl. No. 15/400,469.
United States Patent and Trademark, Office Action dated Sep. 19, 2017, in U.S. Appl. No. 15/428,996.
Chinese Patent Office, Office Action dated Apr. 5, 2017, in Application No. 201510413940.8.
Chinese Patent Office, Office Action dated Jun. 21, 2017, in Application No. 201510788449.3.
United States Patent and Trademark, Notice of Allowance dated Jun. 1, 2017, in U.S. Appl. No. 14/753,079.
United States Patent and Trademark, Notice of Allowance dated Jun. 23, 2017, in U.S. Appl. No. 14/974,694.
United States Patent and Trademark, Office Action dated Jun. 27, 2017, in U.S. Appl. No. 15/055,261.
United States Patent and Trademark, Office Action dated Jul. 25, 2017, in U.S. Appl. No. 15/362,268.
United States Patent and Trademark, Office Action dated Jan. 24, 2018, in U.S. Appl. No. 15/428,996.
Chinese Patent Office, Office Action dated Dec. 5, 2017, in Application No. 201410157557.6.
United States Patent and Trademark, Notice of Allowance dated Dec. 22, 2017, in U.S. Appl. No. 15/055,261.
United States Patent and Trademark, Notice of Allowance dated Dec. 8, 2017, in U.S. Appl. No. 15/362,268.
United States Patent and Trademark, Notice of Allowance dated Jan. 29, 2018, in U.S. Appl. No. 15/362,268.
United States Patent and Trademark, Notice of Allowance dated Mar. 27, 2018, in U.S. Appl. No. 15/371,058.
United States Patent and Trademark, Notice of Allowance dated May 10, 2018, in U.S. Appl. No. 15/400,469.
United States Patent and Trademark, Office Action dated May 4, 2018, in U.S. Appl. No. 15/852,490.
United States Patent and Trademark, Office Action dated Jun. 15, 2018, in U.S. Appl. No. 15/374,896.
United States Patent and Trademark, Notice of Allowance dated Jun. 22, 2018, in U.S. Appl. No. 15/428,996.
United States Patent and Trademark, Office Action dated Jun. 29, 2018, in U.S. Appl. No. 15/804,712.
United States Patent and Trademark, Notice of Allowance dated Jul. 17, 2018, in U.S. Appl. No. 15/815,468.

US 10,097,080 B2

SYSTEM AND METHOD PROVIDING OVER CURRENT PROTECTION BASED ON DUTY CYCLE INFORMATION FOR POWER CONVERTER

1. CROSS-REFERENCES TO RELATED APPLICATIONS

This application is a divisional of U.S. patent application Ser. No. 13/749,516, filed Jan. 24, 2013, which claims priority to Chinese Patent Application No. 201310015152.4, filed Jan. 15, 2013, both of these applications being commonly assigned and incorporated by reference herein for all purposes. In addition, U.S. patent application Ser. No. 13/749,516 is a continuation-in-part of U.S. patent application Ser. No. 13/005,427, filed Jan. 12, 2011, now U.S. Pat. No. 8,559,152, claiming priority to Chinese Patent Application No. 201010587658.9, filed Dec. 8, 2010, all of these applications being commonly assigned and incorporated by reference herein for all purposes.

Additionally, this application is related to U.S. patent application Ser. Nos. 11/213,657, 12/125,033, 11/752,926, 12/690,808, and 13/205,417, commonly assigned, incorporated by reference herein for all purposes.

2. BACKGROUND OF THE INVENTION

The present invention is directed to integrated circuits. More particularly, the invention provides a control system and method for over-current protection and over-power protection. Merely by way of example, the invention has been applied to a power converter. But it would be recognized that the invention has a much broader range of applicability.

Power converters are widely used for consumer electronics such as portable devices. The power converters can convert electric power from one form to another form. As an example, the electric power is transformed from alternate current (AC) to direct current (DC), from DC to AC, from AC to AC, or from DC to DC. Additionally, the power converters can convert the electric power from one voltage level to another voltage level.

The power converters include linear converters and switch-mode converters. The switch-mode converters often use pulse-width-modulated (PWM) or pulse-frequency-modulated mechanisms. These mechanisms are usually implemented with a switch-mode controller including various protection components. These components can provide over-voltage protection, over-temperature protection, over-current protection (OCP), and over-power protection (OPP). These protections can often prevent the power converters and connected circuitries from suffering permanent damage.

For example, a power converter includes a switch and transformer winding that is in series with the switch. The current flowing through the switch and transformer winding may be limited by an OCP system. If the OCP system is not effective, the current can reach a level at which damage to the switch is imminent due to excessive current and voltage stress at switching or thermal run-away during operation. For example, this current level can be reached when the output short circuit or over loading occurs. Consequently, the rectifier components on the transformer secondary side are subject to permanent damage due to excessive voltage and current stress in many offline flyback converters. Hence an effective OCP system is important for a reliable switch-mode converter.

FIG. 1 is a simplified conventional switch-mode converter with over-current protection. A switch-mode converter 100 includes an OCP comparator 110, a PWM controller component 120, a gate driver 130, a switch 140, resistors 150, 152, 154, and 156, and a primary winding 160. The OCP comparator 110, the PWM controller component 120, and the gate driver 130 are parts of a chip 180 for PWM control.

For example, the PWM controller component 120 generates a PWM signal 122, which is received by the gate driver 130. In yet another example, the OCP comparator 110 receives and compares an over-current threshold signal 112 (e.g., $V_{th\_oc}$) and a current sensing signal 114 (e.g., $V_{CS}$), and sends an over-current control signal 116 to the PWM controller component 120. When the current of the primary winding is greater than a limiting level, the PWM controller component 120 turns off the switch 140 and shuts down the switch-mode power converter 100.

For switch-mode converter, a cycle-by-cycle or pulse-by-pulse control mechanism is often used for OCP. For example, the cycle-by-cycle control scheme limits the maximum current and thus the maximum power delivered by the switch-mode converter. This limitation on maximum power can protect the power converter from thermal run-away. Some conventional OCP systems use an adjustable OCP threshold value based on line input voltage, but the actual limitation on maximum current and thus maximum power is not always constant over a wide range of line input voltage. Other conventional OCP systems use additional resistors 152 and 154 that are external to the chip 180 and inserted between $V_{in}$ and the resistor 150 as shown in FIG. 1. But the resistor 152 consumes significant power, which often is undesirable for meeting stringent requirements on low standby power. For example, the resistor 152 of 2 MΩ can dissipate about 70 mW with input AC voltage of 264 volts.

As shown in FIG. 1, the current limit is expressed as follows:

$$I_{Limit} = \frac{V_{in}}{L_p} \times t_{on} = \frac{V_{th\_oc}}{R_s} \quad \text{(Equation 1)}$$

where $I_{Limit}$ represents the current limit. For example, the current limit is the current threshold for triggering over-current protection. Additionally, $V_{in}$ is a bulk voltage (e.g., associated with the line input voltage VAC) at node 190, and $V_{th\_oc}$ is the voltage level at an input terminal 112 of the OCP comparator 110. $R_s$ is the resistance of the resistor 150, and $L_p$ is the inductance of the primary winding 160. Moreover, $t_{on}$ represents on time of the switch 140 for each cycle. Accordingly, the maximum energy $\epsilon$ stored in the primary winding 160 is $$\varepsilon = \frac{1}{2} \times L_p \times I_{Limit}^2 = PT \quad \text{(Equation 2)}$$

where T represents the clock period, and P represents the maximum power. So the maximum power P can be expressed as follows:

$$P = \frac{L_p \times I_{Limit}^2}{2T} = \frac{V_{in}^2 \times t_{on}^2}{2 \times L_p \times T} \quad \text{(Equation 3)}$$

Therefore the power can be limited by controlling the current limit $I_{Limit}$. But Equation 3 does not take into account the "delay to output" that includes the propagation delay through a current sense path to the switch 140. For example, the propagation delay includes propagation delays through the OCP comparator 110, the PWM controller component 120, the gate driver 130, and the response delay of turning off of the switch 140. During the "delay to output," the switch 140 remains on, and the input current through the switch 140 keeps ramping up despite the current has already reached the threshold level of the OCP comparator 110. The extra current ramping amplitude, ΔI, due to the "delay to output" is proportional to the bulk voltage $V_{in}$ as follows:

$$\Delta I = \frac{V_{in}}{L_p} \times T_{delay} \quad \text{(Equation 4)}$$

where $T_{delay}$ represents the "delay to output."

FIG. 2 is a simplified diagram showing conventional relationship between extra current ramping amplitude and bulk voltage. As shown in FIG. 2, the actual maximum current $I_{PEAK1}$ that corresponds to higher $V_{in}$ is larger than the actual maximum current $I_{PEAK2}$ that corresponds to lower $V_{in}$. Accordingly, the actual maximum power is not constant over a wide range of bulk voltage. Hence the actual maximum power is expressed as follows:

$$P = \frac{L_p \times (I_{Limit} + \Delta I)^2}{2T} = \frac{V_{in}^2 \times (t_{on} + T_{delay})^2}{2 \times L_p \times T} \quad \text{(Equation 5)}$$

For example, $T_{delay}$ depends on internal delays, gate charges, and circuitry related to the gate driver 130. In another example, for the predetermined switch-mode converter 100, $T_{delay}$ is constant, and hence the actual maximum power depends on the bulk voltage. To compensate for variations of the actual maximum power, the threshold for over-current protection should be adjusted based on the bulk voltage.

FIG. 3 is a simplified diagram showing conventional relationship between current threshold and bulk voltage. The bulk voltage $V_{in2}$ is lower than the bulk voltage $V_{in1}$, and the current threshold $I_{th\_oc\_vin2}$ for $V_{in2}$ is larger than $I_{th\_oc\_vin1}$ for $V_{in1}$ as shown in FIG. 3. The current threshold decreases with increasing bulk voltage $V_{in}$. At the current threshold, the over-current protection is triggered. The resulting maximum current $I_{PEAK1}$ for higher $V_{in}$ is the same as the resulting maximum current $I_{PEAK2}$ for lower $V_{in}$.

For example, the current threshold has the following relationship with the bulk voltage:

$$I_{th\_oc} \approx I_{th\_oc}(V_{in1}) - \frac{V_{in} - V_{in1}}{L_p} T_{delay} \quad \text{(Equation 6)}$$

where $I_{th\_oc}$ is the current threshold, $V_{in}$ is the bulk voltage, $L_p$ is the inductance of the primary winding, and $T_{delay}$ is the "delay to output." Additionally, $I_{th\_oc}(V_{in1})$ is the current threshold that is predetermined for the bulk voltage $V_{in1}$. For example, $V_{in1}$ is the minimum bulk voltage. In another example, the current is sensed that flows through the switch and the primary winding. If the sensed current reaches $I_{th\_oc}$, the PWM controller component sends a signal to turn off the switch. After "delay to output," the switch is turned off.

In Equation 6, the second term $$\frac{V_{in} - V_{in1}}{L_p} T_{delay}$$

represents a threshold offset to compensate for the effects of "delay to output." FIG. 4 is a simplified diagram showing conventional relationship between threshold offset and bulk voltage. As shown in FIG. 4, the term $$\frac{T_{delay}}{L_p}$$

is the slope that depends on the "delay to output" and the inductance of primary winding. As shown in FIG. 4, the current threshold decreases with increasing bulk voltage.

There are at least two conventional approaches to implement the current threshold as a function of bulk voltage according to FIG. 4. In one example, the bulk voltage is sensed to generate an offset DC voltage proportional to bulk voltage in order to compensate for the effects of "delay to output" as shown in Equation 6.

In another example, the bulk voltage is sensed based on the maximum width of the PWM signal. The PWM signal is applied to the gate of a switch in series to the primary winding of a power converter. FIG. 5 is a simplified diagram showing conventional relationship between PWM signal maximum width and bulk voltage. As shown in FIG. 5, the maximum current is constant with respect to bulk voltage, and the maximum width of PWM signal varies with bulk voltage. The maximum current $I_{PEAK1}$ equals the maximum current $I_{PEAK2}$. The maximum current $I_{PEAK1}$ corresponds to a higher bulk voltage and a PWM signal 510, and the maximum current $I_{PEAK2}$ corresponds to a lower bulk voltage and a PWM signal 520. As shown in FIG. 5, the maximum width for the PWM signal 510 is narrower for higher bulk voltage, and the maximum width for the PWM signal 520 is wider for lower bulk voltage. The bulk voltage is represented by the maximum width of the PWM signal if the maximum current is constant with respect to bulk voltage. Accordingly, the maximum width of the PWM signal can be used to determine the threshold offset to compensate for the effects of "delay to output" as shown in Equation 6.

According to FIG. 5, the compensation can be realized by generating a current threshold, $I_{th\_oc}$, which is a function of the maximum width of the PWM signal. For example, the current threshold is equal to $I_{th\_oc\_1}$ for the PWM signal 510 and $I_{th\_oc\_2}$ for the PWM signal 520. In another example, the slope of $I_{th\_oc}$ with respect to the maximum width is properly chosen to compensate for the effects of "delay to output" as shown in Equation 6. The selected slope takes into account information about power converter components that are external to the chip for PWM control. The external components may include the primary winding, a current sensing resistor and a power MOSFET.

Additionally, to achieve high efficiency, a power converter usually works in CCM mode at low bulk voltage and works in DCM mode at high bulk voltage. FIG. 6 shows simplified conventional current profiles for primary winding in CCM mode and DCM mode. The current profiles describe current magnitudes as functions of time. As shown in FIG. 6(a), the current for primary winding increases from I_L to a current limit I_p1 within a pulse width at each cycle in DCM mode. For example, I_L is equal to zero. The energy delivered to the load at each cycle is $$\varepsilon = \frac{1}{2} \times L_p \times (I\_p1)^2 \qquad \text{(Equation 7)}$$

In contrast, as shown in FIG. 6(b), the current for primary winding increases from I_i2 to a current limit I_p2 within a pulse width at each cycle in CCM mode. For example, I_i2 is larger than zero. The energy delivered to the load at each cycle is $$\varepsilon = \frac{1}{2} \times L_p \times [(I\_p2)^2 - (I\_i2)^2] \qquad \text{(Equation 8)}$$

where the ratio of $$\frac{I\_i2}{I\_p2}$$

can vary with bulk voltage. For example, the ratio increases with decreasing bulk voltage. As described in Equations 7 and 8, if the two current limits I_p1 and I_p2 are equal, the amount of energy delivered to the load in DCM mode is higher than the amount of energy delivered to the load in CCM mode at each cycle.

FIG. 7 shows a simplified diagram for maximum energy delivered to load at each cycle as a conventional function of bulk voltage. As a function of bulk voltage, the current limit, which equals either I_p1 or I_p2, is adjusted to compensate for "delay to output" as shown in FIG. 4, but differences between Equations 7 and 8 have not been taken into account. Also, FIG. 7 does not appear to have taken into account the varying ratio of $$\frac{I\_i2}{I\_p2}.$$

Hence the maximum energy is not constant over the entire range of bulk voltage. For example, as shown by a curve 1300, the maximum energy decreases significantly with decreasing bulk voltage in CCM mode, even though the maximum energy appears substantially constant in the DCM mode.

In order to improve consistency of maximum energy in the CCM mode and the DCM mode, the compensation slope for the current threshold or the corresponding voltage threshold can be made different in different modes. Specifically, as shown in Equations 7 and 8, the compensation slope in the CCM mode is greater than the compensation slope in the DCM mode in magnitude.

But the maximum energy of the power converter can also be affected by other characteristics of the system. Hence it is highly desirable to improve techniques for over-current protection and over-power protection.

3. BRIEF SUMMARY OF THE INVENTION

The present invention is directed to integrated circuits. More particularly, the invention provides a control system and method for over-current protection and over-power protection. Merely by way of example, the invention has been applied to a power converter. But it would be recognized that the invention has a much broader range of applicability.

According to one embodiment, a system controller for protecting a power converter includes a signal generator a comparator, and a modulation and drive component. The signal generator is configured to generate a threshold signal. The comparator is configured to receive the threshold signal and a current sensing signal and generate a comparison signal based on at least information associated with the threshold signal and the current sensing signal, the current sensing signal indicating a magnitude of a primary current flowing through a primary winding of a power converter. The modulation and drive component is coupled to the signal generator and configured to receive at least the comparison signal, generate a drive signal based on at least information associated with the comparison signal, and output the drive signal to a switch in order to affect the primary current, the drive signal being associated with one or more first switching periods and a second switching period following the one or more first switching periods, the one or more first switching periods corresponding to one or more first duty cycles. The signal generator is further configured to, for the second switching period, determine a first threshold signal value based on at least information associated with the one or more first duty cycles, and generate the threshold signal equal to the determined first threshold signal value, the threshold signal being constant in magnitude as a function of time for the second switching period.

According to another embodiment, a system controller for protecting a power converter includes a signal generator, a comparator, and a modulation and drive component. The signal generator is configured to generate a threshold signal. The comparator is configured to receive the threshold signal and a current sensing signal and generate a comparison signal based on at least information associated with the threshold signal and the current sensing signal, the current sensing signal indicating a magnitude of a primary current flowing through a primary winding of a power converter. The modulation and drive component is coupled to the signal generator and configured to receive at least the comparison signal, generate a drive signal based on at least information associated with the comparison signal, and output the drive signal to a switch in order to affect the primary current, the drive signal being associated with one or more first switching periods and a second switching period following the one or more first switching periods, the one or more first switching periods corresponding to one or more first duty cycles, the second switching period including an on-time period and an off-time period. The signal generator is further configured to, for the second switching period, determine a first threshold signal value based on at least information associated with the one or more first duty cycles, set a time to zero at a beginning of the on-time period, if the time satisfies one or more first predetermined conditions, generate the threshold signal equal to the determined first threshold signal value so that the threshold signal is constant in magnitude as a function of the time, and if the time satisfies one or more second predetermined conditions, generate the threshold signal so that the threshold signal decreases with the increasing time in magnitude.

According to yet another embodiment, a system controller for protecting a power converter includes a signal generator, a comparator, and a modulation and drive component. The signal generator is configured to generate a threshold signal.

The comparator is configured to receive the threshold signal and a current sensing signal and generate a comparison signal based on at least information associated with the threshold signal and the current sensing signal, the current sensing signal indicating a magnitude of a primary current flowing through a primary winding of a power converter. The modulation and drive component is coupled to the signal generator and configured to receive at least the comparison signal, generate a drive signal based on at least information associated with the comparison signal, and output the drive signal to a switch in order to affect the primary current, the drive signal being associated with one or more first switching periods and a second switching period following the one or more first switching periods, the one or more first switching periods corresponding to one or more first duty cycles, the second switching period including an on-time period and an off-time period. The signal generator is further configured to, for the second switching period, determine a first threshold signal value based on at least information associated with the one or more first duty cycles, set a time to zero at a beginning of the on-time period, and if the time satisfies one or more first predetermined conditions, generate the threshold signal so that the threshold signal decreases, from the determined first threshold signal value, with the increasing time in magnitude.

According to yet another embodiment, a system controller for protecting a power converter includes a signal generator, a comparator, and a modulation and drive component. The signal generator is configured to generate a threshold signal. The comparator is configured to receive the threshold signal and a current sensing signal and generate a comparison signal based on at least information associated with the threshold signal and the current sensing signal, the current sensing signal indicating a magnitude of a primary current flowing through a primary winding of a power converter. The modulation and drive component is coupled to the signal generator and configured to receive at least the comparison signal, generate a drive signal based on at least information associated with the comparison signal, and output the drive signal to a switch in order to affect the primary current, the drive signal being associated with a plurality of switching periods, each of the plurality of switching periods including an on-time period and an off-time period. The signal generator is further configured to, for each of the plurality of switching periods, set a time to zero at a beginning of the on-time period, if the time satisfies one or more first predetermined conditions, generate the threshold signal so that the threshold signal increases with the increasing time in magnitude, and if the time satisfies one or more second predetermined conditions, generate the threshold signal so that the threshold signal decreases with the increasing time in magnitude.

According to yet another embodiment, a signal generator for protecting a power converter includes a modulation and drive component, a ramping-signal generator, a sampling-signal generator, and a sample-and-hold component. The modulation and drive component is configured to generate a modulation signal to output a drive signal to a switch in order to affect a primary current flowing through a primary winding of a power converter. The ramping-signal generator is configured to receive the modulation signal and generate a ramping signal based on at least information associated with the modulation signal. The sampling-signal generator is configured to receive the modulation signal and generate a sampling signal including a pulse in response to a falling edge of the modulation signal. The sample-and-hold component is configured to receive the sampling signal and the ramping signal and output a sampled-and-held signal associated with a magnitude of the ramping signal corresponding to the pulse of the sampling signal.

According to yet another embodiment, a signal generator for protecting a power converter includes a modulation and drive component, a ramping-signal generator, a sample-and-hold component, a filter-signal generator, and a low-pass filter. The modulation and drive component is configured to generate a modulation signal to output a drive signal to a switch in order to affect a primary current flowing through a primary winding of a power converter. The ramping-signal generator is configured to receive the modulation signal and generate a ramping signal based on at least information associated with the modulation signal. The sample-and-hold component is configured to receive the ramping signal and the modulation signal and output a sampled-and-held signal associated with a magnitude of the ramping signal in response to the modulation signal. The filter-signal generator is configured to receive the modulation signal and generate a filter signal based on at least information associated with the modulation signal. The low-pass filter is configured to receive the filter signal and the sampled-and-held signal and, in response to the filter signal, generate a first signal based on at least information associated with the sampled-and-held signal.

In one embodiment, a method for protecting a power converter includes, generating a threshold signal, receiving the threshold signal and a current sensing signal, the current sensing signal indicating a magnitude of a primary current flowing through a primary winding of a power converter, and generating a comparison signal based on at least information associated with the threshold signal and the current sensing signal. In addition, the method includes receiving at least the comparison signal, generating a drive signal based on at least information associated with the comparison signal, the drive signal being associated with one or more first switching periods and a second switching period following the one or more first switching periods, the one or more first switching periods corresponding to one or more duty cycles, and outputting the drive signal to a switch in order to affect the primary current. The process for generating a threshold signal includes, for the second switching period, determining a threshold signal value based on at least information associated with the one or more duty cycles; and generating the threshold signal equal to the determined threshold signal value, the threshold signal being constant in magnitude as a function of time for the second switching period.

In another embodiment, a method for protecting a power converter includes, generating a threshold signal, receiving the threshold signal and a current sensing signal, the current sensing signal indicating a magnitude of a primary current flowing through a primary winding of a power converter, and generating a comparison signal based on at least information associated with the threshold signal and the current sensing signal. The method further includes receiving at least the comparison signal, generating a drive signal based on at least information associated with the comparison signal, the drive signal being associated with one or more first switching periods and a second switching period following the one or more first switching periods, the one or more first switching periods corresponding to one or more duty cycles, the second switching period including an on-time period and an off-time period, and outputting the drive signal to a switch in order to affect the primary current. The process for generating a threshold signal includes, for the second switching period, determining a threshold signal value based on at least information associated with the one or more duty cycles, setting a time to zero at a beginning of the on-time period, if the time satisfies one or more first predetermined conditions, generating the threshold signal equal to the determined threshold signal value so that the threshold signal is constant in magnitude as a function of the time, and if the time satisfies one or more second predetermined conditions, generating the threshold signal so that the threshold signal decreases with the increasing time in magnitude.

In yet another embodiment, a method for protecting a power converter includes, generating a threshold signal, receiving the threshold signal and a current sensing signal, the current sensing signal indicating a magnitude of a primary current flowing through a primary winding of a power converter, and generating a comparison signal based on at least information associated with the threshold signal and the current sensing signal. The method further includes, receiving at least the comparison signal, generating a drive signal based on at least information associated with the comparison signal, the drive signal being associated with one or more first switching periods and a second switching period following the one or more first switching periods, the one or more first switching periods corresponding to one or more duty cycles, the second switching period including an on-time period and an off-time period, and outputting the drive signal to a switch in order to affect the primary current. The process for generating a threshold signal includes, for the second switching period, determining a threshold signal value based on at least information associated with the one or more duty cycles, setting a time to zero at a beginning of the on-time period, and if the time satisfies one or more predetermined conditions, generating the threshold signal so that the threshold signal decreases, from the determined threshold signal value, with the increasing time in magnitude.

In yet another embodiment, a method for protecting a power converter includes, generating a threshold signal, receiving the threshold signal and a current sensing signal, the current sensing signal indicating a magnitude of a primary current flowing through a primary winding of a power converter, and generating a comparison signal based on at least information associated with the threshold signal and the current sensing signal. The method further includes, receiving at least the comparison signal, generating a drive signal based on at least information associated with the comparison signal, the drive signal being associated with a plurality of switching periods, each of the plurality of switching periods including an on-time period and an off-time period, and outputting the drive signal to a switch in order to affect the primary current. The process for generating a threshold signal includes, for each of the plurality of switching periods, setting a time to zero at a beginning of the on-time period, if the time satisfies one or more first predetermined conditions, generating the threshold signal so that the threshold signal increases with the increasing time in magnitude, and if the time satisfies one or more second predetermined conditions, generating the threshold signal so that the threshold signal decreases with the increasing time in magnitude.

In yet another embodiment, a method for generating a signal for protecting a power converter includes, generating a modulation signal to output a drive signal to a switch in order to affect a primary current flowing through a primary winding of a power converter, receiving the modulation signal, and processing information associated with the modulation signal. The method further includes, generating a ramping signal based on at least information associated with the modulation signal, generating a sampling signal including a pulse in response to a falling edge of the modulation signal, receiving the sampling signal and the ramping signal, and outputting a sampled-and-held signal associated with a magnitude of the ramping signal corresponding to the pulse of the sampling signal.

In yet another embodiment, a method for generating a signal for protecting a power converter includes, generating a modulation signal to output a drive signal to a switch in order to affect a primary current flowing through a primary winding of a power converter, receiving the modulation signal, and processing information associated with the modulation signal. The method further includes, generating a ramping signal based on at least information associated with the modulation signal, generating a filter signal based on at least information associated with the modulation signal, and receiving the ramping signal and the modulation signal. In addition, the method includes, outputting a sampled-and-held signal associated with a magnitude of the ramping signal in response to the modulation signal, receiving the filter signal and the sampled-and-held signal, and generating, in response to the filter signal, a first signal based on at least information associated with the sampled-and-held signal.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

FIG. 13(*b*) is a simplified diagram showing the current sensing signal as shown in FIG. 12 as a function of time under different values for bulk voltage according to one embodiment of the present invention;

5. DETAILED DESCRIPTION OF THE INVENTION

The present invention is directed to integrated circuits. More particularly, the invention provides a control system and method for over-current protection and over-power protection. Merely by way of example, the invention has been applied to a power converter. But it would be recognized that the invention has a much broader range of applicability.

Figure 8:
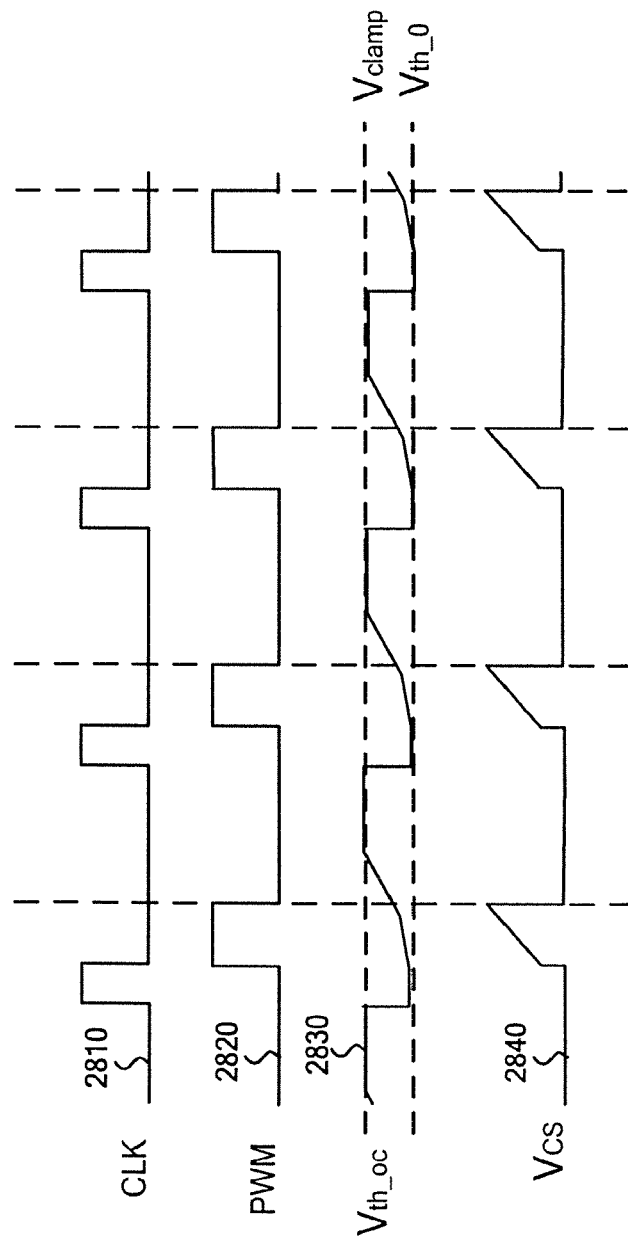
FIGS. 8 and 9 are simplified timing diagrams for a switch-mode converter corresponding to different bulk voltages in the CCM mode.
Figure 9:
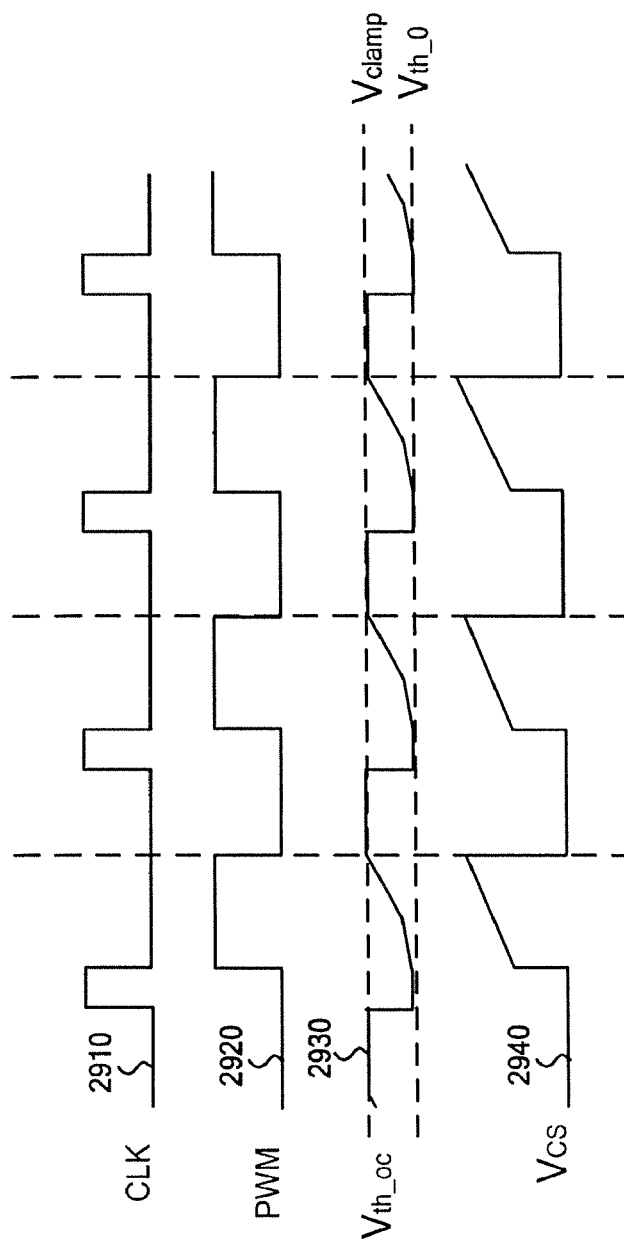

FIGS. 8 and 9 are simplified timing diagrams for a switch-mode converter corresponding to different bulk voltages in the CCM mode. For example, the bulk voltage for FIG. 8 is higher than the bulk voltage for FIG. 9.

As shown in FIG. 8, curves 2810, 2820, 2830, and 2840 represent the timing diagrams for a clock signal (e.g., CLK), a PWM signal (e.g., PWM), an over-current threshold signal (e.g., $V_{th\_oc}$), and a current sensing signal (e.g., $V_{CS}$) respectively. For example, the clock signal is in sync with the PWM signal. In another example, the PWM signal is generated by a PWM controller component. In yet another example, the over-current threshold signal is received by an OCP comparator, and the current sensing signal is also received by the OCP comparator. As shown in FIG. 8, the curve 2830 indicates that the over-current threshold signal changes between a lower limit of $V_{th\_0}$ and an upper limit of $V_{clamp}$, and the slope of the timing diagram in the CCM mode is greater than the slope of the timing diagram in the DCM mode.

Similarly, as shown in FIG. 9, curves 2910, 2920, 2930, and 2940 represent the timing diagrams for the clock signal (e.g., CLK), the PWM signal (e.g., PWM), the over-current threshold signal (e.g., $V_{th\_oc}$), and the current sensing signal (e.g., $V_{CS}$) respectively. For example, the clock signal is in sync with the PWM signal. In another example, the PWM signal is generated by the PWM controller component. In yet another example, the over-current threshold signal is received by the OCP comparator, and the current sensing signal is also received by the OCP comparator. As shown in FIG. 9, the curve 2930 indicates that the over-current threshold signal changes between the lower limit of $V_{th\_0}$ and the upper limit of $V_{clamp}$, and the slope of the timing diagram in the CCM mode is greater than the slope of the timing diagram in the DCM mode.

Referring to FIGS. 8 and 9, the technique can improve consistency of maximum energy in the CCM mode and the DCM mode at different bulk voltages, but the technique has its own limitations.

Figure 1:
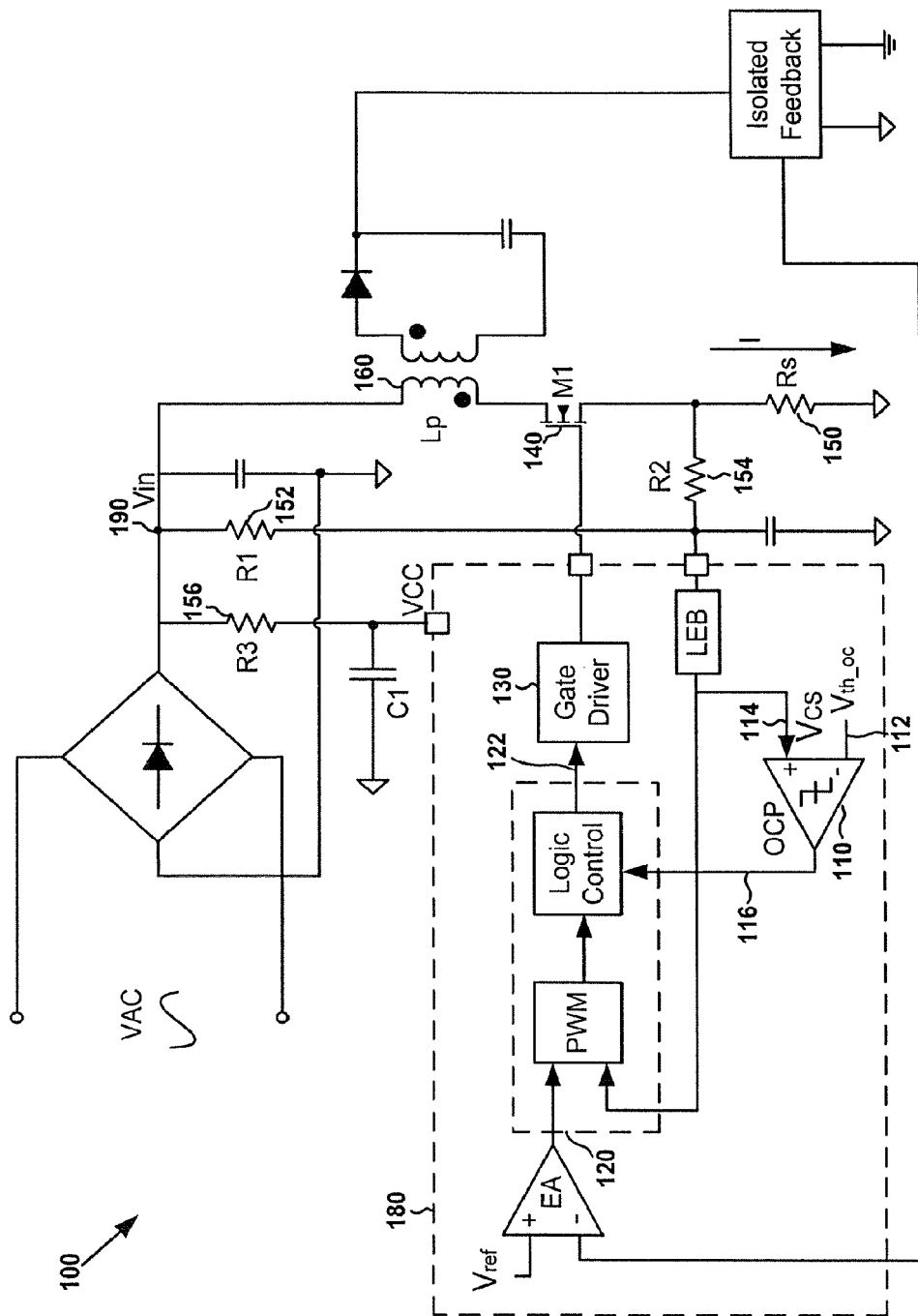
FIG. 1 is a simplified conventional switch-mode converter with over-current protection.
Figure 2:
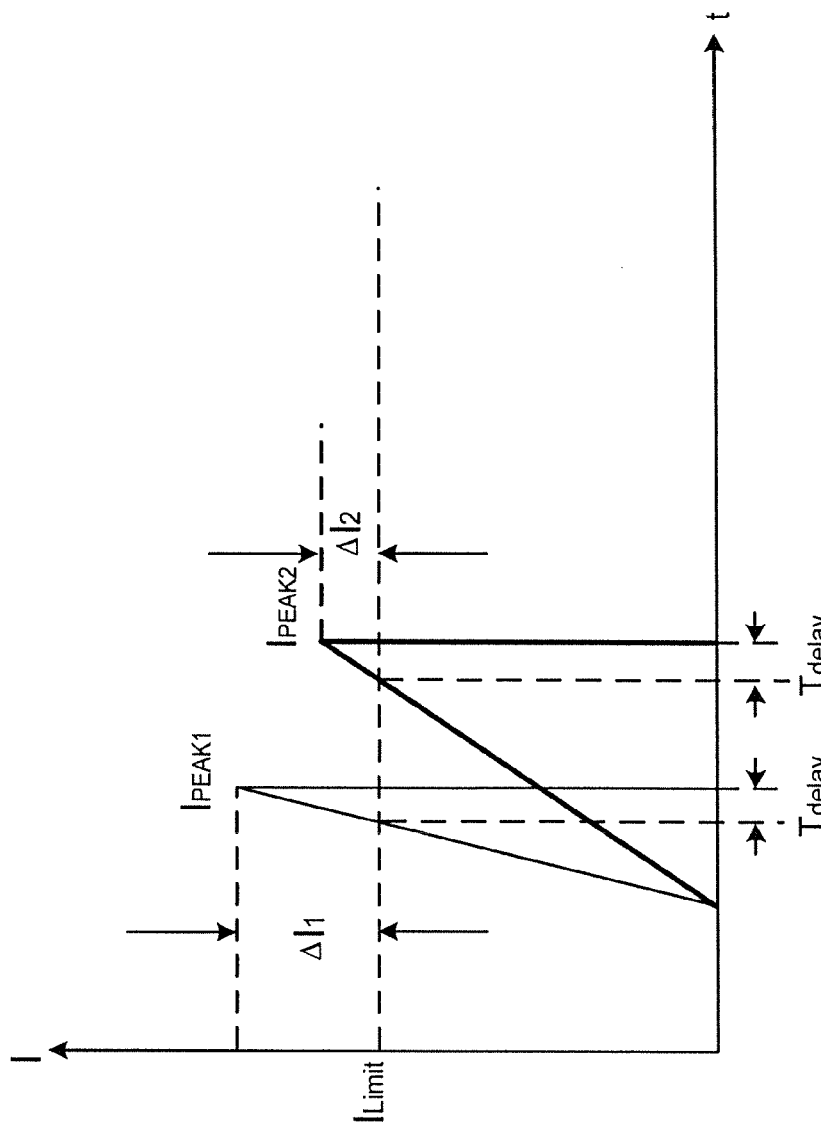
FIG. 2 is a simplified diagram showing conventional relationship between extra current ramping amplitude and bulk voltage.
Figure 3:
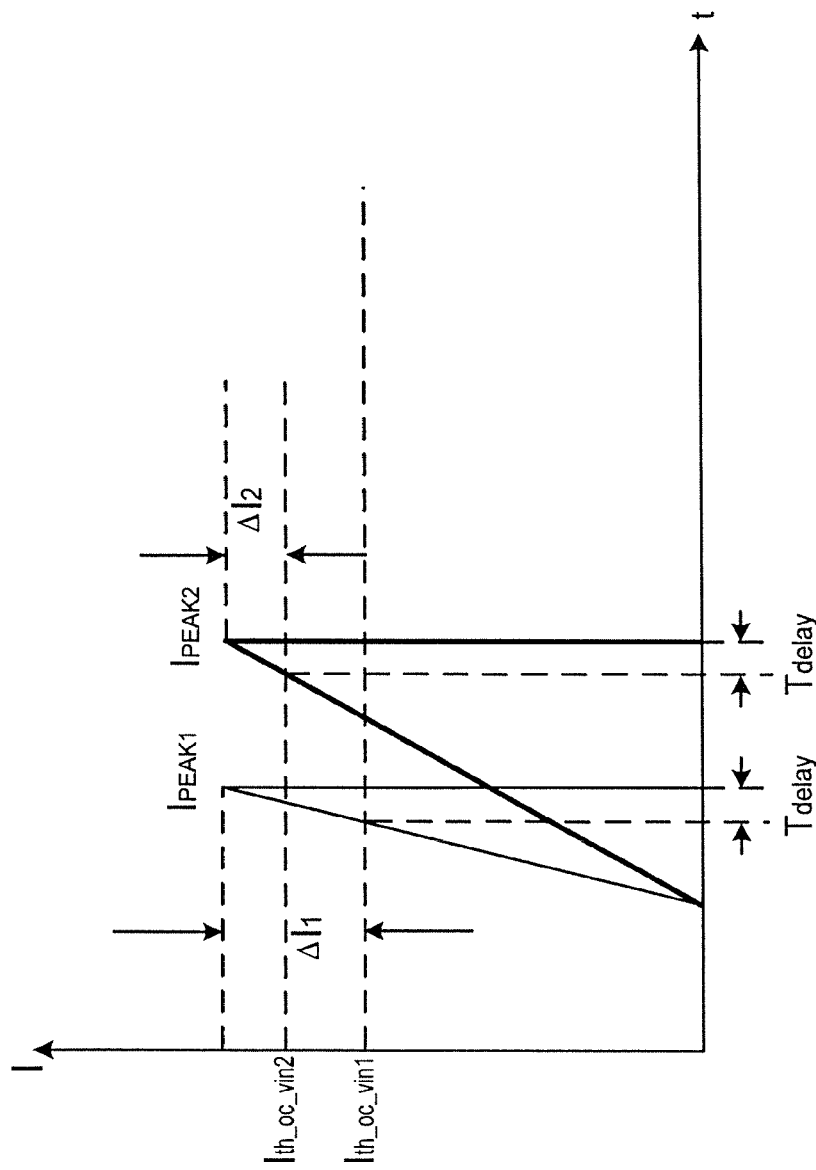
FIG. 3 is a simplified diagram showing conventional relationship between current threshold and bulk voltage.
Figure 4:
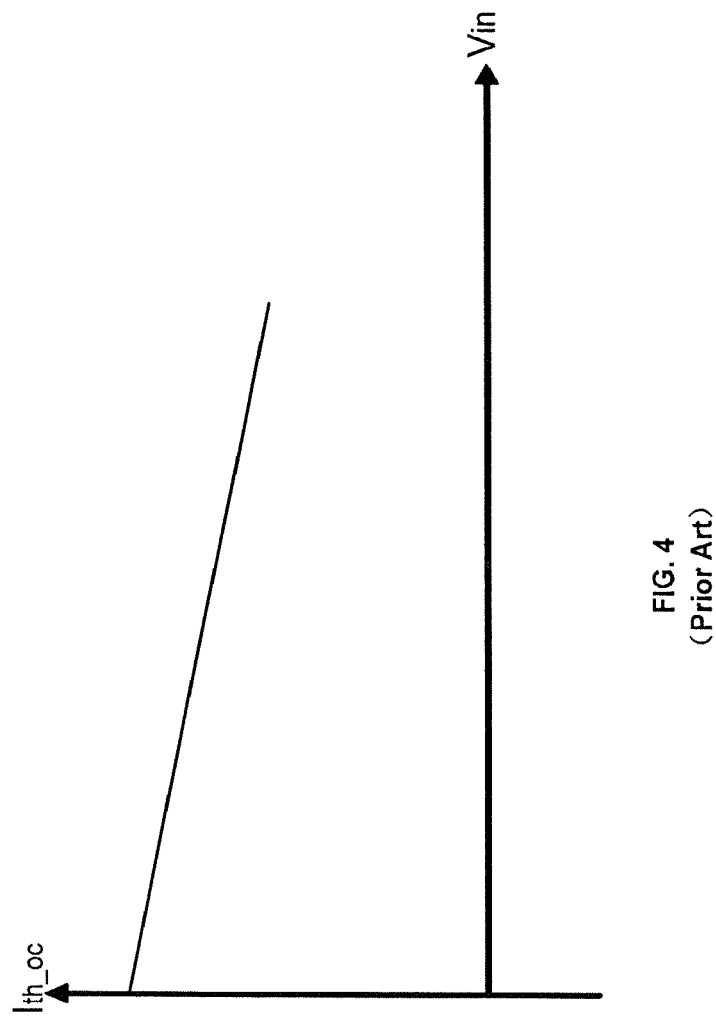
FIG. 4 is a simplified diagram showing conventional relationship between threshold offset and bulk voltage.
Figure 5:
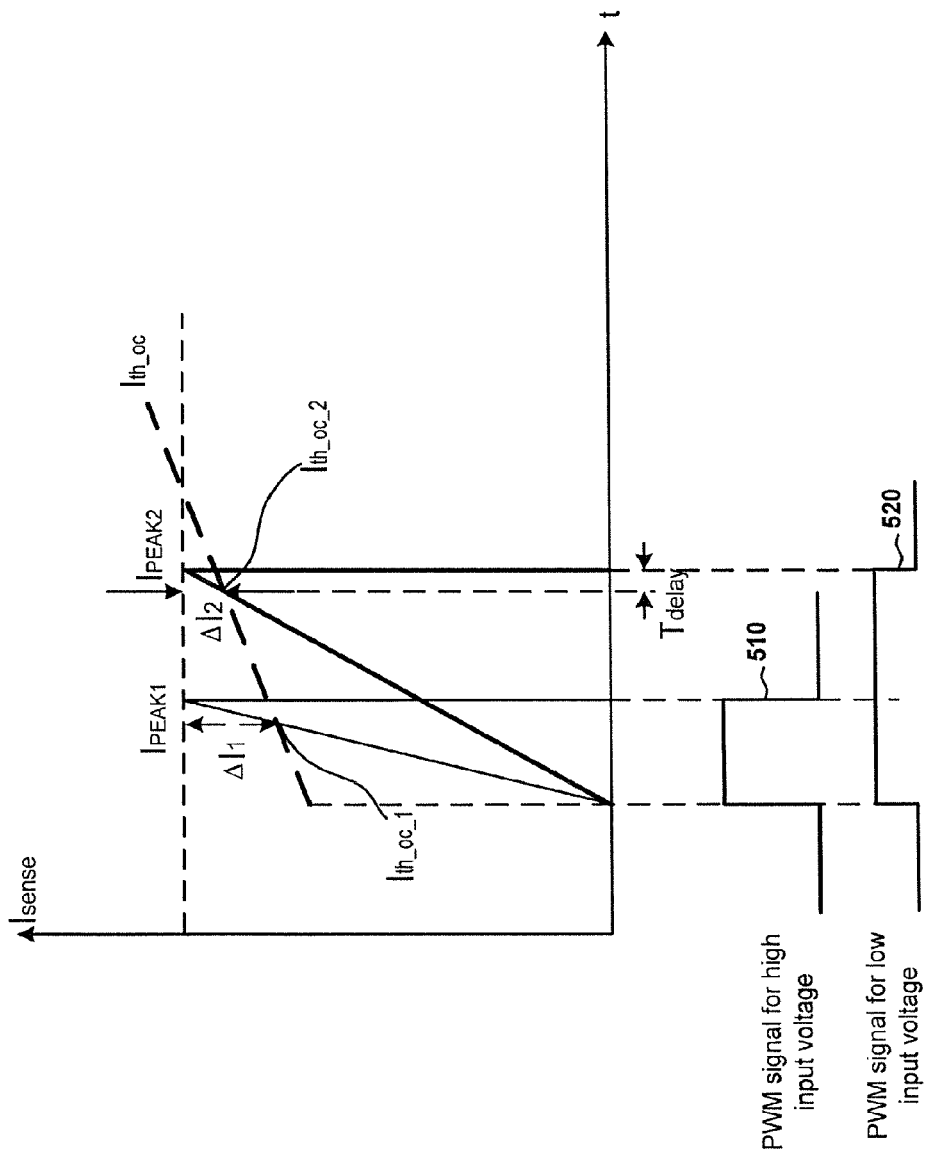
FIG. 5 is a simplified diagram showing conventional relationship between PWM signal maximum width and bulk voltage.
Figure 6:
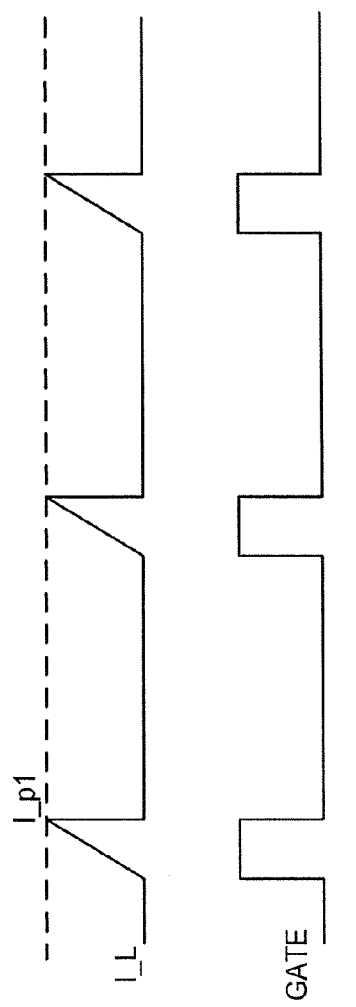
FIG. 6 shows simplified conventional current profiles for primary winding in CCM mode and DCM mode.
Figure 6:
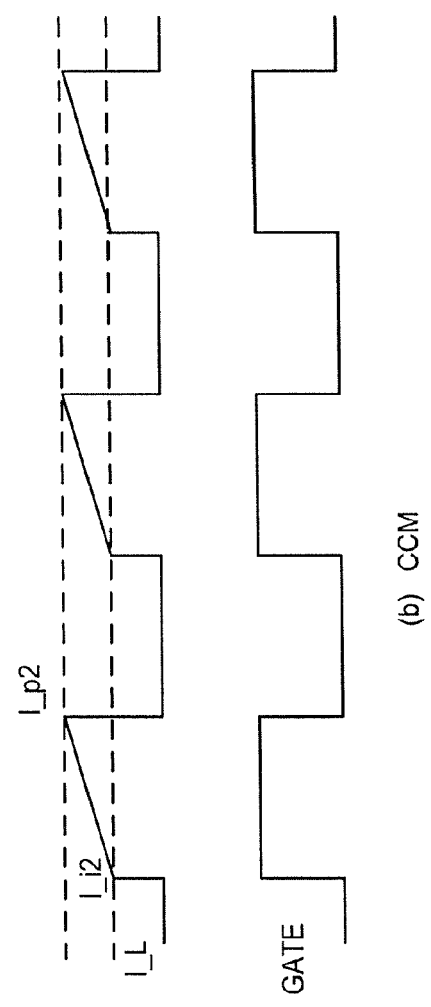
Figure 7:
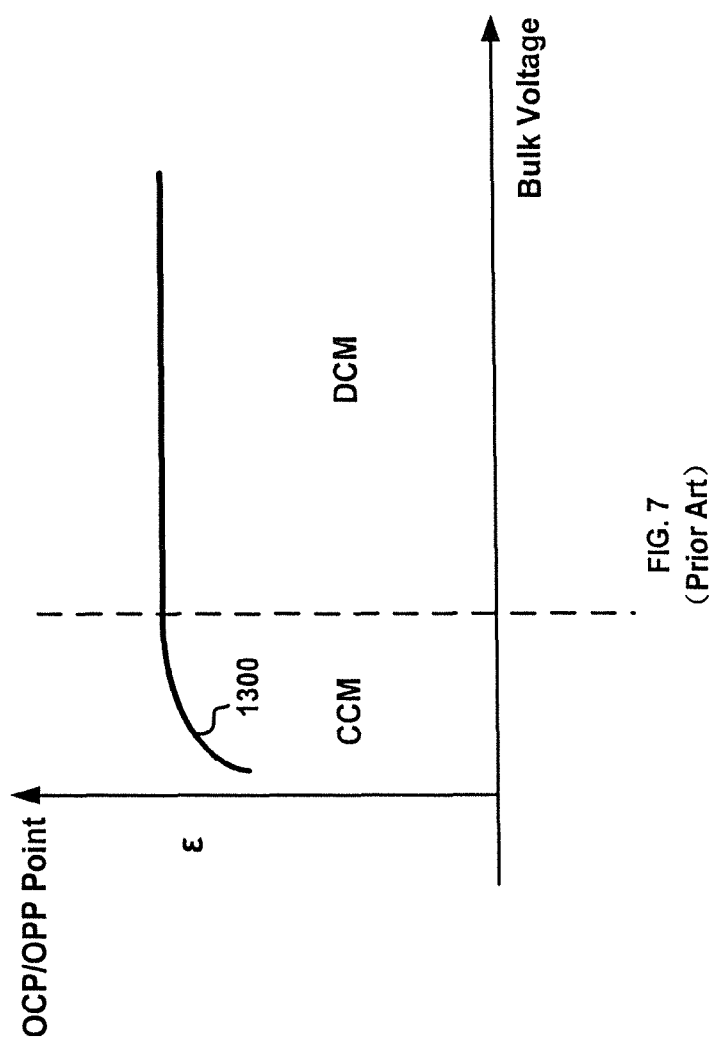
FIG. 7 shows a simplified diagram for maximum energy delivered to load at each cycle as a conventional function of bulk voltage.

As shown in FIG. 1, the bulk voltage $V_{in}$ at the node 190 often is not a perfect DC voltage. Instead, the bulk voltage $V_{in}$ usually changes with the output loading of the system 100 and the VAC signal. The VAC signal is an AC voltage signal, which changes its magnitude with time. For the same VAC signal, the bulk voltage $V_{in}$ changes with the output loading of the system 100.

Figure 10:
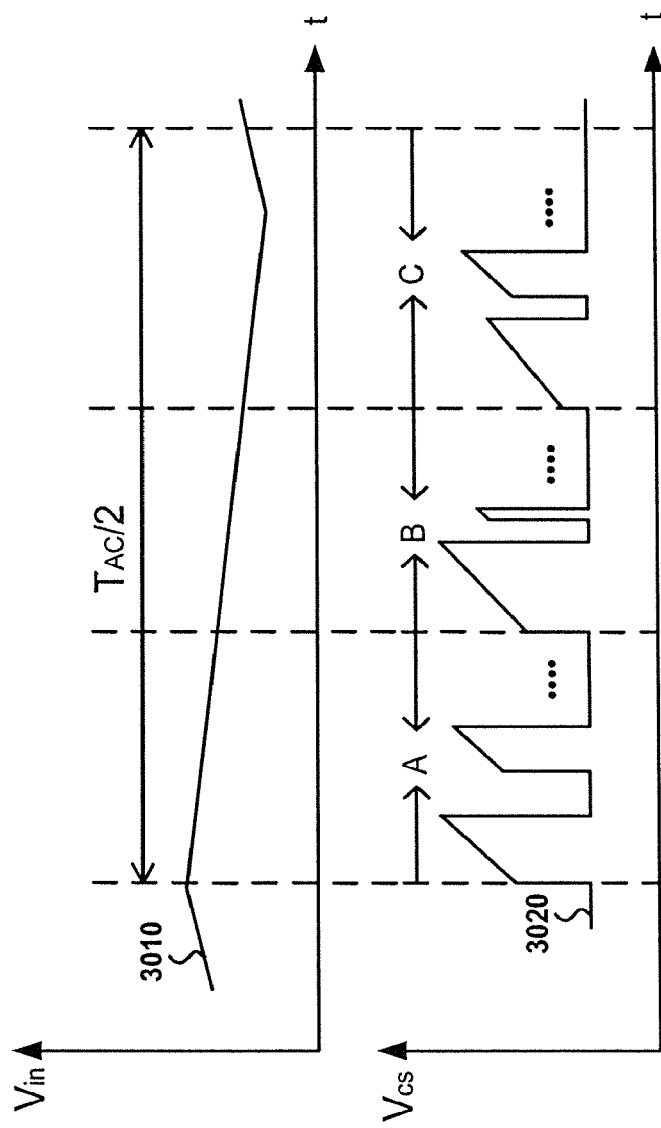
FIG. 10 is a simplified diagram showing effect of change in the bulk voltage $V_{in}$ on the current sensing signal for the conventional switch-mode converter.

FIG. 10 is a simplified diagram showing effect of change in the bulk voltage $V_{in}$ on the current sensing signal for the conventional switch-mode converter 100. Curves 3010 and 3020 represent the timing diagrams for the bulk voltage $V_{in}$ and the current sensing signal respectively.

As shown in FIG. 10, in each of regions A, B, and C, there are two voltage pulses for the current sensing signal, one often being larger than the other. According to one embodiment, a duty cycle of a signal for a signal period is the ratio between the length of time when the signal is at a logic high level and the length of the signal period. In region A, the duty cycle of the PWM signal is relatively small, so the off-time of the PWM signal is long enough for sufficient demagnetization and effective transfer of energy to the output of the switch-mode converter 100. Subsequently, at the beginning of the next PWM period, the voltage value of the current sensing signal is lower than the corresponding voltage threshold value of $V_{th\_0}$. Hence, in this PWM period, the primary winding can effectively store energy, and the stored energy can be effectively transferred to the output of the switch-mode converter 100. Hence in region A, the maximum power actually delivered by the switch-mode converter 100 is not significantly affected by the change in the bulk voltage $V_{in}$.

In region B, the duty cycle of the PWM signal is relatively large, and the off-time of the PWM signal is too short for sufficient demagnetization and effective transfer of energy to the output of the switch-mode converter 100. Subsequently, at the beginning of the next PWM period, the voltage value of the current sensing signal is higher than the corresponding voltage threshold value of $V_{th\_0}$. Hence, in this PWM period, the switch 140 is turned off soon after being turned on, causing the primary winding not being able to effectively store energy and effectively reducing the switching frequency by half. Consequently, the input power to the primary winding is also reduced by half, and the maximum power actually delivered by the switch-mode converter 100 in region B is significantly affected by the change in the bulk voltage $V_{in}$.

Similarly, in region C, the duty cycle of the PWM signal reaches the maximum duty cycle that is set by the chip 180 for PWM control. For example, the maximum duty cycle is set to 80%. Consequently, the off-time of the PWM signal is too short for sufficient demagnetization and effective transfer of energy to the output of the switch-mode converter 100. Consequently, the maximum power actually delivered by the switch-mode converter 100 in region C is significantly reduced by the change in the bulk voltage $V_{in}$.

As shown in FIG. 10, regions A, B and C can repeatedly occur in different half periods of the VAC signal. For example, $T_{AC}$ represents the period of the VAC signal, which is equal to 20 ms for 220V/50 Hz AC voltage and equal to 16.67 ms for 110V/60 Hz AC voltage. In another example, regions B and C correspond to lower magnitudes of the bulk voltage $V_{in}$ than region A. In yet another example, in regions A, B, and C, the effect of change in the bulk voltage $V_{in}$ on the current sensing signal may be different.

As discussed above, the reduction of the effective PWM switching frequency is an important reason for the reduction of the maximum power actually delivered by the switch-mode converter 100. Hence, to restore the actual maximum power to the predetermined maximum power, it is important to correct the combination of larger voltage pulse and smaller voltage pulse. According to one embodiment, a correction is made to the smaller voltage pulse so that the switch has sufficient on-time in each PWM period to enable effective energy storage by the primary winding.

Figure 11:
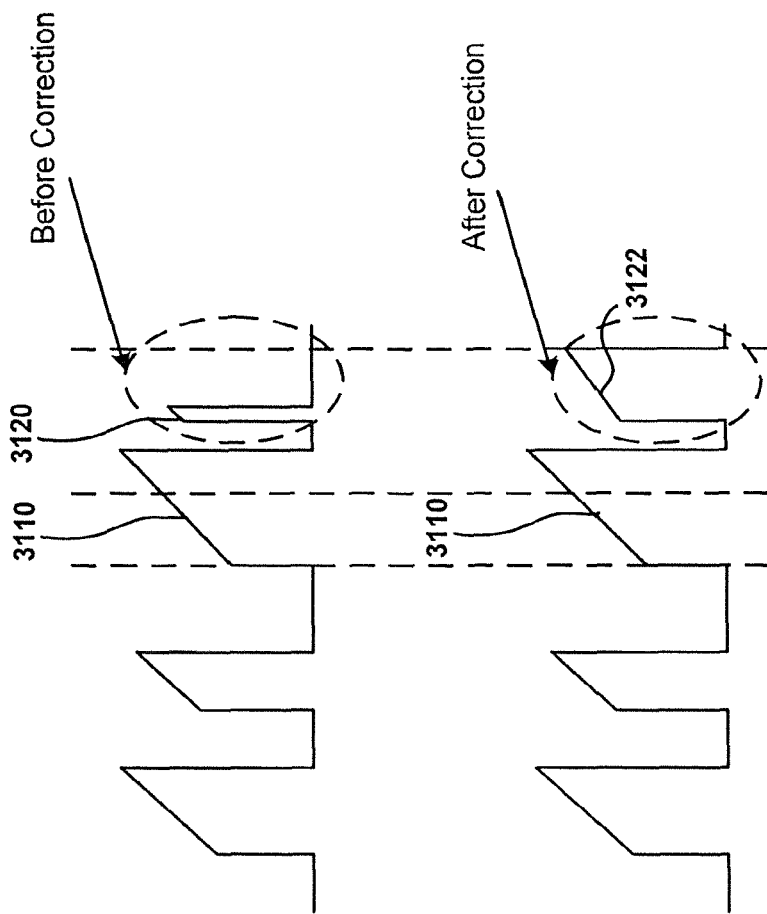
FIG. 11 is a simplified diagram showing correction to voltage pulse of the current sensing signal.

FIG. 11 is a simplified diagram showing correction to voltage pulse of the current sensing signal. As shown in FIG. 11, if the duty cycle of the PWM signal for the current PWM period (e.g., the PWM period that corresponds to a pulse 3110 in FIG. 11) is determined to be larger than a predetermined duty-cycle threshold (e.g., 60%), the voltage threshold is set, at the beginning of the next PWM period, to another threshold level (e.g., $V_{th\_a}$) that is different from the lower limit of $V_{th\_0}$, in order to correct a pulse 3120 to become a pulse 3122 according to one embodiment. For example, the threshold level (e.g., $V_{th\_a}$) is the same as the upper limit of $V_{clamp}$. In another example, the threshold level (e.g., $V_{th\_a}$) is larger than the lower limit of $V_{th\_0}$ but smaller than the upper limit of $V_{clamp}$.

In another example, such correction can modify the duty cycle of the PWM signal and prevent the switch from being turned off soon after being turned on. In yet another example, such correction to the voltage pulse enables the primary winding of the switch-mode converter to effectively store and transfer energy. In yet another example, such correction to the voltage pulse can prevent the reduction of the effective switch frequency and the reduction of maximum power actually delivered by the switch-mode converter.

Figure 12:
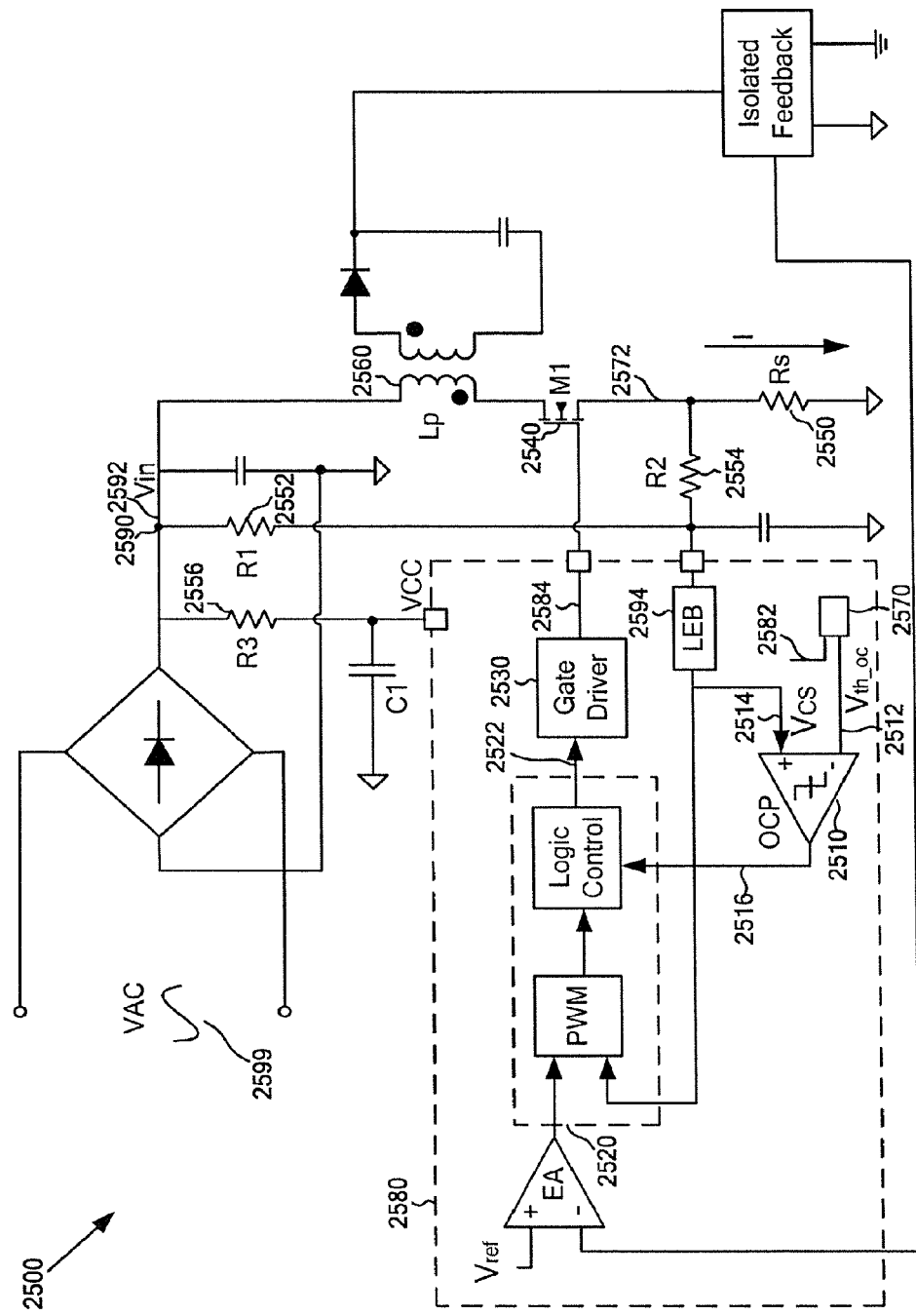
FIG. 12 is a simplified power converter with over-current protection according to one embodiment of the present invention.

FIG. 12 is a simplified power converter with over-current protection according to one embodiment of the present invention. This diagram is merely an example, which should not unduly limit the scope of the claims. One of ordinary skill in the art would recognize many variations, alternatives, and modifications. The power converter 2500 includes an OCP comparator 2510, a PWM controller component 2520, a gate driver 2530, a switch 2540, resistors 2550, 2552, 2554 and 2556, an over-current-threshold signal generator 2570, a primary winding 2560, and a leading-edge-blanking (LEB) component 2594. The OCP comparator 2510, the PWM controller component 2520, and the gate driver 2530 are parts of a chip 2580 for PWM control. The leading-edge-blanking (LEB) component 2594 is omitted in some embodiments.

As shown in FIG. 12, a bulk voltage $V_{in}$ 2592 at a node 2590 is not a perfect DC voltage in some embodiments. For example, the bulk voltage $V_{in}$, changes with the output loading of the power converter 2500 and a VAC signal 2599. In another example, for the same VAC signal 2599, the change in the bulk voltage $V_{in}$ 2592 increases with the output loading of the power converter 2500.

According to one embodiment, the PWM controller component 2520 generates a PWM signal 2522, which is received by the gate driver 2530. In one embodiment, the gate driver 2530 in response outputs a gate drive signal 2584 to the switch 2540. In another embodiment, the over-current-threshold signal generator 2570 receives a signal 2582 and outputs an over-current threshold signal 2512 (e.g., $V_{th\_oc}$) to the OCP comparator 2510. For example, the signal 2582 is the PWM signal 2522. In another example, the signal 2582 is the gate drive signal 2584.

Figure 13A:
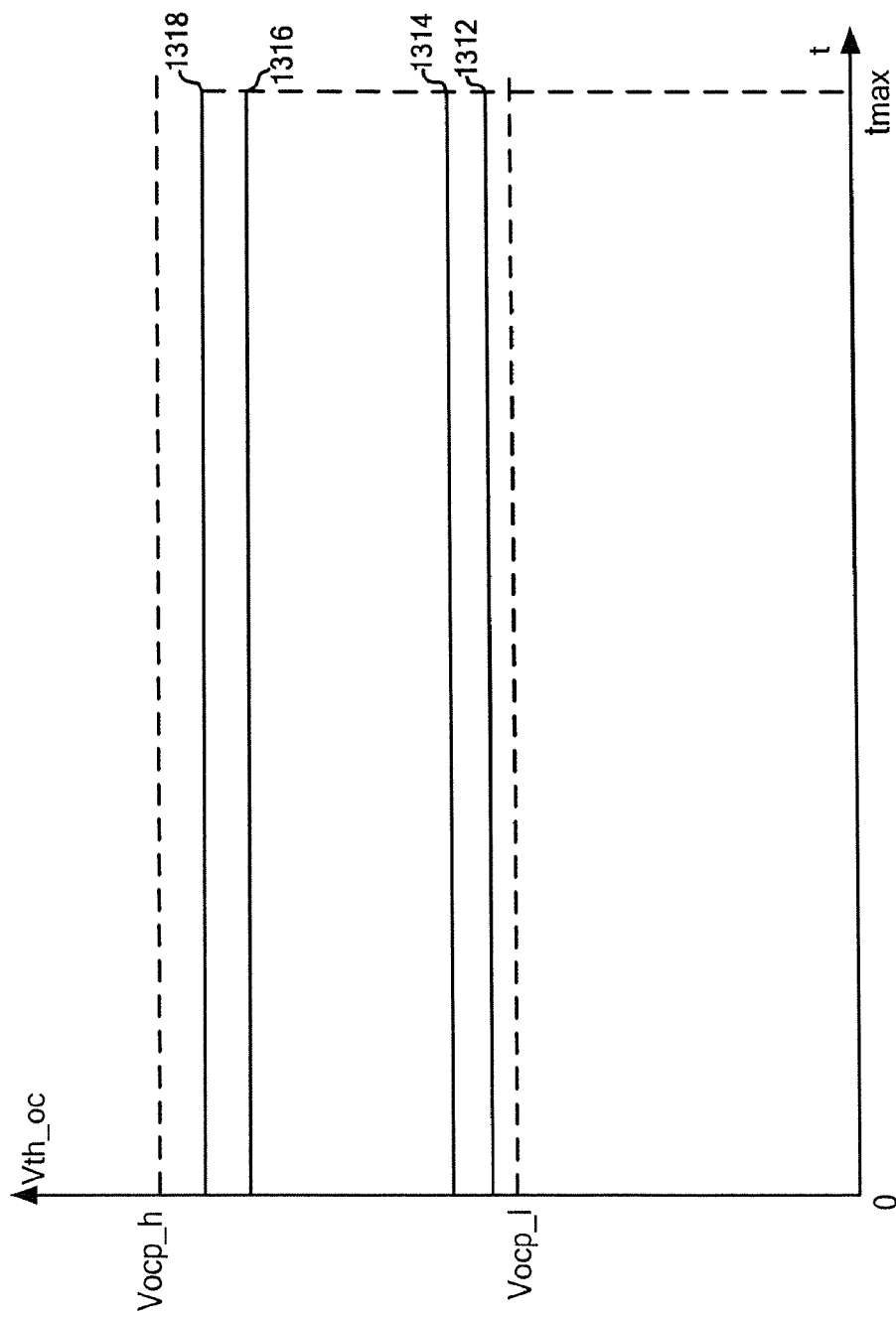
FIG. 13(*a*) is a simplified diagram showing the over-current threshold signal as shown in FIG. 12 as a function of time according to one embodiment of the present invention.
Figure 18A:
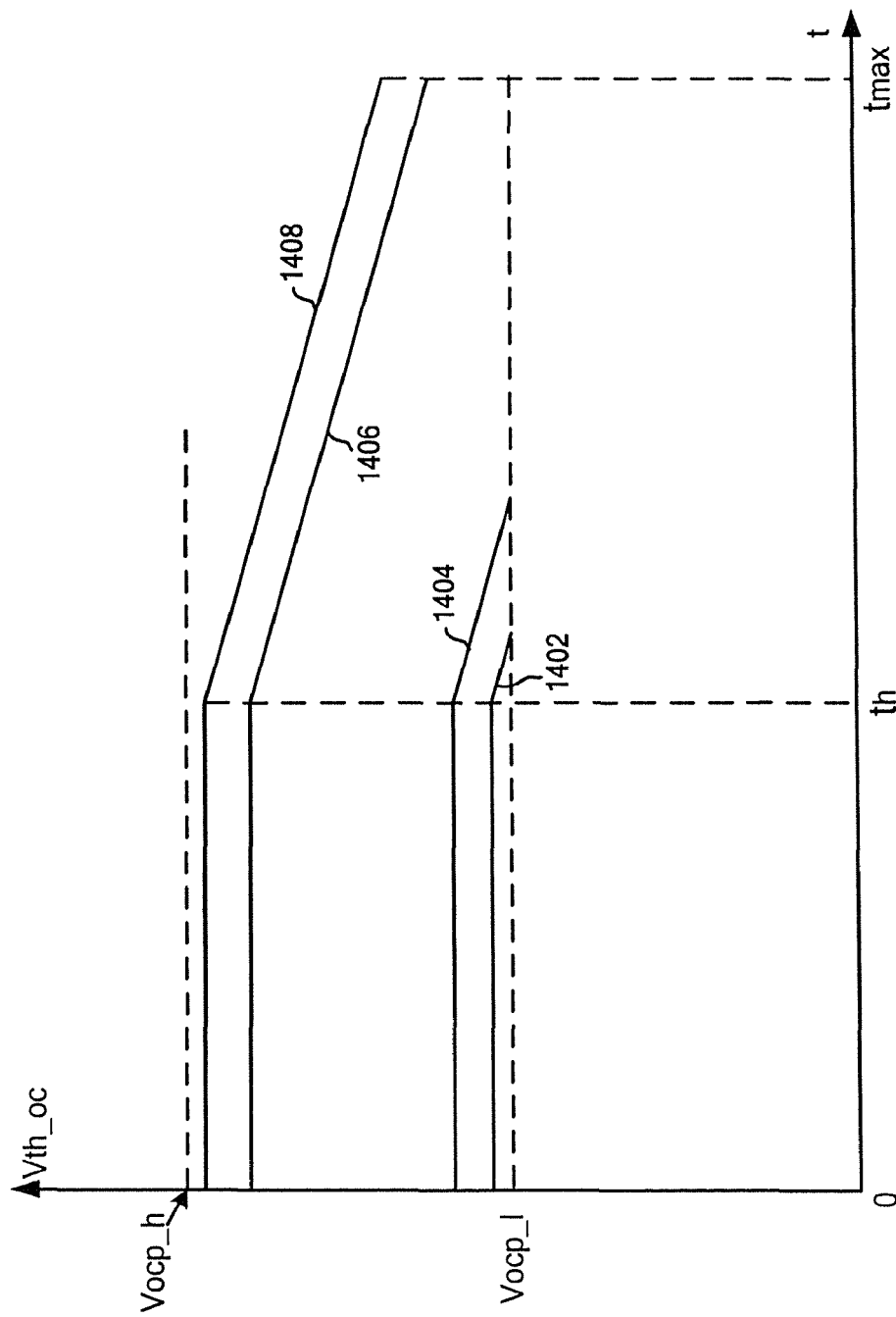
FIG. 18(a) is a simplified diagram showing the over-current threshold signal as shown in FIG. 12 as a function of time according to yet another embodiment of the present invention.
Figure 20A:
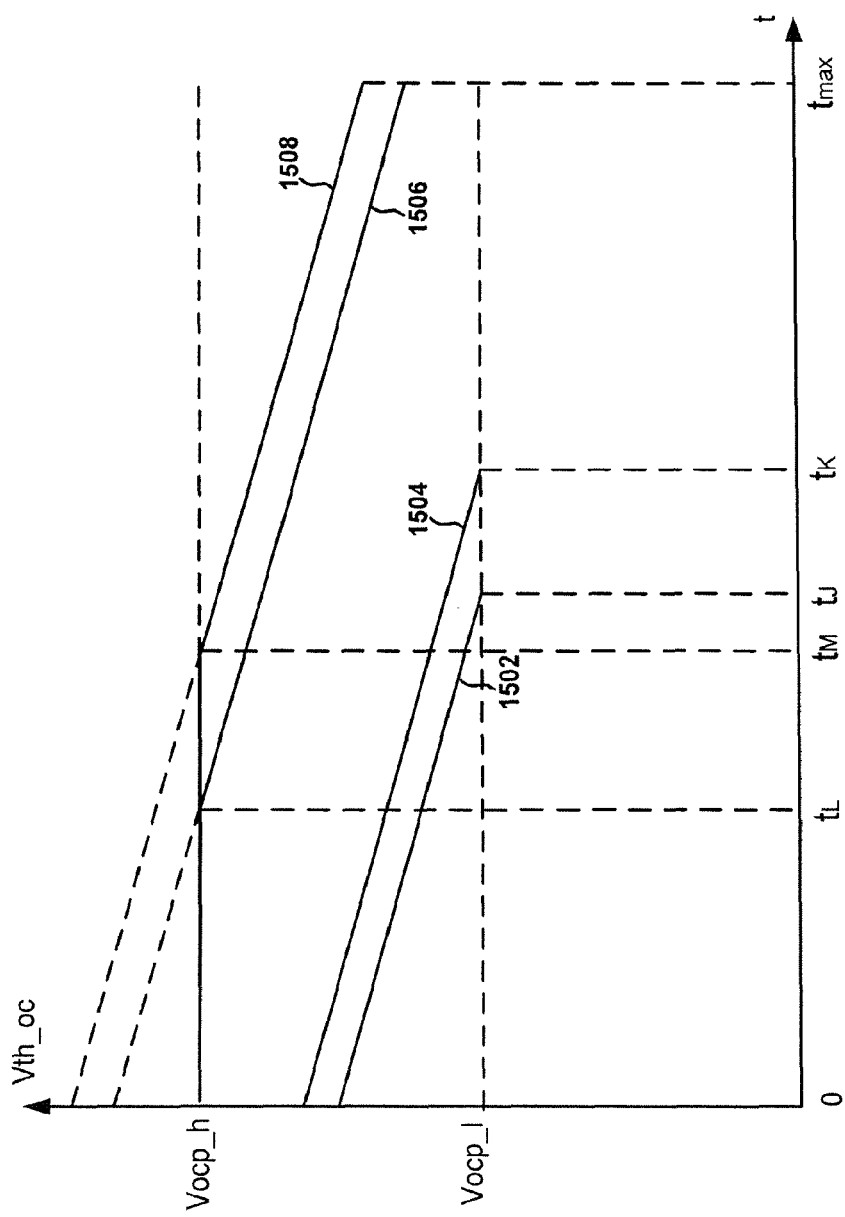
FIG. 20(a) is a simplified diagram showing the over-current threshold signal as shown in FIG. 12 as a function of time according to yet another embodiment of the present invention.

In yet another example, the over-current threshold signal 2512 (e.g., $V_{th\_oc}$) is shown in FIG. 13(a), FIG. 18(a), FIG. 20(a), and/or FIG. 22(a) as described below according to certain embodiments. In yet another example, the OCP comparator 2510 compares the over-current threshold signal 2512 (e.g., $V_{th\_oc}$) and a current sensing signal 2514 (e.g., $V_{CS}$), and sends an over-current control signal 2516 to the PWM controller component 2520. In yet another example, when a current 2572 flowing through the primary winding is greater than a limiting level, the PWM controller component 2520 turns off the switch 2540 and shuts down the power converter 2500. In yet another example, the current sensing signal 2514 (e.g., $V_{CS}$) is associated with a voltage signal indicating the magnitude of the current 2572.

In one embodiment, a switching period of the PWM signal 2522 includes an on-time period and an off-time period, and a duty cycle of the switching period is equal to a ratio of the on-time period to the switching period. For example, during the on-time period, the switch 2540 is closed (e.g., being turned on), and during the off-time period, the switch 2540 is open (e.g., being turned off).

In another embodiment, the over-current-threshold signal generator 2570 generates the over-current threshold signal 2512 (e.g., $V_{th\_oc}$) as a function of time within a switching period, such time being measured from the beginning of the on-time period of the switching period. For example, the time within a switching period is set to zero at the beginning of the on-time period of each switching period. In yet another example, the over-current-threshold signal generator 2570 receives the PWM signal 2522 to detect the beginning of an on-time period of a switching period in order to reset the time within the switching period to zero, and generate the over-current threshold signal 2512 (e.g., $V_{th\_oc}$) as a function of such time. In yet another example, the over-current-threshold signal generator 2570 also detects the end of the on-time period for each switching period.

Figure 13B:
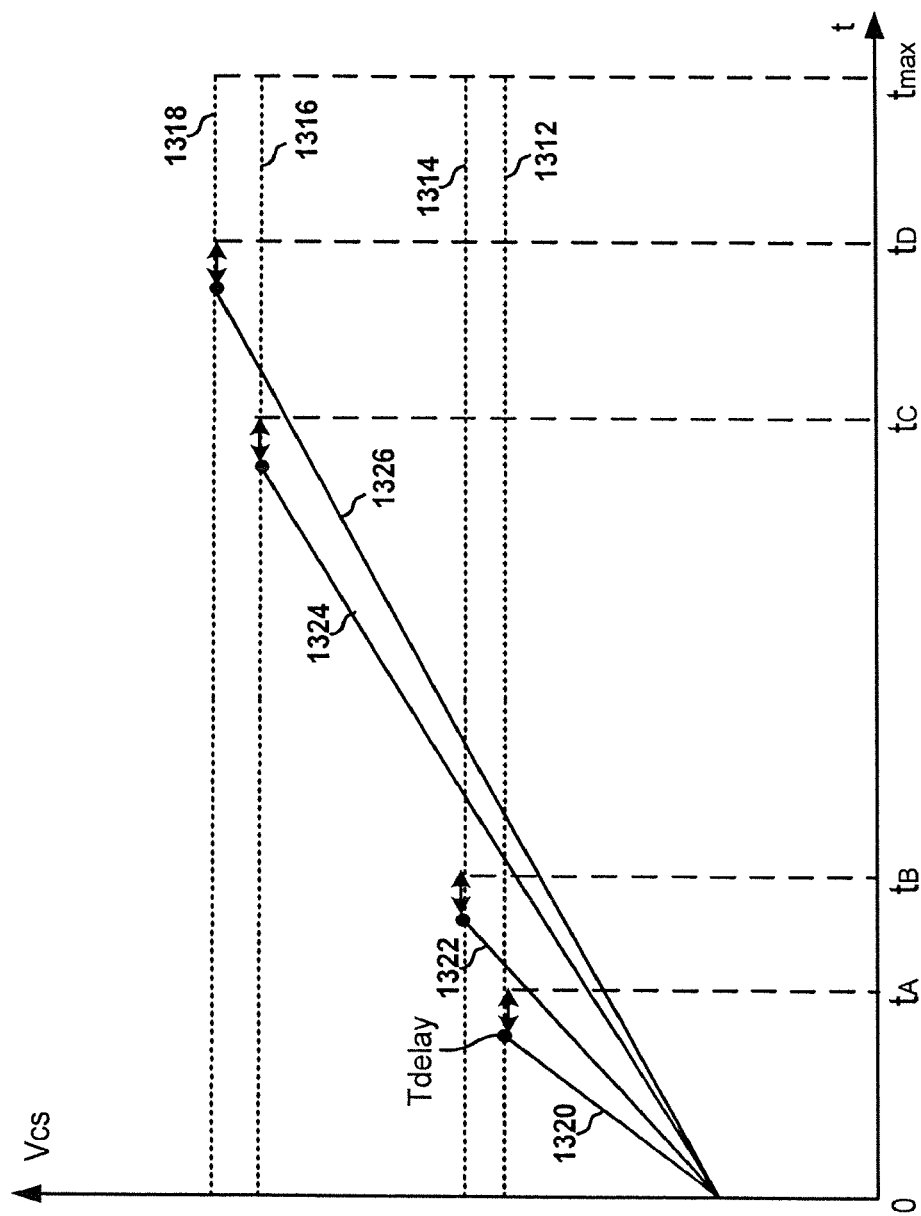

A self-adjustment compensation scheme can be implemented to reduce sub-harmonic oscillation in order to keep the maximum output power consistent for a wide range of bulk voltages, as shown in FIG. 13(a) and FIG. 13(b), according to some embodiments of the present invention.

FIG. 13(a) is a simplified diagram showing the over-current threshold signal 2512 as a function of time within a switching period according to one embodiment of the present invention. This diagram is merely an example, which should not unduly limit the scope of the claims. One of ordinary skill in the art would recognize many variations, alternatives, and modifications.

In one embodiment, the waveform 1312 represents the over-current threshold signal 2512 (e.g., $V_{th\_oc}$) as a function of time within the switching period $T_1$, and the time within the switching period $T_1$ is set to zero at the beginning of the on-time period of the switching period $T_1$. In another embodiment, the waveform 1314 represents the over-current threshold signal 2512 (e.g., $V_{th\_oc}$) as a function of time within the switching period $T_2$, and the time within the switching period $T_2$ is set to zero at the beginning of the on-time period of the switching period $T_2$. In yet another embodiment, the waveform 1316 represents the over-current threshold signal 2512 (e.g., $V_{th\_oc}$) as a function of time within the switching period $T_3$, and the time within the switching period $T_3$ is set to zero at the beginning of the on-time period of the switching period $T_3$. In yet another embodiment, the waveform 1318 represents the over-current threshold signal 2512 (e.g., $V_{th\_oc}$) as a function of time within the switching period $T_4$, and the time within the switching period $T_4$ is set to zero at the beginning of the on-time period of the switching period $T_4$.

For example, the switching periods $T_1$, $T_2$, $T_3$, and $T_4$ are equal in magnitude, even though they correspond to different switching cycles. In another example, the switching periods $T_1$, $T_2$, $T_3$, and $T_4$ are not equal in magnitude, and they correspond to different switching cycles. In yet another example, the waveforms 1312, 1314, 1316 and 1318 correspond to bulk voltages $V_{in1}$, $V_{in2}$, $V_{in3}$ and $V_{in4}$ respectively. In yet another example, the over-current threshold signal 2512 (e.g., $V_{th\_oc}$) is proportional to a current threshold ($I_{th\_oc}$) of the power converter 2500.

According to one embodiment, as shown in FIG. 13(a), for a particular on-time period, the over-current threshold signal 2512 (e.g., $V_{th\_oc}$) does not change with time between 0 (e.g., the beginning of the on-time period) and a maximum time (e.g., $t_{max}$), e.g., as shown by the waveform 1312, 1314, 1316 or 1318. The value of the over-current threshold signal 2512 (e.g., $V_{th\_oc}$) varies in different on-time periods to compensate for the effects of "delay to output," according to certain embodiments. For example, the value of the over-current threshold signal 2512 is determined according to the following equation:

$$V_{th\_oc}(n+1)=(1-\alpha)\times V_{th\_oc}(n)+\alpha\times(V_{ocp\_1}+k_{ocp}\times D(n)) \quad \text{(Equation 9)}$$

where $V_{th\_oc}(n+1)$ represents the value of the over-current threshold signal 2512 for an on-time period within a switching period $T_{sw}(n+1)$, $V_{th\_oc}(n)$ represents the value of the over-current threshold signal 2512 for an on-time period within a previous switching period $T_{sw}(n)$, $k_{ocp}$ represents a constant, $D(n)$ represents duty cycle of the previous switching period $T_{sw}(n)$, $V_{ocp\_1}$ represents a minimum value of the over-current threshold signal 2512, and $\alpha$ represents a coefficient (e.g., $\alpha \leq 1$). In another example, if $\alpha=1$, the magnitude of the over-current threshold signal 2512 is determined according to the following equation:

$$V_{th\_oc}(n+1)=V_{ocp\_1}+D(n)\times k_{ocp} \quad \text{(Equation 10)}$$

According to Equation 9 and Equation 10, the value of the over-current threshold signal 2512 for a particular on-time period in a switching period is affected by duty cycles of one or more preceding switching periods, in some embodiments. For example, the larger the duty cycles of one or more preceding switching periods are, the larger the value of the over-current threshold signal 2512 for the switching period becomes. In another example, the value of the over-current threshold signal 2512 (e.g., $V_{th\_oc}(n+1)$) is equal to or larger than the minimum value of the over-current threshold signal 2512 (e.g., Vocp_1), and is equal to or smaller than the maximum value of the over-current threshold signal 2512 (e.g., $V_{ocp\_h}$). In yet another example, $k_{ocp}$ can be determined as a positive slope of an over-current threshold signal with respect to time under the DCM mode. $k_{ocp}$ can be adjusted from such a slope in certain embodiments. In yet another example, after the maximum time (e.g., $t_{max}$), the system 2500 operates in an off-time period of the switching period.

FIG. 13(b) is a simplified diagram showing determination of an on-time period using the over-current threshold signal 2512 as a function of time within a switching period as shown in FIG. 13(a) according to one embodiment of the present invention. This diagram is merely an example, which should not unduly limit the scope of the claims. One of ordinary skill in the art would recognize many variations, alternatives, and modifications.

In one embodiment, the waveform 1312 represents the over-current threshold signal 2512 (e.g., $V_{th\_oc}$) as a function of time within the switching period $T_1$, and the waveform 1320 represents the current sensing signal 2514 (e.g., $V_{CS}$) as a function of time within the switching period $T_1$. In another embodiment, the waveform 1314 represents the over-current threshold signal 2512 (e.g., $V_{th\_oc}$) as a function of time within the switching period $T_2$, and the waveform 1322 represents the current sensing signal 2514 (e.g., $V_{CS}$) as a function of time within the switching period $T_2$.

In yet another embodiment, the waveform 1316 represents the over-current threshold signal 2512 (e.g., $V_{th\_oc}$) as a function of time within the switching period $T_3$, and the waveform 1324 represents the current sensing signal 2514 (e.g., $V_{CS}$) as a function of time within the switching period $T_3$. In yet another embodiment, the waveform 1318 represents the over-current threshold signal 2512 (e.g., $V_{th\_oc}$) as a function of time within the switching period $T_4$, and the waveform 1326 represents the current sensing signal 2514 (e.g., $V_{CS}$) as a function of time within the switching period $T_4$.

The waveforms 1320, 1322, 1324 and 1326 represent the current sensing signal 2514 (e.g., $V_{CS}$) as a function of time corresponding to the bulk voltages $V_{in1}$, $V_{in2}$, $V_{in3}$ and $V_{in4}$ respectively. For example, the slopes shown in the waveforms 1320, 1322, 1324 and 1326 are $S_1$, $S_2$, $S_3$, and $S_4$ respectively. In another example, the current sensing signal 2514 (e.g., $V_{CS}$) is proportional to the current 2572 flowing through the primary winding 2560 of the power converter 2500.

According to one embodiment, with respect to a particular bulk voltage, the current sensing signal 2514 (e.g., $V_{CS}$) increases with time (e.g., as shown by the waveforms 1320, 1322, 1324 and 1326). As shown in FIG. 13(b), the slope of the current sensing signal 2514 (e.g., $V_{CS}$) with respect to time increases with the bulk voltage, in some embodiments. For example, $V_{in1} > V_{in2} > V_{in3} > V_{in4}$, and correspondingly $S_1 > S_2 > S_3 > S_4$. In another example, when the current sensing signal 2514 (e.g., $V_{CS}$) exceeds in magnitude the over-current threshold signal 2512 (e.g., as shown by the waveform 1320, 1322, 1324 or 1326), the over-current protection is triggered. In yet another example, during $T_{delay}$ (e.g., the "delay to output"), the current sensing signal 2514 (e.g., $V_{CS}$) continues to increase in magnitude. In yet another example, at the end of $T_{delay}$, the switch is opened (e.g., turned off), and the current sensing signal 2514 (e.g., $V_{CS}$) reaches its maximum magnitude. The end of $T_{delay}$ is the end of an on-time period of the switch 2540 during a switching period, in some embodiments. For example, the end of $T_{delay}$ for the bulk voltage $V_{in1}$ corresponds to a time $t_A$, the end of $T_{delay}$ for the bulk voltage $V_{in2}$ corresponds to a time $t_B$, the end of $T_{delay}$ for the bulk voltage $V_{in3}$ corresponds to a time $t_C$, and the end of $T_{delay}$ for the bulk voltage $V_{in4}$ corresponds to a time $t_D$. In another example, $t_A$, $t_B$, $t_C$, and $t_D$ represent the ends of the on-time periods for the switching periods $T_1$, $T_2$, $T_3$, and $T_4$ respectively.

Figure 14A:
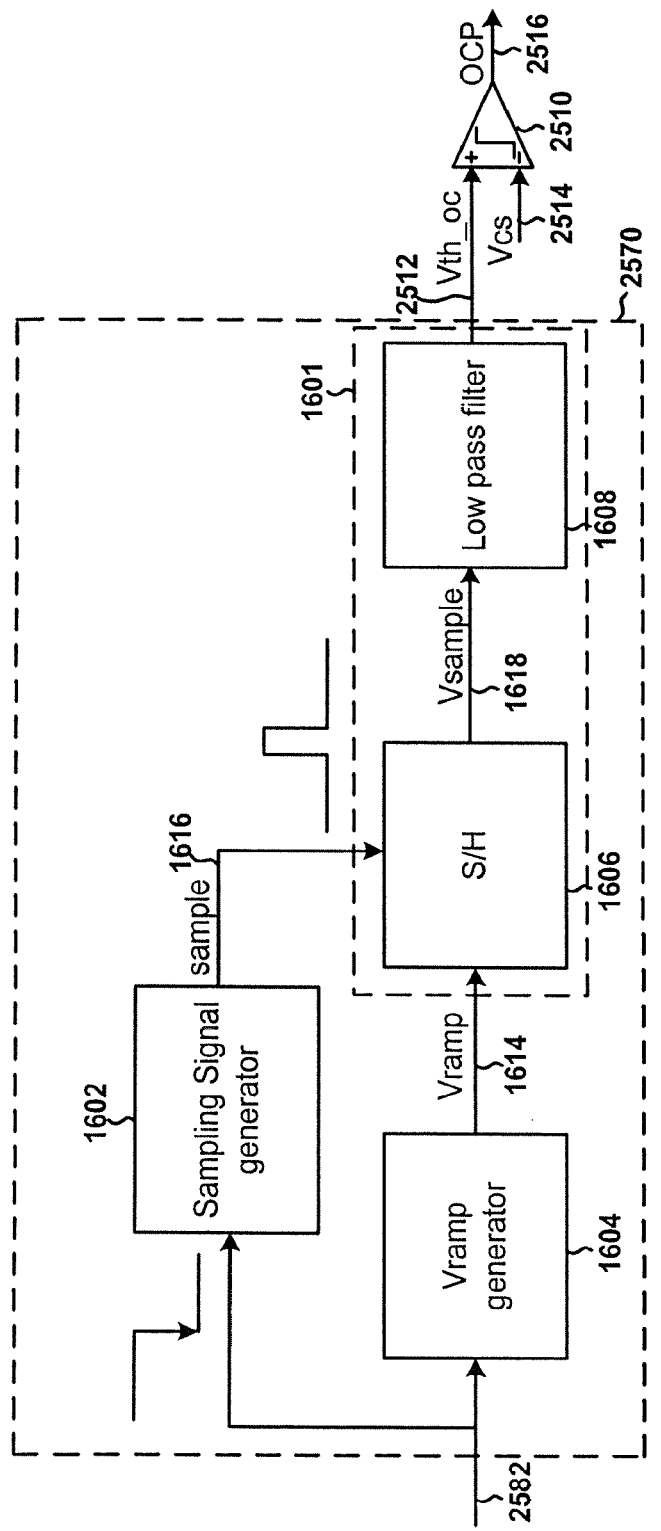
FIG. 14(a) is a simplified diagram showing certain components of the power converter as shown in FIG. 12 with over-current protection according to one embodiment of the present invention.

FIG. 14(a) is a simplified diagram showing certain components of the power converter 2500 with over-current protection according to one embodiment of the present invention. This diagram is merely an example, which should not unduly limit the scope of the claims. One of ordinary skill in the art would recognize many variations, alternatives, and modifications. The over-current-threshold signal generator 2570 includes a sampling signal generator 1602, a signal generator 1604, and a signal processing component 1601. For example, the signal processing component 1601 includes a sample-and-hold component 1606 and a low pass filter 1608. In another example, the sample-and-hold component 1606 and the low pass filter 1608 share one or more components. In yet another example, the over-current-protection scheme is implemented according to FIG. 13(a) and FIG. 13(b).

According to one embodiment, during a switching period, the signal generator 1604 receives the signal 2582 (e.g., the PWM signal 2522 or the gate drive signal 2584), and generates a ramping signal 1614 based on the duty cycle of the signal 2582 in the switching period. For example, the sampling signal generator 1602 receives the signal 2582, and generates a sampling signal 1616. In another example, the sampling signal generator 1602 outputs a pulse in the sampling signal 1616 upon a falling edge of the signal 2582. In yet another example, the sample-and-hold component 1606 samples the ramping signal 1614 during the pulse of the sampling signal 1616 and holds a magnitude of the ramping signal 1614 (e.g., at the end of the pulse) during the rest of the switching period until a next pulse. In yet another example, the low pass filter 1608 performs low-pass filtering of a signal 1618 generated by the sample-and-hold component 1606 and outputs the over-current threshold signal 2512 to the OCP comparator 2510. In yet another example, the OCP comparator 2510 also receives the current sensing signal 2514 and outputs the over-current control signal 2516. In yet another example, the over-current threshold signal 2512 is determined according to Equation 9, where $\alpha$ is associated with the low pass filter 1608.

In one embodiment, the ramping signal 1614 is associated with a ramp-up process and a ramp-down process. For example, during the ramp-up process, the ramping signal 1614 increases in magnitude from a minimum value to a maximum value, and during the ramp-down process, the ramping signal 1614 decreases in magnitude from the maximum value to the minimum value. In another example, the ramp-up process and/or the ramp-down process occurs instantaneously or during a time period. In another embodiment, the ramping signal 1614 is associated with a ramp-up process, a constant process and a ramp-down process. For example, during the ramp-up process, the ramping signal 1614 increases in magnitude from a minimum value to a maximum value; during the constant process, the ramping signal 1614 keeps at the maximum value; and during the ramp-down process, the ramping signal 1614 decreases in magnitude from the maximum value to the minimum value. In another example, the ramp-up process, the constant process, and/or the ramp-down process occurs instantaneously or during a time period. In yet another embodiment, the ramping signal 1614 is associated with a ramp-up process, a first constant process, a ramp-down process, and a second constant process. For example, during the ramp-up process, the ramping signal 1614 increases in magnitude from a minimum value to a maximum value, and during the first constant process, the ramping signal 1614 keeps at the maximum value. In another example, during the ramp-down process, the ramping signal 1614 decreases in magnitude from the maximum value to the minimum value, and during the second constant process, the ramping signal 1614 keeps at the minimum value. In yet another example, the ramp-up process, the first constant process, the ramp-down process and/or the second constant process occurs instantaneously or during a time period.

Figure 14B:
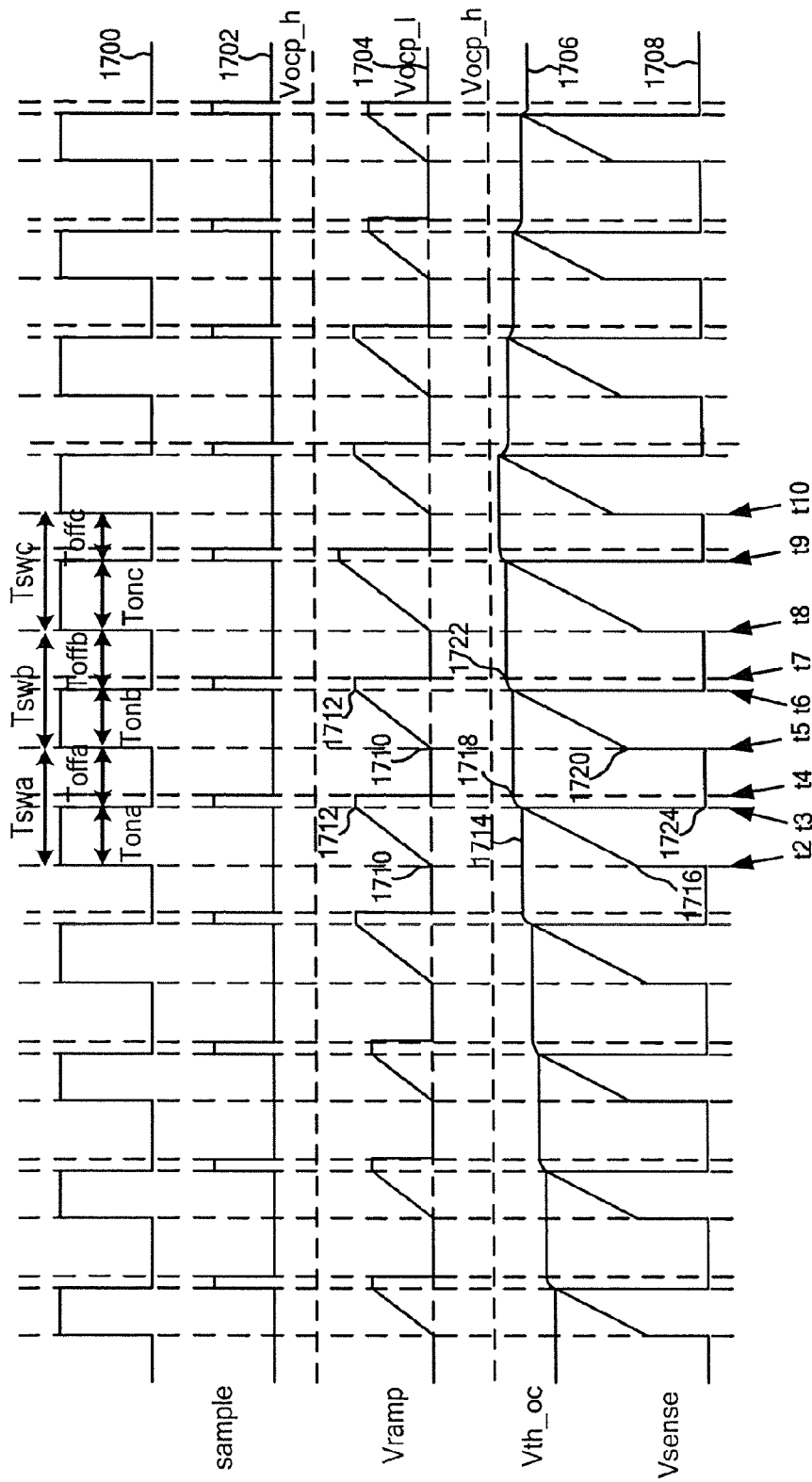
FIG. 14(b) is a simplified timing diagram for the power converter as shown in FIG. 14(a) according to one embodiment of the present invention.

FIG. 14(b) is a simplified timing diagram for the power converter 2500 including components as shown in FIG. 14(a) according to one embodiment of the present invention. This diagram is merely an example, which should not unduly limit the scope of the claims. One of ordinary skill in the art would recognize many variations, alternatives, and modifications. The waveform 1700 represents the signal 2582 as a function of time, the waveform 1702 represents the sampling signal 1616 as a function of time, the waveform 1704 represents the ramping signal 1614 as a function of time, the waveform 1706 represents the over-current threshold signal 2512 (e.g., $V_{th\_oc}$) as a function of time, and the waveform 1708 represents the current sensing signal 2514 as a function of time.

For example, the waveform 1706 represents the over-current threshold signal 2512 (e.g., $V_{th\_oc}$) as a function of time, which includes the over-current threshold signal 2512 (e.g., $V_{th\_oc}$) as a function of time within a switching period $T_{swa}$, the over-current threshold signal 2512 (e.g., $V_{th\_oc}$) as a function of time within a switching period $T_{swb}$, and a over-current threshold signal 2512 (e.g., $V_{th\_oc}$) as a function of time within the switching period $T_{swc}$. In another example, the waveform 1708 represents the current sensing signal 2514 as a function of time, which includes the current sensing signal 2514 as a function of time within the switching period $T_{swa}$, the current sensing signal 2514 as a function of time within the switching period $T_{swb}$, and the current sensing signal 2514 as a function of time within the switching period $T_{swc}$. For example, the switching periods $T_{swa}$, $T_{swb}$, and $T_{swc}$ are equal in magnitude, even though they correspond to different switching cycles.

For example, as shown in FIG. 14(b), the switching period $T_{swa}$ includes an off-time period $T_{offa}$ and an on-time period $T_{ona}$, a switching period $T_{swb}$ includes an off-time period $T_{offb}$ and an on-time period $T_{onb}$, and a switching period $T_{swc}$ includes an off-time period $T_{offc}$ and an on-time period $T_{onc}$. The on-time period $T_{ona}$ starts at the time $t_2$ and ends at time $t_3$, the off-time period $T_{offa}$ starts at the time $t_3$ and ends at time $t_5$, and the switching period $T_{swa}$ starts at the time $t_2$ and ends at the time $t_5$. The on-time period $T_{onb}$ starts at the time $t_5$ and ends at time $t_6$, the off-time period $T_{offb}$ starts at the time $t_6$ and ends at time $t_8$, and the switching period $T_{swb}$ starts at the time $t_5$ and ends at the time $t_8$. The on-time period $T_{onc}$ starts at the time $t_8$ and ends at time $t_9$, the off-time period $T_{offc}$ starts at the time $t_9$ and ends at time $t_{10}$, and the switching period $T_{swc}$ starts at the time $t_8$ and ends at the time $t_{10}$. In yet another example, $t_2 \leq t_3 \leq t_4 \leq t_5 \leq t_6 \leq t_7 \leq t_8 \leq t_9 \leq t_{10}$.

According to one embodiment, during the on-time period $T_{ona}$, the signal 2582 keeps at a logic high level (e.g., as shown by the waveform 1700). For example, the ramping signal 1614 increases from a magnitude 1710 (e.g., at $t_2$) to a magnitude 1712 (e.g., at $t_3$), as shown by the waveform 1704. In another example, the over-current threshold signal 2512 (e.g., $V_{th\_oc}$) keeps at a magnitude 1714 during the on-time period $T_{ona}$ (e.g., as shown by the waveform 1706). In yet another example, the current sensing signal 2514 increases from a magnitude 1716 (e.g., at $t_2$), as shown by the waveform 1708. Once the current sensing signal 2514 exceeds the magnitude 1714 (e.g., at $t_3$), the over-current protection is triggered, in some embodiments. For example, the OCP comparator 2510 changes the over-current control signal 2516 from a logic high level to a logic low level. In another example, then the current sensing signal 2514 decreases to a magnitude 1724 (e.g., 0 at $t_3$) and keeps at the magnitude 1724 during the off-time period $T_{offa}$ (e.g., as shown by the waveform 1708).

According to another embodiment, at a falling edge of the signal 2582 (e.g., at $t_3$), a pulse is generated in the sampling signal 1616 (e.g., as shown by the waveform 1702). For example, the pulse starts at the time $t_3$ and ends at the time $t_4$. In another example, the sample-and-hold component 1606 samples the ramping signal 1614 during the pulse and in response, the over-current threshold signal 2512 (e.g., $V_{th\_oc}$) changes from the magnitude 1714 (e.g., at $t_3$) to a magnitude 1718 (e.g., at $t_4$), as shown by the waveform 1706. In yet another example, the signal 1614 keeps at the magnitude 1712 during the pulse, and decreases to the magnitude 1710 (e.g., $V_{ocp\_1}$) at the end of the pulse (e.g., at $t_4$), as shown by the waveform 1704. In yet another example, during the time period between $t_4$ and $t_5$, the signal 1614 keeps at the magnitude 1710 (e.g., $V_{ocp\_1}$) as shown by the waveform 1704, and the over-current threshold signal 2512 (e.g., $V_{th\_oc}$) keeps at the magnitude 1718 as shown by the waveform 1706.

According to yet another embodiment, during the on-time period $T_{onb}$, the signal 2582 keeps at the logic high level (e.g., as shown by the waveform 1700). For example, the ramping signal 1614 increases from the magnitude 1710 (e.g., at $t_5$) to the magnitude 1712 (e.g., at $t_6$), as shown by the waveform 1704. In another example, the over-current threshold signal 2512 (e.g., $V_{th\_oc}$) keeps at the magnitude 1718 during the on-time period $T_{onb}$ (e.g., as shown by the waveform 1706). In yet another example, the current sensing signal 2514 increases from a magnitude 1720 (e.g., at $t_5$), as shown by the waveform 1708. Once the current sensing signal 2514 exceeds the magnitude 1718 (e.g., at $t_6$), the over-current protection is triggered, in some embodiments. For example, the OCP comparator 2510 changes the over-current control signal 2516 from the logic high level to the logic low level. In another example, the current sensing signal 2514 decreases again to the magnitude 1724 (e.g., 0 at $t_6$) and keeps at the magnitude 1724 during the off-time period $T_{offb}$ (e.g., as shown by the waveform 1708).

According to another embodiment, at another falling edge of the signal 2582 (e.g., at $t_6$), another pulse is generated in the sampling signal 1616 (e.g., as shown by the waveform 1702). For example, the pulse starts at the time $t_6$ and ends at the time $t_7$. In another example, the sample-and-hold component 1606 samples the ramping signal 1614 during the pulse and in response, the over-current threshold signal 2512 (e.g., $V_{th\_oc}$) changes from the magnitude 1718 (e.g., at $t_6$) to a magnitude 1722 (e.g., at $t_7$), as shown by the waveform 1706. In yet another example, the signal 1614 keeps at the magnitude 1712 during the pulse, and decreases to the magnitude 1710 (e.g., $V_{ocp\_1}$) at the end of the pulse (e.g., at $t_7$), as shown by the waveform 1704. In yet another example, during the time period between $t_7$ and $t_8$, the signal 1614 keeps at the magnitude 1720 (e.g., $V_{ocp\_1}$) as shown by the waveform 1704. In yet another example, during the time period between $t_7$ and $t_9$, the over-current threshold signal 2512 (e.g., $V_{th\_oc}$) keeps at the magnitude 1722 as shown by the waveform 1706.

As described above, for a particular switching period (e.g., $T_{swc}$), the over-current threshold signal 2512 (e.g., $V_{th\_oc}$) keeps at a particular magnitude (e.g., the magnitude 1722) during the on-time period (e.g., $T_{onc}$ from $t_7$ to $t_9$), and the particular magnitude (e.g., the magnitude 1722) is affected by duty cycles of one or more preceding switching periods (e.g., $T_{ona}$ and $T_{onb}$), in certain embodiments. For example, the over-current threshold signal 2512 (e.g., $V_{th\_oc}$) changes in magnitude with switching period (e.g., from the magnitude 1718 in the switching period $T_{swb}$ to the magnitude 1722 in the subsequent switching period $T_{swc}$). In another example, the magnitudes 1714, 1718 and 1722 of the over-current threshold signal 2512 (e.g., $V_{th\_oc}$) can be determined based on Equation 9.

Figure 14C:
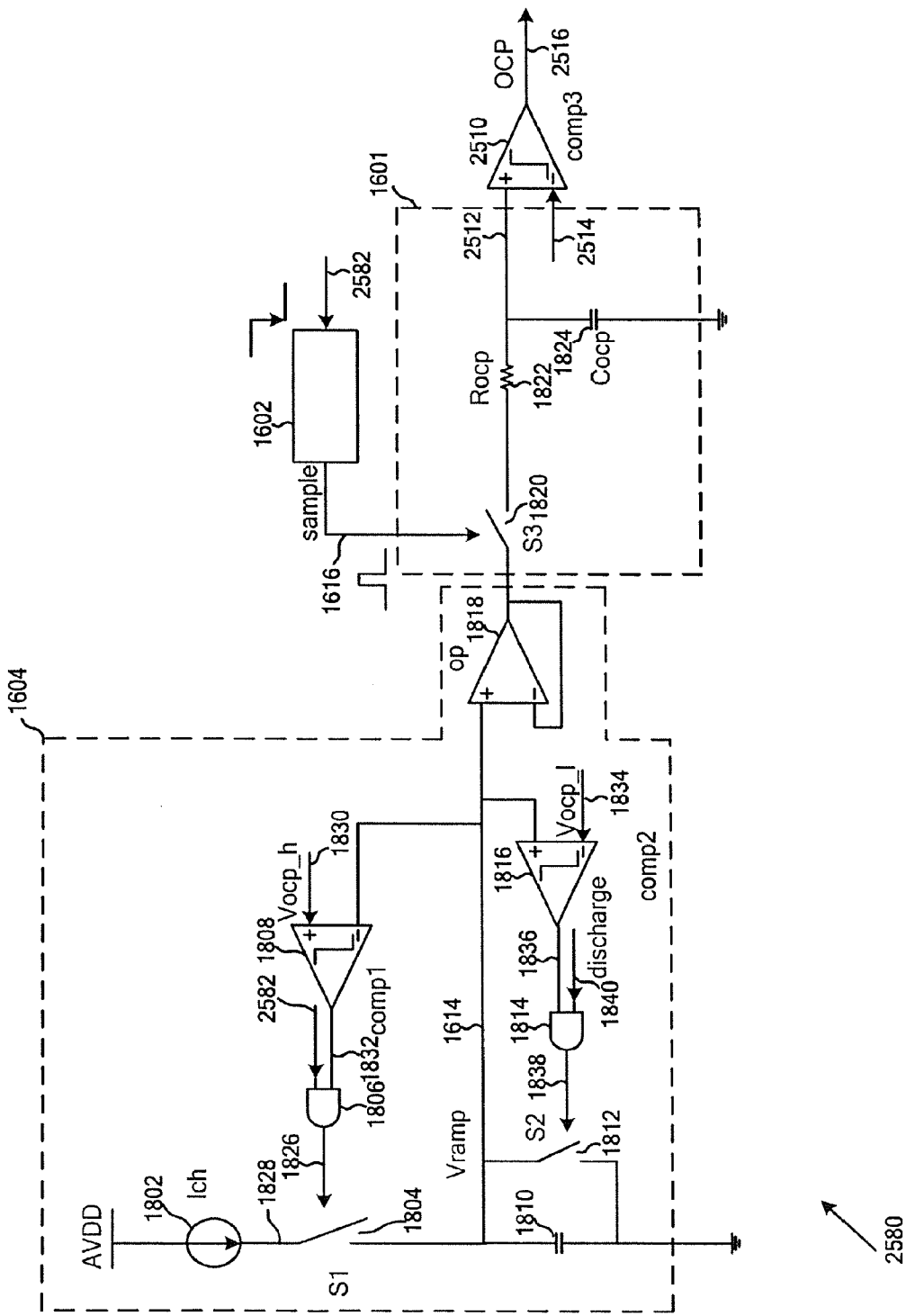
FIG. 14(c) is a simplified diagram showing certain components of the power converter as shown in FIG. 14(a) according to one embodiment of the present invention.

FIG. 14(c) is a simplified diagram showing certain components of the power converter 2500 that includes components as shown in FIG. 14(a) according to one embodiment of the present invention. This diagram is merely an example, which should not unduly limit the scope of the claims. One of ordinary skill in the art would recognize many variations, alternatives, and modifications. The signal generator 1604 includes a current source 1802, switches 1804 and 1812, AND gates 1806 and 1814, comparators 1808 and 1816, a capacitor 1810, and an operational amplifier 1818. The signal processing component 1601 includes a switch 1820, a resistor 1822 and a capacitor 1824. For example, the sample-and-hold component 1606 includes the switch 1820 and the capacitor 1824. In another example, the low pass filter 1608 includes the resistor 1822 and the capacitor 1824.

As shown in FIG. 14(c), the AND gate 1806 receives the signal 2582 and a signal 1832 from the comparator 1808, and outputs a signal 1826 at a logic high level if both the signal 2582 and the signal 1832 are at the logic high level, in some embodiments. For example, the switch 1804 (e.g., S1) is closed (e.g., being turned on) in response to the signal 1826 being at the logic high level. In another example, a current 1828 flowing from the current source 1802 through the switch 1804 to charge the capacitor 1810, and in response the ramping signal 1614 (e.g., $V_{ramp}$) increases in magnitude. In yet another example, if the ramping signal 1614 exceeds a reference signal 1830 (e.g., $V_{ocp\_h}$) in magnitude, the comparator 1808 outputs a signal 1832 at a logic low level, and the AND gate 1806 changes the signal 1826 to the logic low level to open (e.g., turn off) the switch 1804 so as to stop charging that the capacitor 1810. In yet another example, after the ramping signal 1614 is sampled during a pulse in the sampling signal 1616 (e.g., sample), the AND gate 1814 receives a discharging signal 1840 at the logic high level, and outputs a signal 1838 at the logic high level if the signal 1836 from the comparator 1816 is at the logic high level. In yet another example, in response to the signal 1838 being at the logic high level, the switch 1812 (e.g., S2) is closed (e.g., being turned on) to discharge the capacitor 1810 and the ramping signal 1614 decreases in magnitude. In yet another example, if the ramping signal 1614 reaches a reference signal 1834 (e.g., $V_{ocp\_1}$) in magnitude, the comparator 1816 changes the signal 1836 to the logic low level and in response the AND gate 1814 changes the signal 1838 to the logic low level to open (e.g., turn off) the switch 1812 so as to stop discharging the capacitor 1810. In yet another example, the operational amplifier 1818 serves as a buffer.

According to one embodiment, the sampling signal generator 1602 receives the signal 2582 and outputs a pulse in the sampling signal 1616 upon a falling edge of the signal 2582. For example, the switch 1820 (e.g., S3) is closed in response to the pulse. In another example, the signal processing component 1601 samples and holds the ramping signal 1614, and performs low-pass filtering. In yet another example, the OCP comparator 2510 compares the over-current threshold signal 2512 with the current sensing signal 2514, and outputs the over-current control signal 2516. In yet another example, the over-current control signal 2516 is at the logic high level if the over-current threshold signal 2512 is larger than the current sensing signal 2514 in magnitude, and the over-current control signal 2516 changes to the logic low level to trigger the over-current protection if the current sensing signal 2514 reaches or exceeds the over-current threshold signal 2512 in magnitude.

Referring to Equation 9, the coefficient α is determined as follows, according to some embodiments:

$$\alpha = 1 - e^{-\frac{T_{oneshot}}{R_{ocp} \times C_{ocp}}} \quad \text{(Equation 11)}$$

where $R_{cop}$ represents a resistance of the resistor 1822, $T_{oneshot}$ represents a pulse width of the pulse generated in the sampling signal 1616, and $C_{ocp}$ represents a capacitance of the capacitor 1824. For example, if $R_{ocp} \times C_{ocp} \gg T_{oneshot}$, then $$\alpha = \frac{T_{oneshot}}{R_{ocp} \times C_{ocp}} \quad \text{(Equation 12)}$$

Figure 15A:
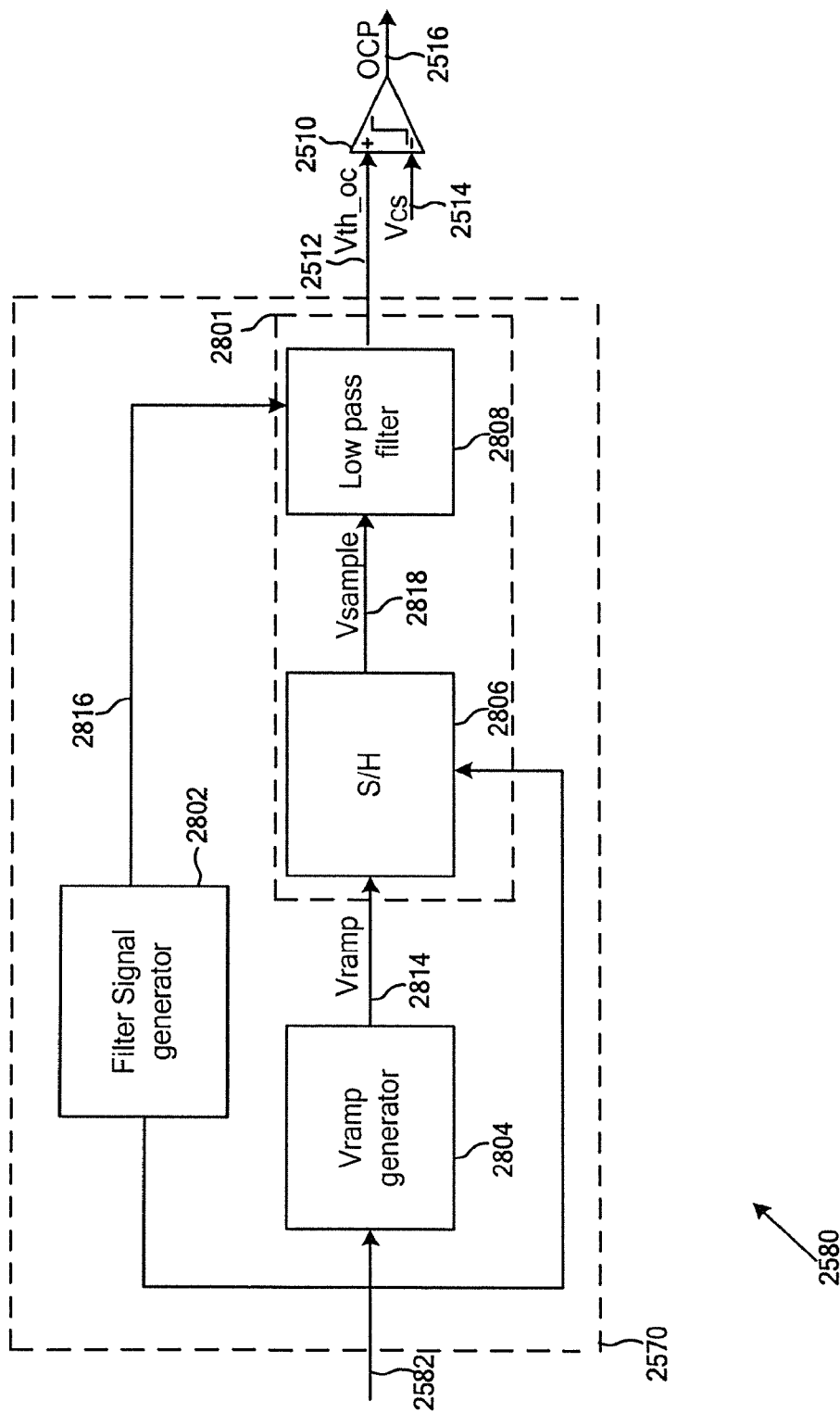
FIG. 15(a) is a simplified diagram showing certain components of the power converter as shown in FIG. 12 with over-current protection according to another embodiment of the present invention.

FIG. 15(a) is a simplified diagram showing certain components of the power converter 2500 with over-current protection according to another embodiment of the present invention. This diagram is merely an example, which should not unduly limit the scope of the claims. One of ordinary skill in the art would recognize many variations, alternatives, and modifications. The over-current-threshold signal generator 2570 includes a filter signal generator 2802, a signal generator 2804, and a signal processing component 2801. For example, the signal processing component 2801 includes a sample-and-hold component 2806 and a low pass filter 2808. In another example, the sample-and-hold component 2806 and the low pass filter 2808 share one or more components. In yet another example, the over-current-protection scheme is implemented according to FIG. 13(a) and FIG. 13(b). In yet another example, the signal generator 2804 is the same as the signal generator 1604.

According to one embodiment, during a switching period, the signal generator 2804 receives the signal 2582 (e.g., the PWM signal 2522 or the gate drive signal 2584), and generates a ramping signal 2814 based on the duty cycle of the signal 2582 in the switching period. For example, the filter signal generator 2802 receives the signal 2582, and outputs a filter signal 2816 to the low pass filter 2808. In another example, the sample-and-hold component 2806 samples and holds the ramping signal 2814 when the signal 2582 is at the logic high level. In yet another example, when the signal 2582 changes to the logic low level, the low pass filter 2808 performs low-pass filtering of a signal 2818 generated by the sample-and-hold component 2806 and outputs the over-current threshold signal 2512 to the OCP comparator 2510. In yet another example, the OCP comparator 2510 also receives the current sensing signal 2514 and outputs the over-current control signal 2516. In yet another example, the over-current threshold signal 2512 is determined according to Equation 9, where α is associated with the low pass filter 2808.

Figure 15B:
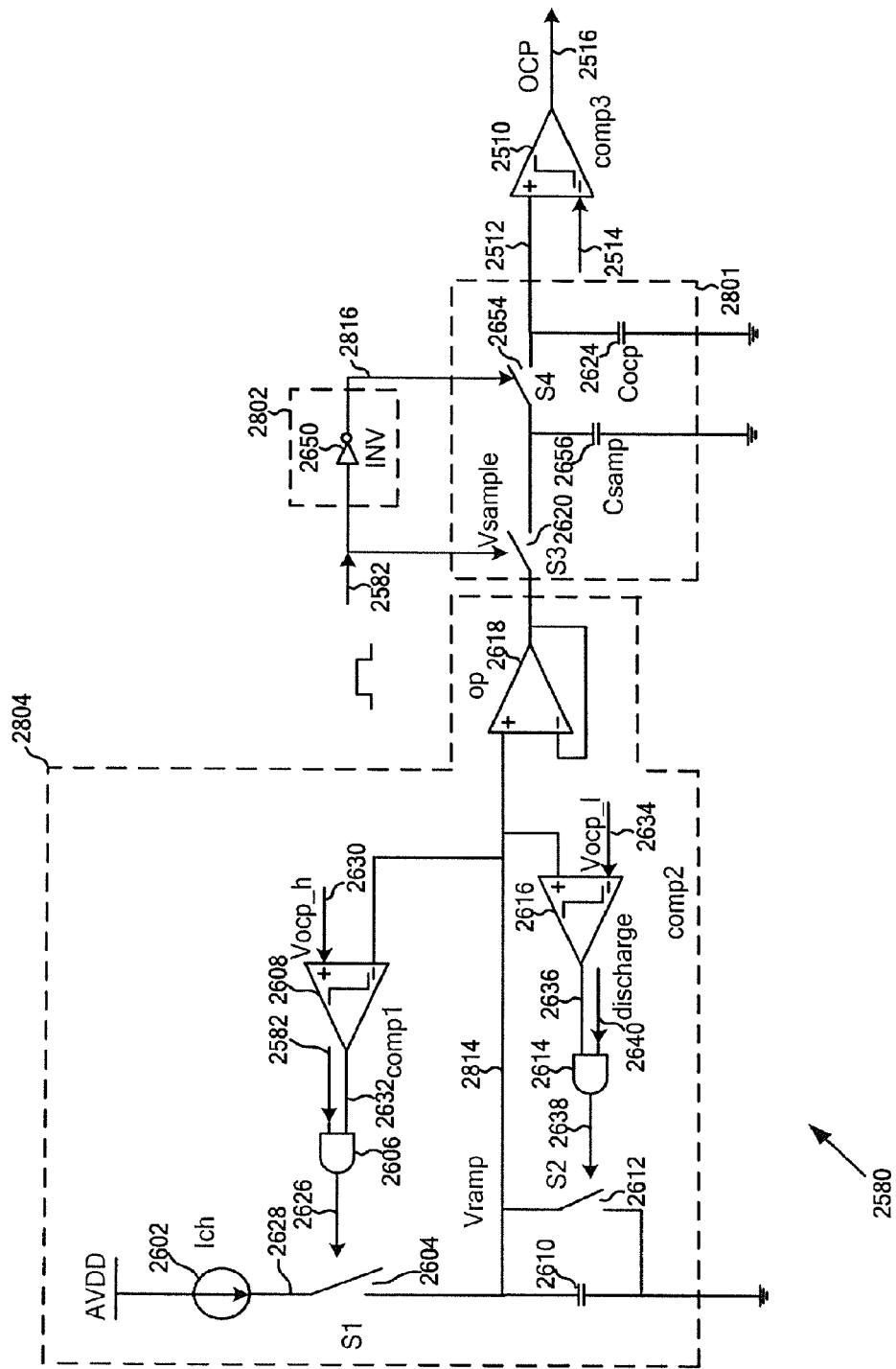
FIG. 15(b) is a simplified diagram showing certain components of the power converter as shown in FIG. 15(a) according to another embodiment of the present invention.

FIG. 15(b) is a simplified diagram showing certain components of the power converter 2500 that includes components as shown in FIG. 15(a) according to another embodiment of the present invention. This diagram is merely an example, which should not unduly limit the scope of the claims. One of ordinary skill in the art would recognize many variations, alternatives, and modifications. The signal generator 2804 includes a current source 2602, switches 2604 and 2612, AND gates 2606 and 2614, comparators 2608 and 2616, a capacitor 2610, and an operational amplifier 2618. The signal processing component 2801 includes switches 2620 and 2654, and capacitors 2624 and 2656. The filter signal generator 2802 includes a NOT gate 2650. For example, the switch 2620 and the capacitor 2656 are included in the sample-and-hold component 2806. In another example, the capacitor 2656, the switch 2654 and the capacitor 2624 are included in the low pass filter 2808. In yet another example, the current source 2602, the switches 2604 and 2612, the AND gates 2606 and 2614, the comparators 2608 and 2616, the capacitor 2610, the operational amplifier 2618, and the switch 2620 are the same as the current source 1802, the switches 1804 and 1812, the AND gates 1806 and 1814, the comparators 1808 and 1816, the capacitor 1810, the operational amplifier 1818, and the switch 1820, respectively.

As shown in FIG. 15(b), the AND gate 2606 receives the signal 2582 and a signal 2632 from the comparator 2608, and outputs a signal 2626 at a logic high level if both the signal 2582 and the signal 2632 are at the logic high level, in some embodiments. For example, the switch 2604 (e.g., S1) is closed (e.g., being turned on) in response to the signal 2626 being at the logic high level. In another example, a current 2628 flowing from the current source 2602 through the switch 2604 to charge the capacitor 2610, and in response the ramping signal 2814 (e.g., $V_{ramp}$) increases in magnitude. In yet another example, if the ramping signal 2814 exceeds a reference signal 2630 (e.g., $V_{ocp\_h}$) in magnitude, the comparator 2608 outputs a signal 2632 at a logic low level, and the AND gate 2606 changes the signal 2626 to the logic low level to open (e.g., turn off) the switch 2604 so as to stop charging that the capacitor 2610. In yet another example, after the ramping signal 2814 is sampled, the AND gate 2614 receives a discharging signal 2640 at the logic high level, and outputs a signal 2638 at the logic high level if the signal 2636 from the comparator 2616 is at the logic high level. In yet another example, in response to the signal 2638 being at the logic high level, the switch 2612 (e.g., S2) is closed (e.g., being turned on) to discharge the capacitor 2610 and the ramping signal 2814 decreases in magnitude. In yet another example, if the ramping signal 2814 reaches a reference signal 2634 (e.g., $V_{ocp\_1}$) in magnitude, the comparator 2616 changes the signal 2636 to the logic low level and in response the AND gate 2614 changes the signal 2638 to the logic low level to open (e.g., turn off) the switch 2612 so as to stop discharging the capacitor 2610.

According to one embodiment, the filter signal generator 2802 receives the signal 2582 and outputs the filter signal 2816. For example, when the signal 2582 is at the logic high level (e.g., during an on-time period), the switch 2620 is closed (e.g., being turned on), and the switch 2654 is open (e.g., being turned off) in response to the signal 2816. In another example, the capacitor 2656 is charged in response to the ramping signal 2814 which is tracked through the operational amplifier 2618. In yet another example, when the signal 2582 changes to the logic low level (e.g., upon a falling edge of the signal 2582), the switch 2620 is open (e.g., being turned off), and the switch 2654 is closed (e.g., being turned on) in response to the signal 2816. In yet another example, a magnitude of the ramping signal 2814 is stored in the capacitor 2656 and transferred to the capacitor 2624 to generate the over-current threshold signal 2512 (e.g., $V_{th\_oc}$). In yet another example, the filter signal 2816 is at the logic high level when the signal 2582 is at the logic low level, and the filter signal 2816 is at the logic low level when the signal 2582 is at the logic high level.

Referring to Equation 9, the coefficient α is determined as follows, according to some embodiments:

$$\alpha = \frac{C_{samp}}{C_{samp} + C_{ocp}} \qquad \text{(Equation 13)}$$

where $C_{samp}$ represents a capacitance of the capacitor 2656 and $C_{ocp}$ represents a capacitance of the capacitor 2624.

FIG. 16(*a*) is a simplified diagram showing certain components of the power converter 2500 with over-current protection according to another embodiment of the present invention. This diagram is merely an example, which should not unduly limit the scope of the claims. One of ordinary skill in the art would recognize many variations, alternatives, and modifications. The over-current-threshold signal generator 2570 includes a sampling signal generator 1902, a signal generator 1904, a signal processing component 1901, a duty-cycle detector 1926, a counter component 1928, a NOT gate 1930, switches 1932 and 1934, and a compensation component 1936. The signal processing component 1901 includes a sample-and-hold component 1906 and a low pass filter 1908. For example, the sample-and-hold component 1906 and the low pass filter 1908 share one or more components. In another example, the sampling signal generator 1902, the signal generator 1904, the sample-and-hold component 1906, and the low pass filter 1908 are the same as the sampling signal generator 1602, the signal generator 1604, the sample-and-hold component 1606, and the low pass filter 1608, respectively.

According to one embodiment, the duty-cycle detector 1926 receives the signal 2582 and determines whether the duty cycle of the signal 2582 of a particular switching period is larger than a duty cycle threshold. For example, if the duty-cycle detector 1926 determines that the duty cycle of the signal 2582 of the particular switching period is larger than the duty cycle threshold, in response the counter component 1928 outputs a sample-disable signal 1940 at a logic low level and thus a sample-enable signal 1938 from the NOT gate 1930 is at a logic high level so that the switch 1932 is closed (e.g., being turned on) and the switch 1934 is open (e.g., being turned off). In another example, if the duty-cycle detector 1926 determines that the duty cycle of the signal 2582 of the particular switching period is smaller than the duty cycle threshold, the counter component 1928 detects whether the duty cycle of the signal 2582 keeps being smaller than the duty cycle threshold for a predetermined number of switching periods. In yet another example, if the duty cycle of the signal 2582 keeps being smaller than the duty cycle threshold for the predetermined number of switching periods, the counter component 1928 outputs the sample-disable signal 1940 at the logic high level and thus the sample-enable signal 1938 is at the logic low level so that the switch 1932 is open (e.g., being turned off) and the switch 1934 is closed (e.g., being turned on).

According to another embodiment, during a switching period, the signal generator 1904 receives the signal 2582, and generates a ramping signal 1914 (e.g., $V_{ramp}$) based on the duty cycle of the signal 2582 in the switching period. For example, the sampling signal generator 1902 receives the signal 2582, and generates a sampling signal 1916. In another example, the sampling signal generator 1902 outputs a pulse in the sampling signal 1916 upon a falling edge of the signal 2582. In yet another example, the sample-and-hold component 1906 samples the ramping signal 1914 during the pulse of the sampling signal 1916 and holds a magnitude of the ramping signal 1914 (e.g., at the end of the pulse) during the rest of the switching period until a next pulse. In yet another example, the low pass filter 1908 performs low-pass filtering of a signal 1918 (e.g., $V_{sample}$) generated by the sample-and-hold component 1906 and, if the switch 1932 is closed (e.g., being turned on) in response to the sample-enable signal 1938, outputs the over-current threshold signal 2512 (e.g., $V_{th\_oc}$) to the OCP comparator 2510. In yet another example, the waveform of the over-current threshold signal 2512 (e.g., $V_{th\_oc}$) as a function of time is similar to the waveform 1706 as shown in FIG. 14(*b*). In yet another example, the OCP comparator 2510 also receives the current sensing signal 2514 and outputs the over-current control signal 2516.

According to yet another embodiment, the compensation component 1936 receives the signal 2582 and, if the switch 1934 is closed (e.g., being turned on) in response to the sample-disable signal 1940, outputs the over-current threshold signal 2512 (e.g., $V_{th\_oc}$) to the OCP comparator 2510. For example, the waveform of the over-current threshold signal 2512 (e.g., $V_{th\_oc}$) as a function of time is shown in the inlet figure associated with the compensation component 1936. That is, between 0 and a maximum time (e.g., $t_{max}$), the over-current threshold signal 2512 (e.g., $V_{th\_oc}$) increases at a positive slope with respect to time between a minimum value (e.g., $V_{ocp\_1}$) and a maximum value (e.g., $V_{ocp\_h}$), in some embodiments.

In one embodiment, the ramping signal 1914 is associated with a ramp-up process and a ramp-down process. For example, during the ramp-up process, the ramping signal 1914 increases in magnitude from a minimum value to a maximum value, and during the ramp-down process, the ramping signal 1914 decreases in magnitude from the maximum value to the minimum value. In another example, the ramp-up process and/or the ramp-down process occurs instantaneously or during a time period. In another embodiment, the ramping signal 1914 is associated with a ramp-up process, a constant process and a ramp-down process. For example, during the ramp-up process, the ramping signal 1914 increases in magnitude from a minimum value to a maximum value; during the constant process, the ramping signal 1914 keeps at the maximum value; and during the ramp-down process, the ramping signal 1914 decreases in magnitude from the maximum value to the minimum value. In another example, the ramp-up process, the constant process, and/or the ramp-down process occurs instantaneously or during a time period. In yet another embodiment, the ramping signal 1914 is associated with a ramp-up process, a first constant process, a ramp-down process, and a second constant process. For example, during the ramp-up process, the ramping signal 1914 increases in magnitude from a minimum value to a maximum value, and during the first constant process, the ramping signal 1914 keeps at the maximum value. In another example, during the ramp-down process, the ramping signal 1914 decreases in magnitude from the maximum value to the minimum value, and during the second constant process, the ramping signal 1914 keeps at the minimum value. In yet another example, the ramp-up process, the first constant process, the ramp-down process and/or the second constant process occurs instantaneously or during a time period.

Figure 16A:
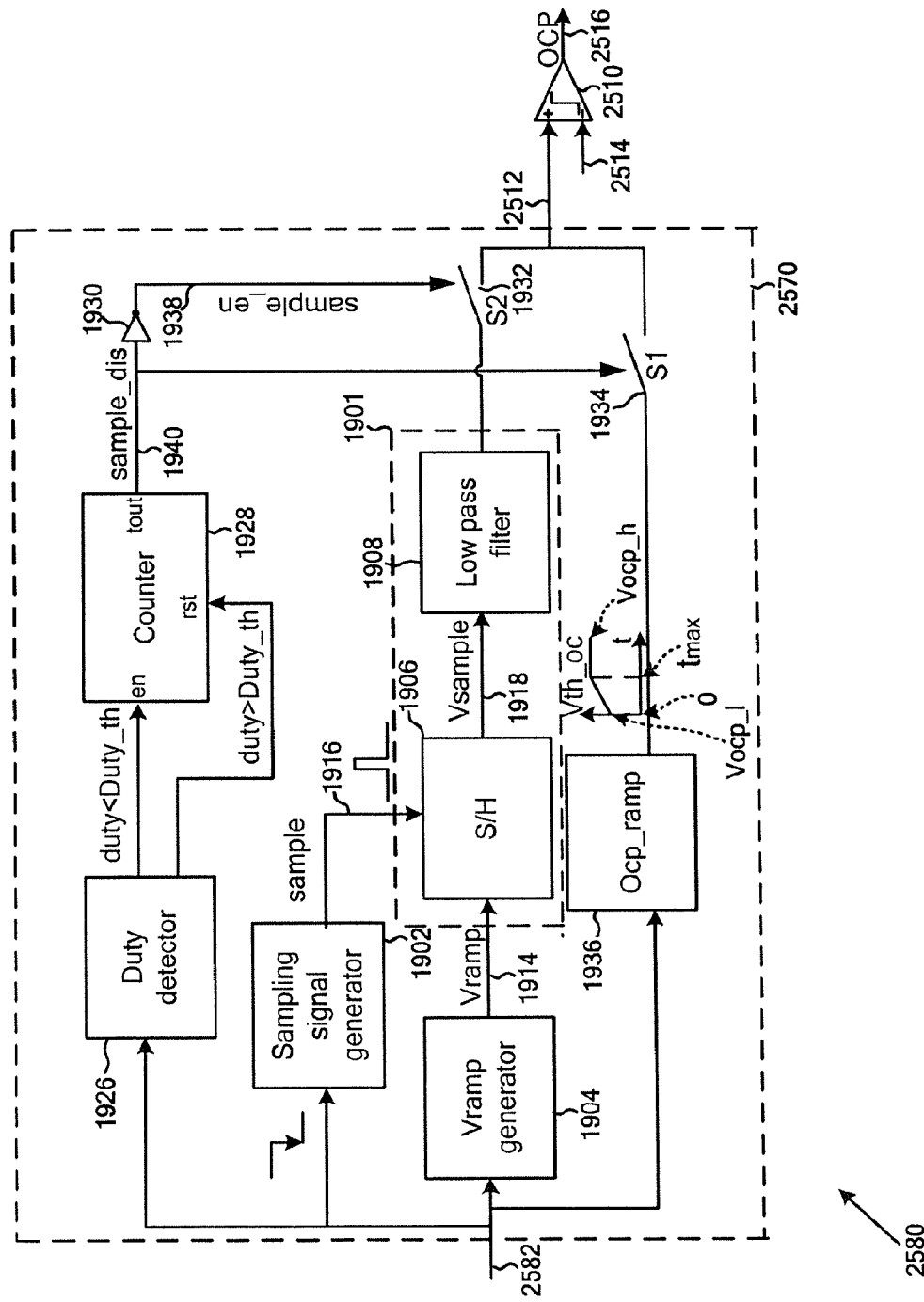
FIG. 16(a) is a simplified diagram showing certain components of the power converter as shown in FIG. 12 with over-current protection according to another embodiment of the present invention.
Figure 16B:
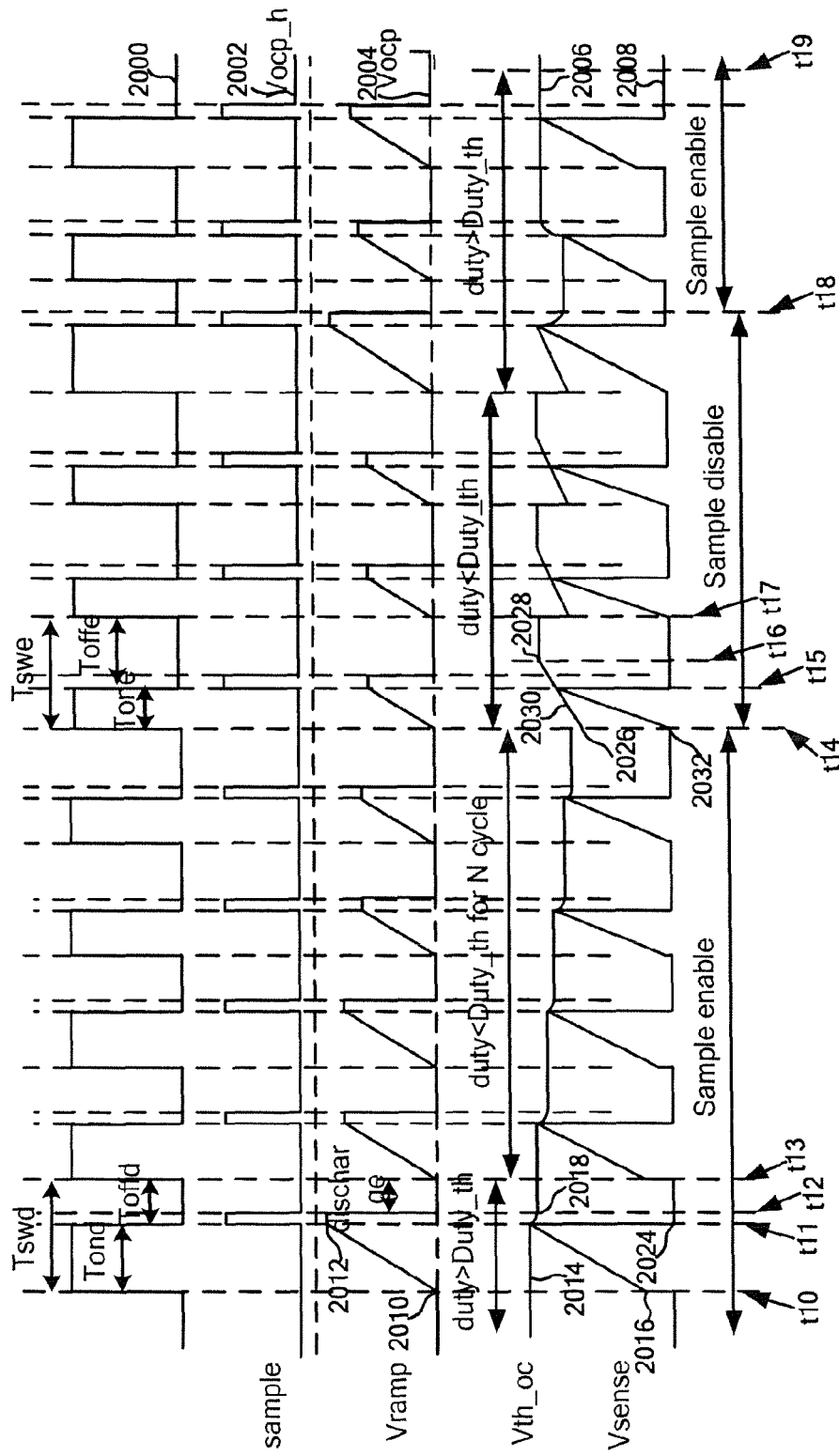
FIG. 16(b) is a simplified timing diagram for the power converter as shown in FIG. 16(a) according to another embodiment of the present invention.

FIG. 16(b) is a simplified timing diagram for the power converter 2500 including components as shown in FIG. 16(a) according to another embodiment of the present invention. This diagram is merely an example, which should not unduly limit the scope of the claims. One of ordinary skill in the art would recognize many variations, alternatives, and modifications. The waveform 2000 represents the signal 2582 as a function of time, the waveform 2002 represents the sampling signal 1916 as a function of time, the waveform 2004 represents the ramping signal 1914 as a function of time, the waveform 2006 represents the over-current threshold signal 2512 (e.g., $V_{th\_oc}$) as a function of time, and the waveform 2008 represents the current sensing signal 2514 as a function of time.

For example, the waveform 2006 represents the over-current threshold signal 2512 (e.g., $V_{th\_oc}$) as a function of time, which includes the over-current threshold signal 2512 (e.g., $V_{th\_oc}$) as a function of time within a switching period $T_{swd}$, and the over-current threshold signal 2512 (e.g., $V_{th\_oc}$) as a function of time within a switching period $T_{swe}$. In another example, the waveform 2008 represents the current sensing signal 2514 as a function of time, which includes the current sensing signal 2514 as a function of time within the switching period $T_{swd}$, and the current sensing signal 2514 as a function of time within the switching period $T_{swe}$.

For example, as shown in FIG. 16(b), an on-time period $T_{ond}$ starts at time $t_{10}$ and ends at time $t_{11}$, an off-time period $T_{offd}$ starts at the time $t_{11}$ and ends at time $t_{13}$, an on-time period $T_{one}$ starts at the time $t_{14}$ and ends at time $t_{15}$, and an off-time period $T_{offe}$ starts at the time $t_{15}$ and ends at time $t_{17}$. In another example, $t_{10} \leq t_{11} \leq t_{12} \leq t_{13} \leq t_{14} \leq t_{15} \leq t_{16} \leq t_{17} \leq t_{18} \leq t_{19}$.

According to one embodiment, initially, the duty cycle of the signal 2582 is larger than the duty cycle threshold (e.g., at $t_{10}$) and the sample-enable signal 1938 is at the logic high level to close (e.g., turn on) the switch 1932 (e.g., S2). For example, during the on-time period $T_{ond}$, the signal 2582 keeps at a logic high level (e.g., as shown by the waveform 2000). In another example, the ramping signal 1914 increases from a magnitude 2010 (e.g., at $t_{10}$) to a magnitude 2012 (e.g., at $t_{11}$), as shown by the waveform 2004. In yet another example, the over-current threshold signal 2512 (e.g., $V_{th\_oc}$) keeps at a magnitude 2014 during the on-time period $T_{ond}$ (e.g., as shown by the waveform 2006). In yet another example, the current sensing signal 2514 increases from a magnitude 2016 (e.g., at $t_{10}$), as shown by the waveform 2008. Once the current sensing signal 2514 exceeds the magnitude 2014 (e.g., at $t_{11}$), the over-current protection is triggered, in some embodiments. For example, the OCP comparator 2510 changes the over-current control signal 2516 from the logic high level to the logic low level. In another example, then the current sensing signal 2514 decreases to a magnitude 2024 (e.g., 0 at $t_{11}$) and keeps at the magnitude 2024 during the off-time period $T_{offd}$ (e.g., as shown by the waveform 2008).

According to another embodiment, at a falling edge of the signal 2582 (e.g., at $t_{11}$), a pulse is generated in the sampling signal 1916 (e.g., as shown by the waveform 2002). For example, the pulse starts at the time $t_{11}$ and ends at the time $t_{12}$. In another example, the sample-and-hold component 1906 samples the ramping signal 1914 during the pulse and in response, the over-current threshold signal 2512 (e.g., $V_{th\_oc}$) changes from the magnitude 2014 (e.g., at $t_{11}$) to a magnitude 2018 (e.g., at $t_{12}$), as shown by the waveform 2006. In yet another example, the signal 1914 keeps at the magnitude 2012 during the pulse, and decreases to the magnitude 2010 (e.g., $V_{ocp\_1}$) at the end of the pulse (e.g., at $t_{12}$), as shown by the waveform 2004. In yet another example, during the time period between $t_{12}$ and $t_{13}$, the signal 1914 keeps at the magnitude 2010 (e.g., $V_{ocp\_1}$) as shown by the waveform 2004, and the over-current threshold signal 2512 (e.g., $V_{th\_oc}$) keeps at the magnitude 2018 as shown by the waveform 2006. In another example, the magnitudes 2014 and 2018 of the over-current threshold signal 2512 (e.g., $V_{th\_oc}$) can be determined based on Equation 9.

According to yet another embodiment, thereafter, the duty cycle of the signal 2582 changes to be smaller than the duty cycle threshold (e.g., at $t_{13}$). For example, if the duty cycle of the signal 2582 keeps to be smaller than the duty cycle threshold for a predetermined number of switching periods (e.g., between $t_{13}$ and $t_{14}$), the sample-enable signal 1938 changes to the logic low level to open (e.g., turn off) the switch 1932 and the sample-disable signal 1940 changes to the logic high level to close (e.g., turn on) the switch 1934 (e.g., at $t_{14}$) so that the compensation component 1936, instead of the low pass filter 1908, outputs the over-current threshold signal 2512 (e.g., $V_{th\_oc}$).

As shown in FIG. 16(b), during the on-time period $T_{one}$, the signal 2582 keeps at the logic high level (e.g., as shown by the waveform 2000). For example, the ramping signal 1914 increases from the magnitude 2010 (e.g., at $t_{14}$) to the magnitude 2012 (e.g., at $t_{15}$), as shown by the waveform 2004. In another example, the over-current threshold signal 2512 (e.g., $V_{th\_oc}$) increases from a magnitude 2026 (e.g., $V_{ocp\_1}$ at $t_{14}$) to a magnitude 2030 (e.g., at $t_{15}$), e.g., as shown by the waveform 2006. In yet another example, the current sensing signal 2514 increases from a magnitude 2032 (e.g., at $t_{14}$), as shown by the waveform 2008. Once the current sensing signal 2514 exceeds the magnitude 2030 (e.g., at $t_{15}$), the over-current protection is triggered, in some embodiments. For example, the OCP comparator 2510 changes the over-current control signal 2516 from the logic high level to the logic low level. In another example, the current sensing signal 2514 decreases to the magnitude 2032 (e.g., at $t_{15}$), and keeps at the magnitude 2032 during the off-time period $T_{offe}$ (e.g., as shown by the waveform 2008). In yet another example, during the off-time period $T_{offe}$, the over-current threshold signal 2512 (e.g., $V_{th\_oc}$) continues to increase until reaching a maximum magnitude 2028 (e.g., $V_{ocp\_h}$ at $t_{16}$), and keeps at the maximum magnitude 2028 until the next on-time period. In yet another example, during the next switching period, the over-current threshold signal 2512 (e.g., $V_{th\_oc}$) has a similar waveform as during the on-time period $T_{one}$ and the off-time period $T_{offe}$ (e.g., as shown by the waveform 2006.) During the time period between $t_{14}$ and $t_{18}$ when the duty cycle of the signal 2582 remains smaller than the duty cycle threshold, the over-current threshold signal 2512 (e.g., $V_{th\_oc}$) is not determined by the ramping signal 1914, in some embodiments.

According to yet another embodiment, thereafter, the duty cycle of the signal 2582 becomes larger than the duty cycle threshold again (e.g., between $t_{18}$ and $t_{19}$). For example, the sample-enable signal 1938 changes to the logic high level to close (e.g., turn on) the switch 1932 and the sample-disable signal 1940 changes to the logic low level to open (e.g., turn off) the switch 1934. In another example, the compensation component 1936 does not determine the over-current threshold signal 2512 (e.g., $V_{th\_oc}$) any longer. Instead, the over-current protection is carried out by the signal generator 1904, the sampling signal generator 1902, the sample-and-hold component 1906, and/or the low pass filter 1908, as discussed above, in certain embodiments.

Figure 17:
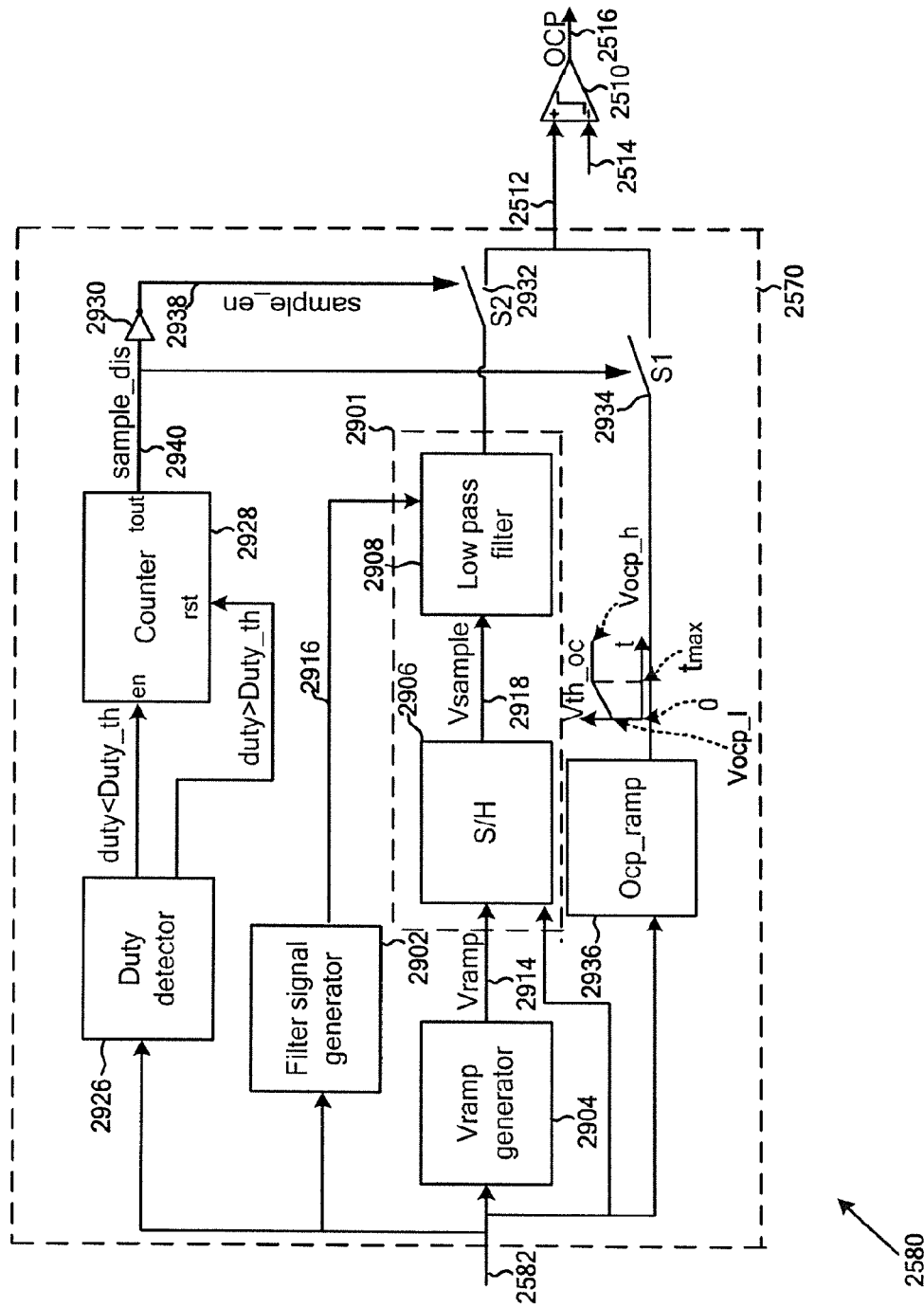
FIG. 17 is a simplified diagram showing certain components of the power converter as shown in FIG. 12 with over-current protection according to yet another embodiment of the present invention.

FIG. 17 is a simplified diagram showing certain components of the power converter 2500 with over-current protection according to yet another embodiment of the present invention. This diagram is merely an example, which should not unduly limit the scope of the claims. One of ordinary skill in the art would recognize many variations, alternatives, and modifications. The over-current-threshold signal generator 2570 includes a filter signal generator 2902, a signal generator 2904, a signal processing component 2901, a duty-cycle detector 2926, a counter component 2928, a NOT gate 2930, switches 2932 and 2934, and a compensation component 2936. The signal processing component 2901 includes a sample-and-hold component 2906 and a low pass filter 2908. For example, the sample-and-hold component 2906 and the low pass filter 2908 share one or more components.

For example, the filter signal generator 2902, the signal generator 2904, the sample-and-hold component 2906, and the low pass filter 2908 are the same as the filter signal generator 2802, the signal generator 2804, the sample-and-hold component 2806, and the low pass filter 2808, respectively. In another example, the signal generator 2904, the duty-cycle detector 2926, the counter component 2928, the NOT gate 2930, the switches 2932 and 2934, and the compensation component 2936 are the same as the signal generator 1904, the duty-cycle detector 1926, the counter component 1928, the NOT gate 1930, the switches 1932 and 1934, and the compensation component 1936, respectively.

According to one embodiment, the duty-cycle detector 2926 receives the signal 2582 and determines whether the duty cycle of the signal 2582 of a particular switching period is larger than a duty cycle threshold. For example, if the duty-cycle detector 2926 determines that the duty cycle of the signal 2582 of the particular switching period is larger than the duty cycle threshold, in response the counter component 2928 outputs a sample-disable signal 2940 at a logic low level and thus a sample-enable signal 2938 from the NOT gate 2930 is at a logic high level so that the switch 2932 is closed (e.g., being turned on) and the switch 2934 is open (e.g., being turned off). In another example, if the duty-cycle detector 2926 determines that the duty cycle of the signal 2582 of the particular switching period is smaller than the duty cycle threshold, the counter component 2928 detects whether the duty cycle of the signal 2582 keeps being smaller than the duty cycle threshold for a predetermined number of switching periods. In yet another example, if the duty cycle of the signal 2582 keeps being smaller than the duty cycle threshold for the predetermined number of switching periods, the counter component 2928 outputs the sample-disable signal 2940 at the logic high level and thus the sample-enable signal 2938 is at the logic low level so that the switch 2932 is open (e.g., being turned off) and the switch 2934 is closed (e.g., being turned on).

According to another embodiment, during a switching period, the signal generator 2904 receives the signal 2582, and generates a ramping signal 2914 (e.g., $V_{ramp}$) based on the duty cycle of the signal 2582 in the switching period. For example, the filter signal generator 2902 receives the signal 2582, and outputs a filter signal 2916 to the low pass filter 2908. In another example, when the signal 2582 is at the logic high level, the sample-and-hold component 2906 samples and holds the ramping signal 2914. In yet another example, when the signal 2582 changes to the logic low level, the low pass filter 2908 performs low-pass filtering of a signal 2918 (e.g., $V_{sample}$) generated by the sample-and-hold component 2906 and, if the switch 2932 is closed (e.g., being turned on) in response to the sample-enable signal 2938, outputs the over-current threshold signal 2512 (e.g., $V_{th\_oc}$) to the OCP comparator 2510. In yet another example, the OCP comparator 2510 also receives the current sensing signal 2514 and outputs the over-current control signal 2516.

According to yet another embodiment, the compensation component 2936 receives the signal 2582 and, if the switch 2934 is closed (e.g., being turned on) in response to the sample-disable signal 2940, outputs the over-current threshold signal 2512 (e.g., $V_{th\_oc}$) to the OCP comparator 2510. For example, the waveform of the over-current threshold signal 2512 (e.g., $V_{th\_oc}$) as a function of time is shown in the inlet figure associated with the compensation component 2936. That is, between 0 and a maximum time (e.g., $t_{max}$), the over-current threshold signal 2512 (e.g., $V_{th\_oc}$) increases at a positive slope with respect to time between a minimum value (e.g., $V_{ocp\_l}$) and a maximum value (e.g., $V_{ocp\_h}$), in some embodiments.

Negative-slope compensation can be introduced to the over-current threshold signal 2512 (e.g., $V_{th\_oc}$), as shown in FIG. 18(a), FIG. 18(b), FIG. 20(a) and FIG. 20(b), according to some embodiments of the present invention.

FIG. 18(a) is a simplified diagram showing the over-current threshold signal 2512 as a function of time within a switching period according to yet another embodiment of the present invention. This diagram is merely an example, which should not unduly limit the scope of the claims. One of ordinary skill in the art would recognize many variations, alternatives, and modifications.

In one embodiment, the waveform 1402 represents the over-current threshold signal 2512 (e.g., $V_{th\_oc}$) as a function of time within the switching period $T_5$, and the time within the switching period $T_5$ is set to zero at the beginning of the on-time period of the switching period $T_5$. In another embodiment, the waveform 1404 represents the over-current threshold signal 2512 (e.g., $V_{th\_oc}$) as a function of time within the switching period $T_6$, and the time within the switching period $T_6$ is set to zero at the beginning of the on-time period of the switching period $T_6$. In yet another embodiment, the waveform 1406 represents the over-current threshold signal 2512 (e.g., $V_{th\_oc}$) as a function of time within the switching period $T_7$, and the time within the switching period $T_7$ is set to zero at the beginning of the on-time period of the switching period $T_7$. In yet another embodiment, the waveform 1408 represents the over-current threshold signal 2512 (e.g., $V_{th\_oc}$) as a function of time within the switching period $T_8$, and the time within the switching period $T_8$ is set to zero at the beginning of the on-time period of the switching period $T_8$. For example, the switching periods $T_5$, $T_6$, $T_7$, and $T_8$ are equal in magnitude, even though they correspond to different switching cycles. In another example, the waveforms 1402, 1404, 1406 and 1408 correspond to bulk voltages $V_{in5}$, $V_{in6}$, $V_{in7}$ and $V_{in8}$ respectively.

According to one embodiment, as shown in FIG. 18(a), for a particular on-time period, the over-current threshold signal 2512 (e.g., $V_{th\_oc}$) does not change with time between 0 and a time threshold (e.g., $t_h$), and decreases with time between the time threshold (e.g., $t_h$) and a maximum time (e.g., $t_{max}$), e.g., as shown by the waveform 1402, 1404, 1406 or 1408. For example, the time threshold (e.g., $t_h$) corresponds to a duty cycle threshold (e.g., $D_h$). The value of the over-current threshold signal 2512 (e.g., $V_{th\_oc}$) varies in different on-time periods according to certain embodiments. For example, the value of the over-current threshold signal 2512 between 0 and the time threshold (e.g., $t_h$) is determined according to Equation 9 and/or Equation 10. That is, the value of the over-current threshold signal 2512 for a particular switching period is affected by duty cycles of one or more preceding switching periods, in some embodiments. For example, the larger the duty cycles of one or more preceding switching periods are, the larger the value of the over-current threshold signal 2512 for the particular switching period becomes. In another example, between 0 and the time threshold (e.g., $t_h$), the value of the over-current threshold signal 2512 is equal to or larger than the minimum value of the over-current threshold signal 2512 (e.g., Vocp_1), and is equal to or smaller than the maximum value of the over-current threshold signal 2512 (e.g., $V_{ocp\_h}$). In yet another example, beyond the time threshold (e.g., $t_h$), the value of the over-current threshold signal 2512 is equal to or smaller than the maximum value of the over-current threshold signal 2512 (e.g., $V_{ocp\_h}$). In yet another example, beyond the time threshold (e.g., th), the value of the over-current threshold signal 2512 is equal to or larger than the minimum value of the over-current threshold signal 2512 (e.g., Vocp_1).

Figure 18B:
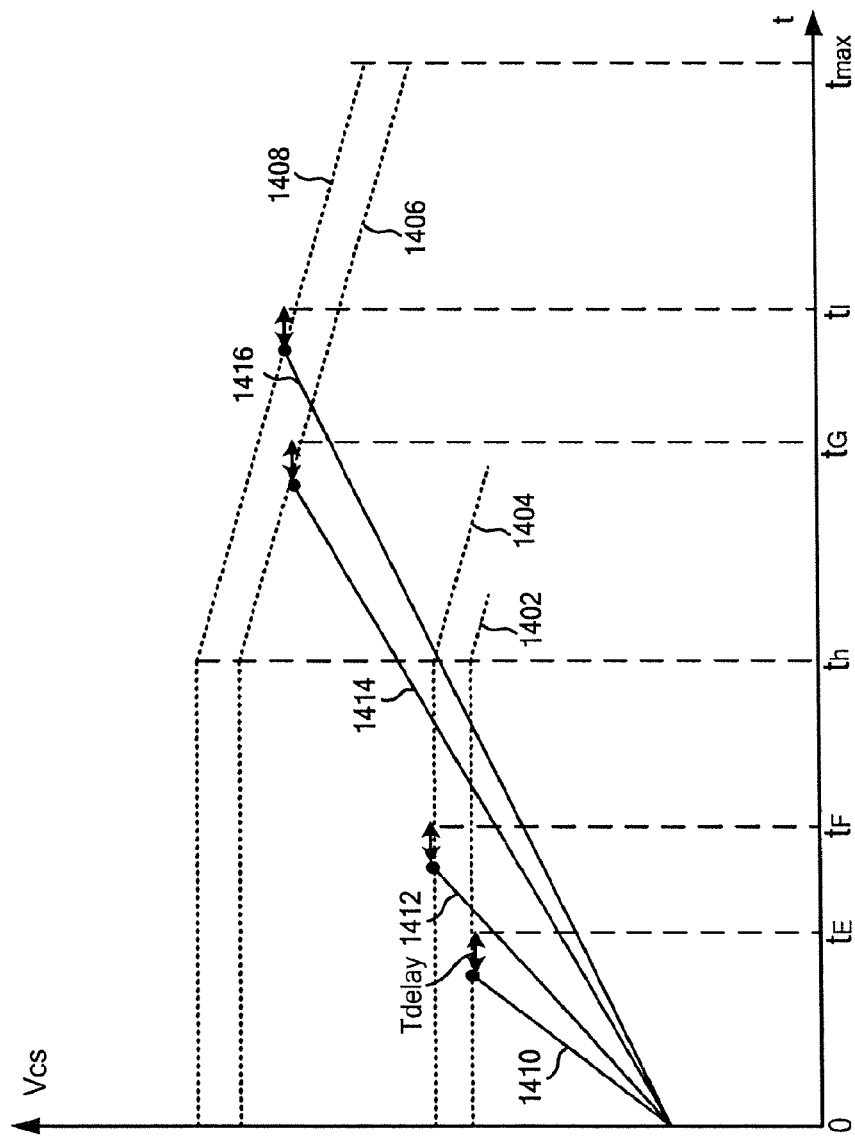
FIG. 18(b) is a simplified diagram showing the current sensing signal as shown in FIG. 12 as a function of time under different values for bulk voltage according to yet another embodiment of the present invention.

FIG. 18(b) is a simplified diagram showing determination of an on-time period using the over-current threshold signal 2512 as a function of time within a switching period as shown in FIG. 18(a) according to yet another embodiment of the present invention. This diagram is merely an example, which should not unduly limit the scope of the claims. One of ordinary skill in the art would recognize many variations, alternatives, and modifications. The waveforms 1410, 1412, 1414 and 1416 represent the current sensing signal 2514 (e.g., $V_{CS}$) as a function of time corresponding to the bulk voltages $V_{in5}$, $V_{in6}$, $V_{in7}$ and $V_{in8}$ respectively. For example, the slopes shown in the waveforms 1410, 1412, 1414 and 1416 are $S_5$, $S_6$, $S_7$, and $S_8$ respectively.

According to one embodiment, with respect to a particular bulk voltage, the current sensing signal 2514 (e.g., $V_{CS}$) increases with time (e.g., as shown by the waveforms 1410, 1412, 1414 and 1416). As shown in FIG. 18(b), the slope of the current sensing signal 2514 (e.g., $V_{CS}$) with respect to time increases with the bulk voltage, in some embodiments. For example, $V_{in5}>V_{in6}>V_{in7}>V_{in8}$, and correspondingly $S_5>S_6>S_7>S_8$. In another example, when the current sensing signal 2514 (e.g., $V_{CS}$) exceeds in magnitude the over-current threshold signal 2512 (e.g., as shown by the waveform 1410, 1412, 1414 or 1416), the over-current protection is triggered. In yet another example, during $T_{delay}$ (e.g., the "delay to output"), the current sensing signal 2514 (e.g., $V_{CS}$) continues to increase in magnitude. In yet another example, at the end of $T_{delay}$, the switch is opened (e.g., turned off), and the current sensing signal 2514 (e.g., $V_{CS}$) reaches its maximum magnitude. The end of $T_{delay}$ is the end of an on-time period of the switch 2540 during a switching period, in some embodiments. For example, the end of $T_{delay}$ for the bulk voltage $V_{in5}$ corresponds to a time $t_E$, the end of $T_{delay}$ for the bulk voltage $V_{in6}$ corresponds to a time $t_F$, the end of $T_{delay}$ for the bulk voltage $V_{in7}$ corresponds to a time $t_G$, and the end of $T_{delay}$ for the bulk voltage $V_{in8}$ corresponds to a time $t_1$.

Figure 19A:
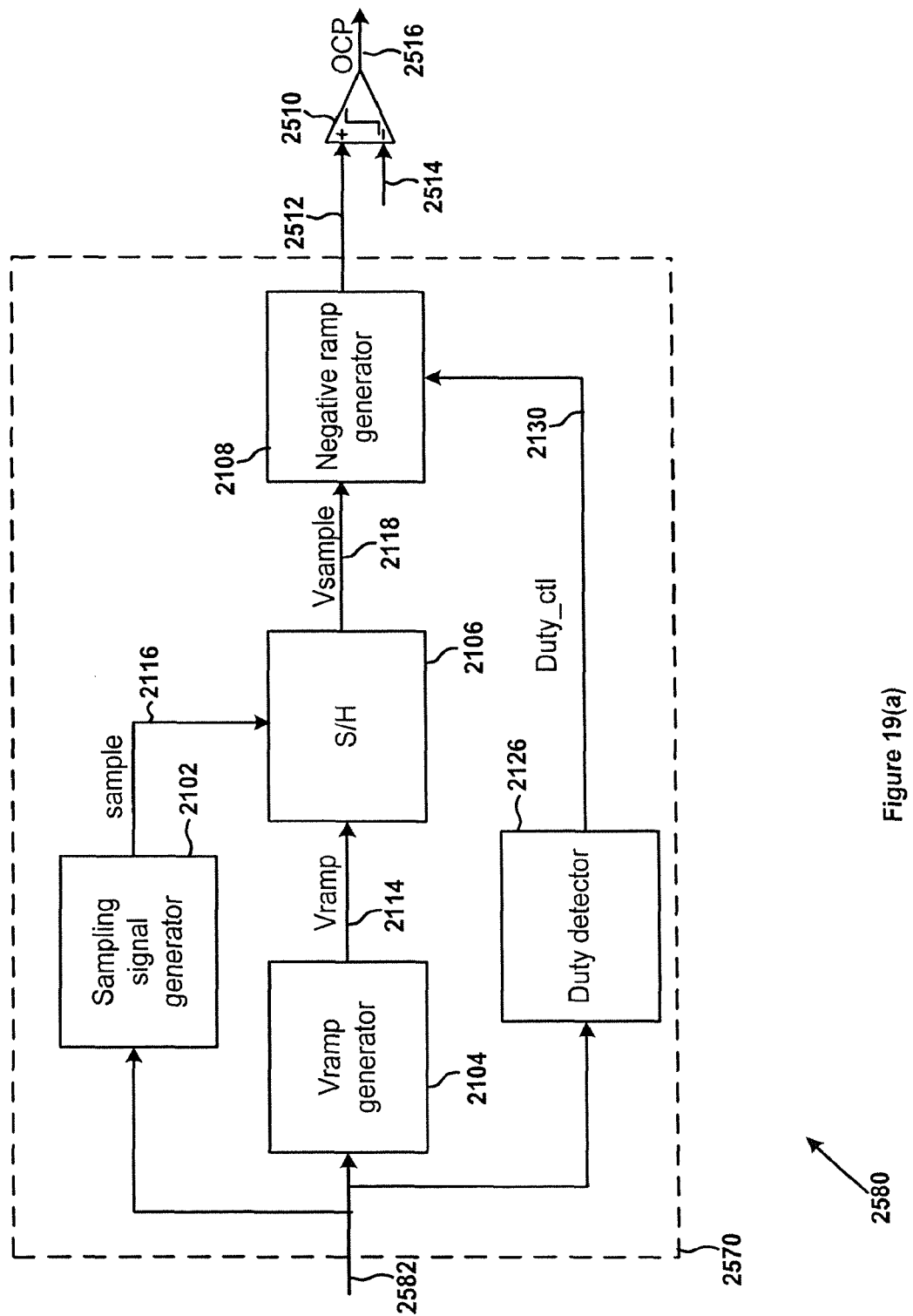
FIG. 19(a) is a simplified diagram showing certain components of the power converter as shown in FIG. 12 with over-current protection with over-current protection according to yet another embodiment of the present invention.

FIG. 19(a) is a simplified diagram showing certain components of the power converter 2500 with over-current protection with over-current protection according to yet another embodiment of the present invention. This diagram is merely an example, which should not unduly limit the scope of the claims. One of ordinary skill in the art would recognize many variations, alternatives, and modifications. The over-current-threshold signal generator 2570 includes a sampling signal generator 2102, a signal generator 2104, a sample-and-hold component 2106, a negative-ramping-signal generator 2108, and a duty-cycle detector 2126. For example, the sampling signal generator 2102, the signal generator 2104, and the sample-and-hold component 2106 are the same as the sampling signal generator 1602, the signal generator 1604, and the sample-and-hold component 1606, respectively. In another example, the over-current-protection scheme is implemented according to FIG. 18(a) and FIG. 18(b).

According to one embodiment, during a switching period, the signal generator 2104 receives the signal 2582 (e.g., the PWM signal 2522 or the gate drive signal 2584), and generates a ramping signal 2114 based on the duty cycle of the signal 2582 in the switching period. For example, the sampling signal generator 2102 receives the signal 2582, and generates a sampling signal 2116. In another example, the sampling signal generator 2102 outputs a pulse in the sampling signal 2116 upon a falling edge of the signal 2582. In yet another example, the sample-and-hold component 2106 samples the ramping signal 2114 during the pulse of the sampling signal 2116 and holds a magnitude of the ramping signal 2114 (e.g., at the end of the pulse) during the rest of the switching period until a next pulse. In yet another example, the duty detector 2126 receives the signal 2582 and outputs a control signal 2130 that indicates the duty cycle of the signal 2582 to the negative-ramping-signal generator 2108. In yet another example, the negative-ramping-signal generator 2108 outputs the over-current threshold signal 2512 (e.g., $V_{th\_oc}$) to the OCP comparator 2510. In yet another example, the OCP comparator 2510 also receives the current sensing signal 2514 and outputs the over-current control signal 2516. In yet another example, the control signal 2130 is at a logic low level when the duty cycle of the signal 2582 is smaller than the duty cycle threshold, and is at a logic high level when the duty cycle of the signal 2582 is larger than the duty cycle threshold. In yet another example, if the control signal 2130 indicates that the duty cycle of the signal 2582 is larger than a duty cycle threshold, the negative-ramping-signal generator 2108 introduces a negative-slope compensation to the over-current threshold signal 2512 (e.g., $V_{th\_oc}$) with respect to time.

In one embodiment, the ramping signal 2114 is associated with a ramp-up process and a ramp-down process. For example, during the ramp-up process, the ramping signal 2114 increases in magnitude from a minimum value to a maximum value, and during the ramp-down process, the ramping signal 2114 decreases in magnitude from the maximum value to the minimum value. In another example, the ramp-up process and/or the ramp-down process occurs instantaneously or during a time period. In another embodiment, the ramping signal 2114 is associated with a ramp-up process, a constant process and a ramp-down process. For example, during the ramp-up process, the ramping signal 2114 increases in magnitude from a minimum value to a maximum value; during the constant process, the ramping signal 2114 keeps at the maximum value; and during the ramp-down process, the ramping signal 2114 decreases in magnitude from the maximum value to the minimum value. In another example, the ramp-up process, the constant process, and/or the ramp-down process occurs instantaneously or during a time period. In yet another embodiment, the ramping signal 2114 is associated with a ramp-up process, a first constant process, a ramp-down process, and a second constant process. For example, during the ramp-up process, the ramping signal 2114 increases in magnitude from a minimum value to a maximum value, and during the first constant process, the ramping signal 2114 keeps at the maximum value. In another example, during the ramp-down process, the ramping signal 2114 decreases in magnitude from the maximum value to the minimum value, and during the second constant process, the ramping signal 2114 keeps at the minimum value. In yet another example, the ramp-up process, the first constant process, the ramp-down process and/or the second constant process occurs instantaneously or during a time period.

Figure 19B:
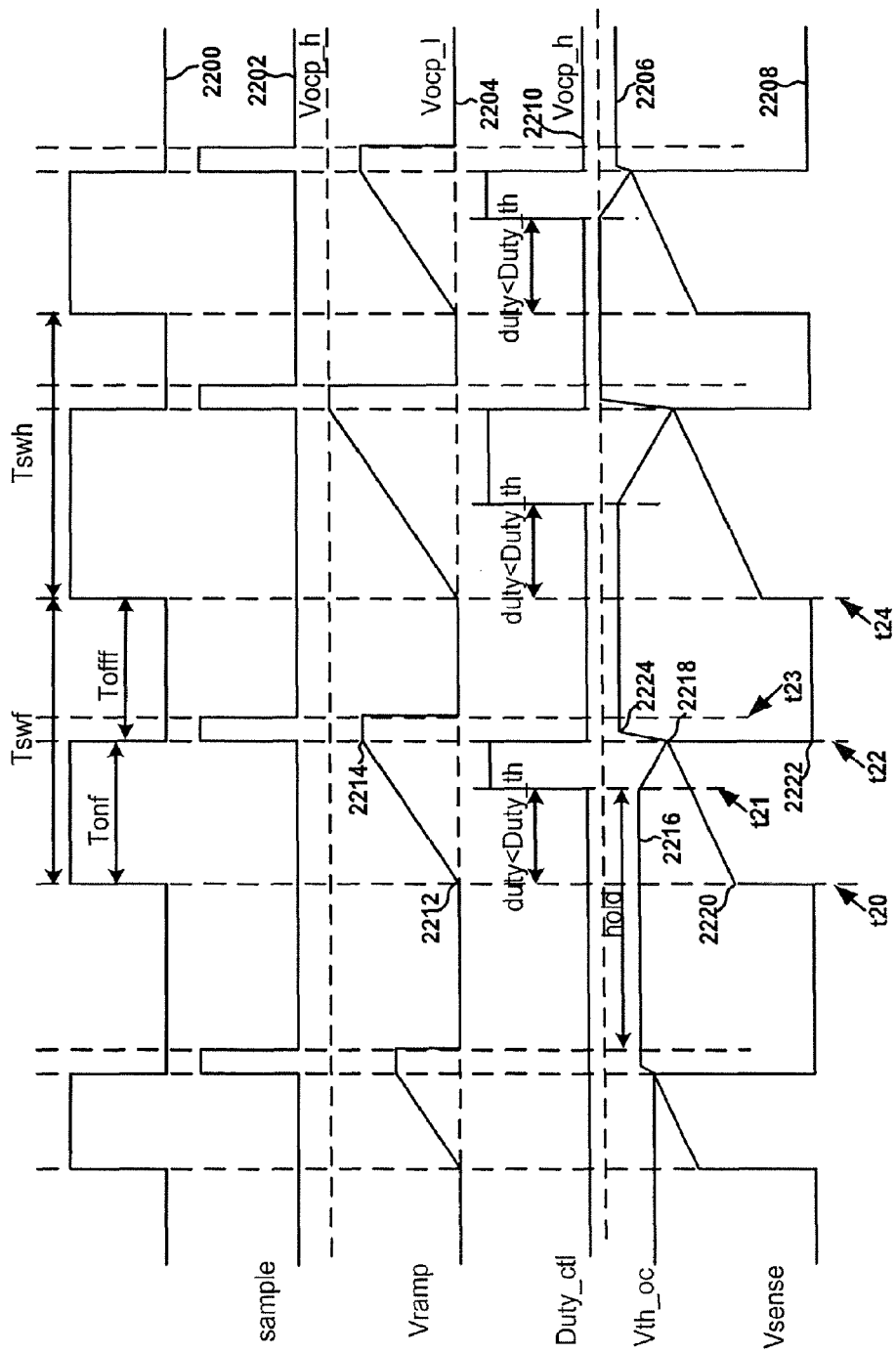
FIG. 19(b) is a simplified timing diagram for the power converter as shown in FIG. 19(a) according to yet another embodiment of the present invention.

FIG. 19(b) is a simplified timing diagram for the power converter 2500 including components as shown in FIG. 19(a) according to yet another embodiment of the present invention. This diagram is merely an example, which should not unduly limit the scope of the claims. One of ordinary skill in the art would recognize many variations, alternatives, and modifications. The waveform 2200 represents the signal 2582 as a function of time, the waveform 2202 represents the sampling signal 2116 as a function of time, and the waveform 2204 represents the ramping signal 2114 as a function of time. In addition, the waveform 2206 represents the over-current threshold signal 2512 (e.g., $V_{th\_oc}$) as a function of time, the waveform 2208 represents the current sensing signal 2514 as a function of time, and the waveform 2210 represents the control signal 2130 as a function of time. For example, as shown in FIG. 19(b), a switching period $T_{swf}$ includes an on-time period $T_{onf}$ and an off-time period $T_{off}$. The on-time period $T_{onf}$ starts at time $t_{20}$ and ends at time $t_{22}$, and the off-time period $T_{off}$ starts at the time $t_{22}$ and ends at time $t_{24}$. In another example, $t_{20} \leq t_{21} \leq t_{22} \leq t_{23} \leq t_{24}$. For example, the waveform 2206 represents the over-current threshold signal 2512 (e.g., $V_{th\_oc}$) as a function of time, which includes the over-current threshold signal 2512 (e.g., $V_{th\_oc}$) as a function of time within a switching period $T_{swf}$, and the over-current threshold signal 2512 (e.g., $V_{th\_oc}$) as a function of time within a switching period $T_{swh}$. In another example, the waveform 2208 represents the current sensing signal 2514 as a function of time, which includes the current sensing signal 2514 as a function of time within the switching period $T_{swf}$, and the current sensing signal 2514 as a function of time within the switching period $T_{swh}$.

According to one embodiment, during the on-time period $T_{onf}$, the signal 2582 keeps at a logic high level (e.g., as shown by the waveform 2200). For example, the ramping signal 2114 increases from a magnitude 2212 (e.g., at $t_{20}$) to a magnitude 2214 (e.g., at $t_{22}$), as shown by the waveform 2204. In another example, the control signal 2130 keeps at the logic low level (e.g., between $t_{20}$ and $t_{21}$), and then changes to the logic high level (e.g., between $t_{21}$ and $t_{22}$) which indicates that the duty cycle of the signal 2582 reaches the duty cycle threshold. In yet another example, the over-current threshold signal 2512 (e.g., $V_{th\_oc}$) keeps at a magnitude 2216 (e.g., before $t_{21}$ as shown by the waveform 2206), and then in response to the control signal changing to the logic high level, the over-current threshold signal 2512 (e.g., $V_{th\_oc}$) decreases from the magnitude 2216 (e.g., at $t_{21}$) to a magnitude 2218 (e.g., at $t_{22}$), e.g., as shown by the waveform 2206. In yet another example, the current sensing signal 2514 increases from a magnitude 2220 (e.g., at $t_{20}$), as shown by the waveform 2208. Once the current sensing signal 2514 exceeds the magnitude 2218 (e.g., at $t_{22}$), the over-current protection is triggered, in some embodiments. For example, the OCP comparator 2510 changes the over-current control signal 2516 from a logic high level to a logic low level. In another example, then the current sensing signal 2514 decreases to a magnitude 2222 (e.g., 0 at $t_{22}$) and keeps at the magnitude 2222 during the off-time period $T_{off}$ (e.g., as shown by the waveform 2208).

According to another embodiment, at a falling edge of the signal 2582 (e.g., at $t_{22}$), a pulse is generated in the sampling signal 2116 (e.g., as shown by the waveform 2202). For example, the pulse starts at the time $t_{22}$ and ends at the time $t_{23}$. In another example, the sample-and-hold component 2106 samples the ramping signal 2114 during the pulse and in response, the over-current threshold signal 2512 (e.g., $V_{th\_oc}$) changes from the magnitude 2218 (e.g., at $t_{22}$) to a magnitude 2224, as shown by the waveform 2206. In yet another example, the ramping signal 2114 keeps at the magnitude 2214 during the pulse, and decreases to the magnitude 2212 (e.g., $V_{ocp\_1}$) at the end of the pulse (e.g., at $t_{23}$), as shown by the waveform 2204. In yet another example, during the time period between $t_{23}$ and $t_{24}$, the ramping signal 2114 keeps at the magnitude 2212 (e.g., $V_{ocp\_1}$) as shown by the waveform 2204, and the over-current threshold signal 2512 (e.g., $V_{th\_oc}$) keeps at the magnitude 2224 as shown by the waveform 2206.

FIG. 20(a) is a simplified diagram showing the over-current threshold signal 2512 as a function of time within a switching period according to yet another embodiment of the present invention. This diagram is merely an example, which should not unduly limit the scope of the claims. One of ordinary skill in the art would recognize many variations, alternatives, and modifications.

In one embodiment, the waveform 1502 represents the over-current threshold signal 2512 (e.g., $V_{th\_oc}$) as a function of time within the switching period $T_9$, and the time within the switching period $T_9$ is set to zero at the beginning of the on-time period of the switching period $T_9$. In another embodiment, the waveform 1504 represents the over-current threshold signal 2512 (e.g., $V_{th\_oc}$) as a function of time within the switching period $T_{10}$, and the time within the switching period $T_{10}$ is set to zero at the beginning of the on-time period of the switching period $T_{10}$. In yet another embodiment, the waveform 1506 represents the over-current threshold signal 2512 (e.g., $V_{th\_oc}$) as a function of time within the switching period $T_{11}$, and the time within the switching period $T_{11}$ is set to zero at the beginning of the on-time period of the switching period $T_{11}$. In yet another embodiment, the waveform 1508 represents the over-current threshold signal 2512 (e.g., $V_{th\_oc}$) as a function of time within the switching period $T_{12}$, and the time within the switching period $T_{12}$ is set to zero at the beginning of the on-time period of the switching period $T_{12}$. For example, the switching periods $T_9$, $T_{10}$, $T_{11}$, and $T_{12}$ are equal in magnitude, even though they correspond to different switching cycles. In another example, the waveforms 1502, 1504, 1506 and 1508 correspond to bulk voltages $V_{in9}$, $V_{in10}$, $V_{in11}$ and $V_{in12}$ respectively.

According to one embodiment, as shown in FIG. 20(a), a starting value (e.g., at 0) of the over-current threshold signal 2512 (e.g., $V_{th\_oc}$) is larger than a minimum value (e.g., Vocp_1), and is equal to or smaller than a maximum value (e.g., Vocp_h). For example, when the over-current threshold signal 2512 (e.g., $V_{th\_oc}$) is larger than the minimum value (e.g., $V_{ocp\_1}$) and smaller than the maximum value (e.g., $V_{ocp\_h}$), the over-current threshold signal 2512 (e.g., $V_{th\_oc}$) changes along a negative slope with respect to time (e.g., as shown by the waveform 1502 between 0 and the time $t_J$, the waveform 1504 between 0 and the time $t_K$, the waveform 1506 between the time $t_L$ and the maximum $t_{max}$, or the waveform 1508 between the time $t_M$ and the maximum time $t_{max}$). In yet another example, the starting value of the over-current threshold signal 2512 (e.g., $V_{th\_oc}$) can be determined according to Equation 9 and/or Equation 10 if the starting value calculated from Equation 9 and/or Equation 10 is between the minimum value (e.g., $V_{ocp\_1}$) and the maximum value (e.g., $V_{ocp\_h}$). In yet another example, if the starting value calculated based on Equation 9 and/or Equation 10 is larger than the maximum value (e.g., $V_{ocp\_h}$), the over-current threshold signal 2512 (e.g., $V_{th\_oc}$) will start at the maximum value (e.g., $V_{ocp\_h}$), e.g., as shown by the waveform 1506 or the waveform 1508. In yet another example, $t_L \leq t_M \leq t_J \leq t_K$.

Figure 20B:
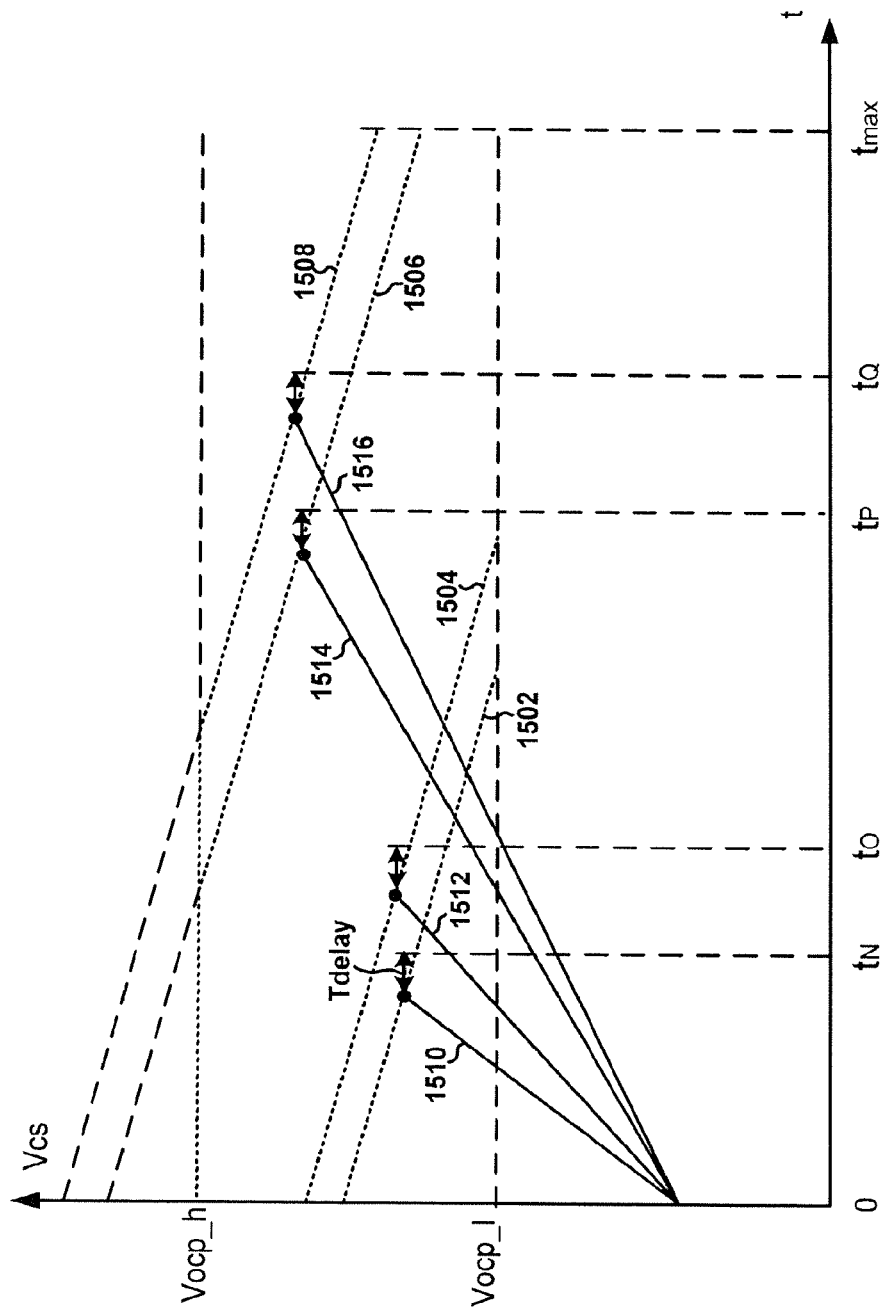
FIG. 20(b) is a simplified diagram showing the current sensing signal as shown in FIG. 12 as a function of time under different values for bulk voltage according to yet another embodiment of the present invention.

FIG. 20(b) is a simplified diagram showing determination of an on-time period using the over-current threshold signal 2512 as a function of time within a switching period as shown in FIG. 20(a) according to yet another embodiment of the present invention. This diagram is merely an example, which should not unduly limit the scope of the claims. One of ordinary skill in the art would recognize many variations, alternatives, and modifications. The waveforms 1510, 1512, 1514 and 1516 represent the current sensing signal 2514 (e.g., $V_{CS}$) as a function of time corresponding to the bulk voltages $V_{in9}$, $V_{in10}$, $V_{in11}$ and $V_{in12}$ respectively. For example, the slopes shown in the waveforms 1510, 1512, 1514 and 1516 are $S_9$, $S_{10}$, $S_{11}$, and $S_{12}$ respectively.

According to one embodiment, with respect to a particular bulk voltage, the current sensing signal 2514 (e.g., $V_{CS}$) increases with time, as shown by the waveforms 1510, 1512, 1514 and 1516. As shown in FIG. 20(b), the slope of the current sensing signal 2514 (e.g., $V_{CS}$) with respect to time increases with the bulk voltage, in some embodiments. For example, $V_{in9} > V_{in10} > V_{in11} > V_{in12}$, and correspondingly $S_9 > S_{10} > S_{11} > S_{12}$. In another example, when the current sensing signal 2514 (e.g., $V_{CS}$) exceeds in magnitude the over-current threshold signal 2512 (e.g., as shown by the waveform 1510, 1512, 1514 or 1516), the over-current protection is triggered. In yet another example, during $T_{delay}$ (e.g., the "delay to output"), the current sensing signal 2514 (e.g., $V_{CS}$) continues to increase in magnitude. In yet another example, at the end of $T_{delay}$, the switch is opened (e.g., turned off), and the current sensing signal 2514 (e.g., $V_{CS}$) reaches its maximum magnitude. The end of $T_{delay}$ is the end of an on-time period of the switch 2540 during a switching period (e.g., $T_{on}$), in some embodiments. For example, the end of $T_{delay}$ for the bulk voltage $V_{in9}$ corresponds to a time $t_N$, the end of $T_{delay}$ for the bulk voltage $V_{in10}$ corresponds to a time $t_O$, the end of $T_{delay}$ for the bulk voltage $V_{in11}$ corresponds to a time $t_P$, and the end of $T_{delay}$ for the bulk voltage $V_{in12}$ corresponds to a time $t_Q$.

Figure 21A:
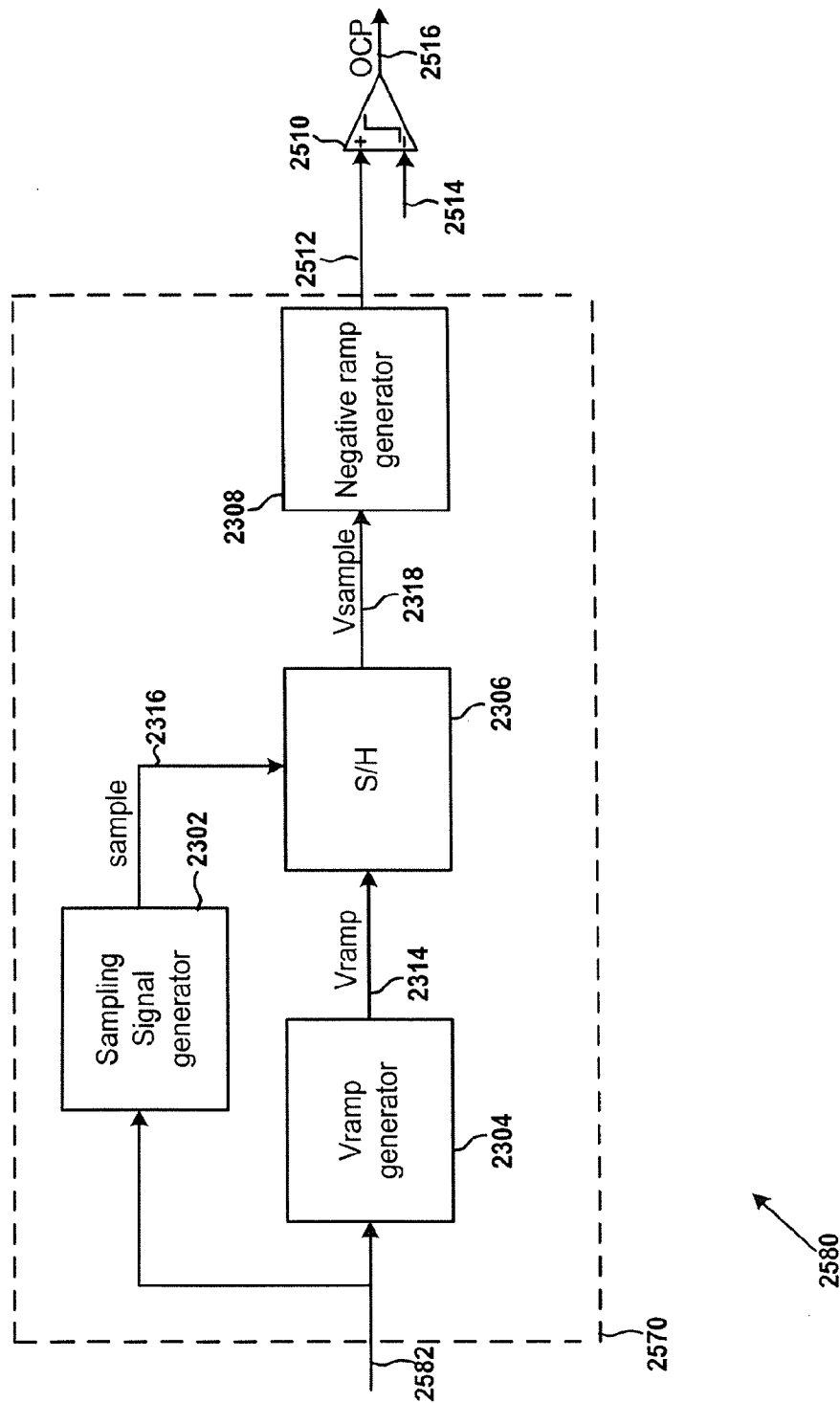
FIG. 21(a) is a simplified diagram showing certain components of the power converter as shown in FIG. 12 with over-current protection with over-current protection according to yet another embodiment of the present invention.

FIG. 21(a) is a simplified diagram showing certain components of the power converter 2500 with over-current protection with over-current protection according to yet another embodiment of the present invention. This diagram is merely an example, which should not unduly limit the scope of the claims. One of ordinary skill in the art would recognize many variations, alternatives, and modifications. The over-current-threshold signal generator 2570 includes a sampling signal generator 2302, a signal generator 2304, a sample-and-hold component 2306, and a negative-ramping-signal generator 2308.

For example, the sampling signal generator 2302, the signal generator 2304, and the sample-and-hold component 2306 are the same as the sampling signal generator 1602, the signal generator 1604, and the sample-and-hold component 1606, respectively. In another example, the sampling signal generator 2302, the signal generator 2304, the sample-and-hold component 2306 and the negative-ramping-signal generator 2308 are the same as the sampling signal generator 2102, the signal generator 2104, the sample-and-hold component 2106 and the negative-ramping-signal generator 2108, respectively. In yet another example, the over-current-protection scheme is implemented according to FIG. 20(a) and FIG. 20(b).

According to one embodiment, during a switching period, the signal generator 2304 receives the signal 2582 (e.g., the PWM signal 2522 or the gate drive signal 2584), and generates a ramping signal 2314 based on the duty cycle of the signal 2582 in the switching period. For example, the sampling signal generator 2302 receives the signal 2582, and generates a sampling signal 2316. In another example, the sampling signal generator 2302 outputs a pulse in the sampling signal 2316 upon a falling edge of the signal 2582. In yet another example, the sample-and-hold component 2306 samples the ramping signal 2314 during the pulse of the sampling signal 2316 and holds a magnitude of the ramping signal 2314 (e.g., at the end of the pulse) during the rest of the switching period until a next pulse. In yet another example, the negative-ramping-signal generator 2308 outputs the over-current threshold signal 2512 (e.g., $V_{th\_oc}$) to the comparator 2510. In yet another example, the comparator 2510 also receives the current sensing signal 2514 and outputs the over-current control signal 2516. In yet another example, the negative-ramping-signal generator 2308 introduces a negative-slope compensation to the over-current threshold signal 2512 (e.g., $V_{th\_oc}$) with respect to time.

In one embodiment, the ramping signal 2314 is associated with a ramp-up process and a ramp-down process. For example, during the ramp-up process, the ramping signal 2314 increases in magnitude from a minimum value to a maximum value, and during the ramp-down process, the ramping signal 2314 decreases in magnitude from the maximum value to the minimum value. In another example, the ramp-up process and/or the ramp-down process occurs instantaneously or during a time period. In another embodiment, the ramping signal 2314 is associated with a ramp-up process, a constant process and a ramp-down process. For example, during the ramp-up process, the ramping signal 2314 increases in magnitude from a minimum value to a maximum value; during the constant process, the ramping signal 2314 keeps at the maximum value; and during the ramp-down process, the ramping signal 2314 decreases in magnitude from the maximum value to the minimum value. In another example, the ramp-up process, the constant process, and/or the ramp-down process occurs instantaneously or during a time period. In yet another embodiment, the ramping signal 2314 is associated with a ramp-up process, a first constant process, a ramp-down process, and a second constant process. For example, during the ramp-up process, the ramping signal 2314 increases in magnitude from a minimum value to a maximum value, and during the first constant process, the ramping signal 2314 keeps at the maximum value. In another example, during the ramp-down process, the ramping signal 2314 decreases in magnitude from the maximum value to the minimum value, and during the second constant process, the ramping signal 2314 keeps at the minimum value. In yet another example, the ramp-up process, the first constant process, the ramp-down process and/or the second constant process occurs instantaneously or during a time period.

Figure 21B:
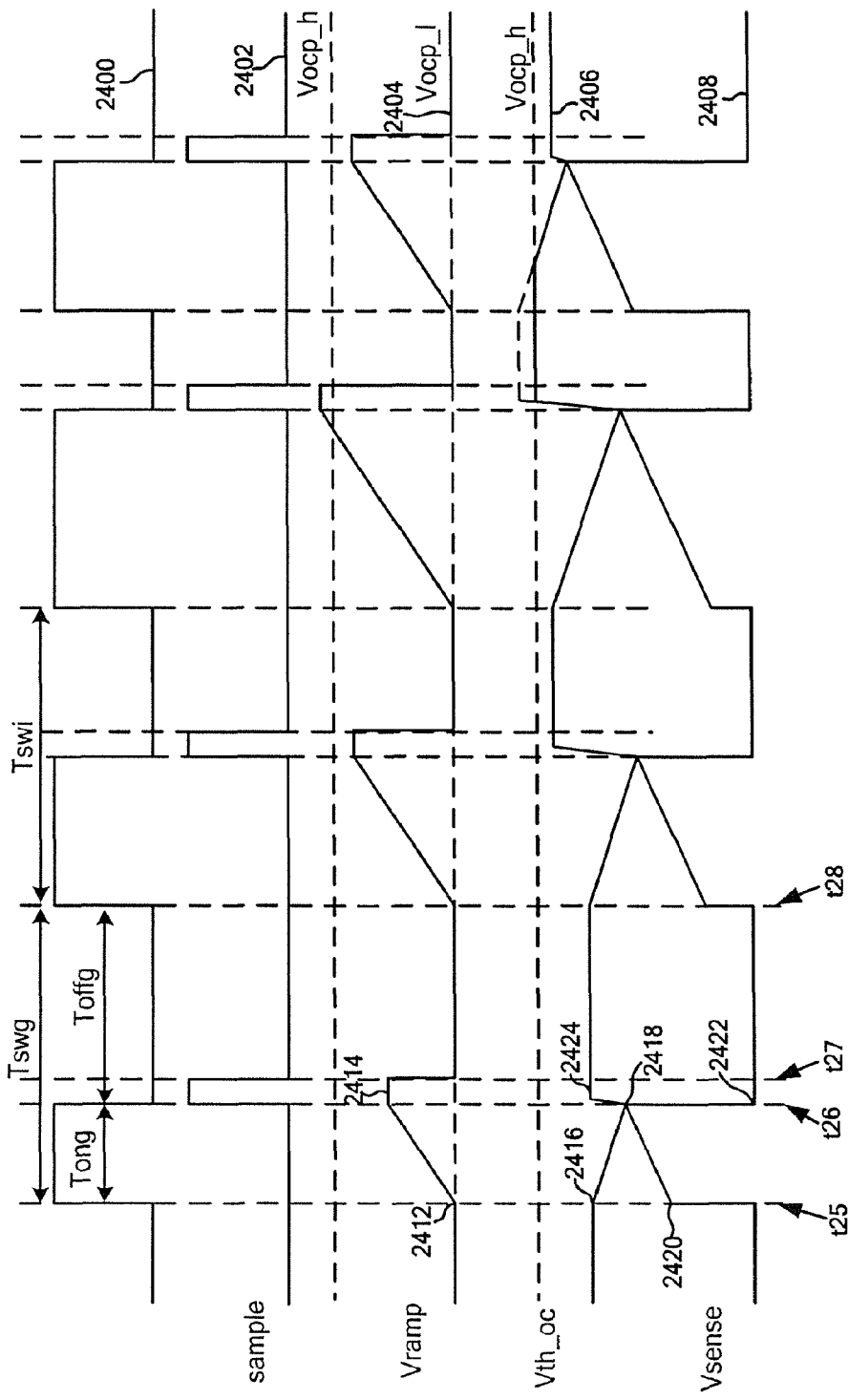
FIG. 21(b) is a simplified timing diagram for the power converter as shown in FIG. 21(a) according to yet another embodiment of the present invention.

FIG. 21(b) is a simplified timing diagram for the power converter 2500 including components as shown in FIG. 21(a) according to yet another embodiment of the present invention. This diagram is merely an example, which should not unduly limit the scope of the claims. One of ordinary skill in the art would recognize many variations, alternatives, and modifications. The waveform 2400 represents the signal 2582 as a function of time, the waveform 2402 represents the sampling signal 2316 as a function of time, and the waveform 2404 represents the ramping signal 2314 as a function of time. In addition, the waveform 2406 represents the over-current threshold signal 2512 (e.g., $V_{th\_oc}$) as a function of time and the waveform 2408 represents the current sensing signal 2514 as a function of time. For example, as shown in FIG. 21(b), a switching period $T_{swg}$ includes an on-time period $T_{ong}$ and an off-time period $T_{offg}$. The on-time period $T_{ong}$ starts at time $t_{25}$ and ends at time $t_{26}$, and the off-time period $T_{offg}$ starts at the time $t_{26}$ and ends at time $t_{28}$. In another example, $t_{25} \leq t_{26} \leq t_{27} \leq t_{28}$. In yet another example, the waveform 2406 represents the over-current threshold signal 2512 (e.g., $V_{th\_oc}$) as a function of time, which includes the over-current threshold signal 2512 (e.g., $V_{th\_oc}$) as a function of time within a switching period $T_{swg}$, and the over-current threshold signal 2512 (e.g., $V_{th\_oc}$) as a function of time within a switching period $T_{swi}$. In yet another example, the waveform 2408 represents the current sensing signal 2514 as a function of time, which includes the current sensing signal 2514 as a function of time within a switching period $T_{swg}$, and the current sensing signal 2514 as a function of time within a switching period $T_{swi}$.

According to one embodiment, during the on-time period $T_{ong}$, the signal 2582 keeps at a logic high level (e.g., as shown by the waveform 2400). For example, the ramping signal 2314 increases from a magnitude 2412 (e.g., at $t_{25}$) to a magnitude 2414 (e.g., at $t_{26}$), as shown by the waveform 2404. In yet another example, the over-current threshold signal 2512 (e.g., $V_{th\_oc}$) decreases from a magnitude 2416 (e.g., at $t_{25}$) to a magnitude 2418 (e.g., at $t_{26}$), as shown by the waveform 2406. That is, the negative-ramping-signal generator 2308 introduces a negative-slope compensation into the over-current threshold signal 2512 (e.g., $V_{th\_oc}$) throughout the on-time period $T_{ong}$, in some embodiments.

For example, the current sensing signal 2514 increases from a magnitude 2420 (e.g., at $t_{25}$), as shown by the waveform 2408. Once the current sensing signal 2514 exceeds the magnitude 2418 (e.g., at $t_{26}$), the over-current protection is triggered, in some embodiments. For example, the comparator 2310 changes the over-current control signal 2516 from a logic high level to a logic low level. In another example, then the current sensing signal 2514 decreases to a magnitude 2422 (e.g., 0 at $t_{26}$) and keeps at the magnitude 2422 during the off-time period $T_{offg}$ (e.g., as shown by the waveform 2408).

According to another embodiment, at a falling edge of the signal 2582 (e.g., at $t_{26}$), a pulse is generated in the sampling signal 2316 (e.g., as shown by the waveform 2402). For example, the pulse starts at the time $t_{26}$ and ends at the time $t_{27}$. In another example, the sample-and-hold component 2306 samples the ramping signal 2314 during the pulse and in response, the over-current threshold signal 2512 (e.g., $V_{th\_oc}$) changes from the magnitude 2418 (e.g., at $t_{26}$) to a magnitude 2424, as shown by the waveform 2406. In yet another example, the ramping signal 2314 keeps at the magnitude 2414 during the pulse, and decreases to the magnitude 2412 (e.g., $V_{ocp\_1}$) at the end of the pulse (e.g., at $t_{27}$), as shown by the waveform 2404. In yet another example, during the time period between $t_{27}$ and $t_{28}$, the ramping signal 2314 keeps at the magnitude 2412 (e.g., $V_{ocp\_1}$) as shown by the waveform 2404, and the over-current threshold signal 2512 (e.g., $V_{th\_oc}$) keeps at the magnitude 2424 as shown by the waveform 2406.

Figure 22A:
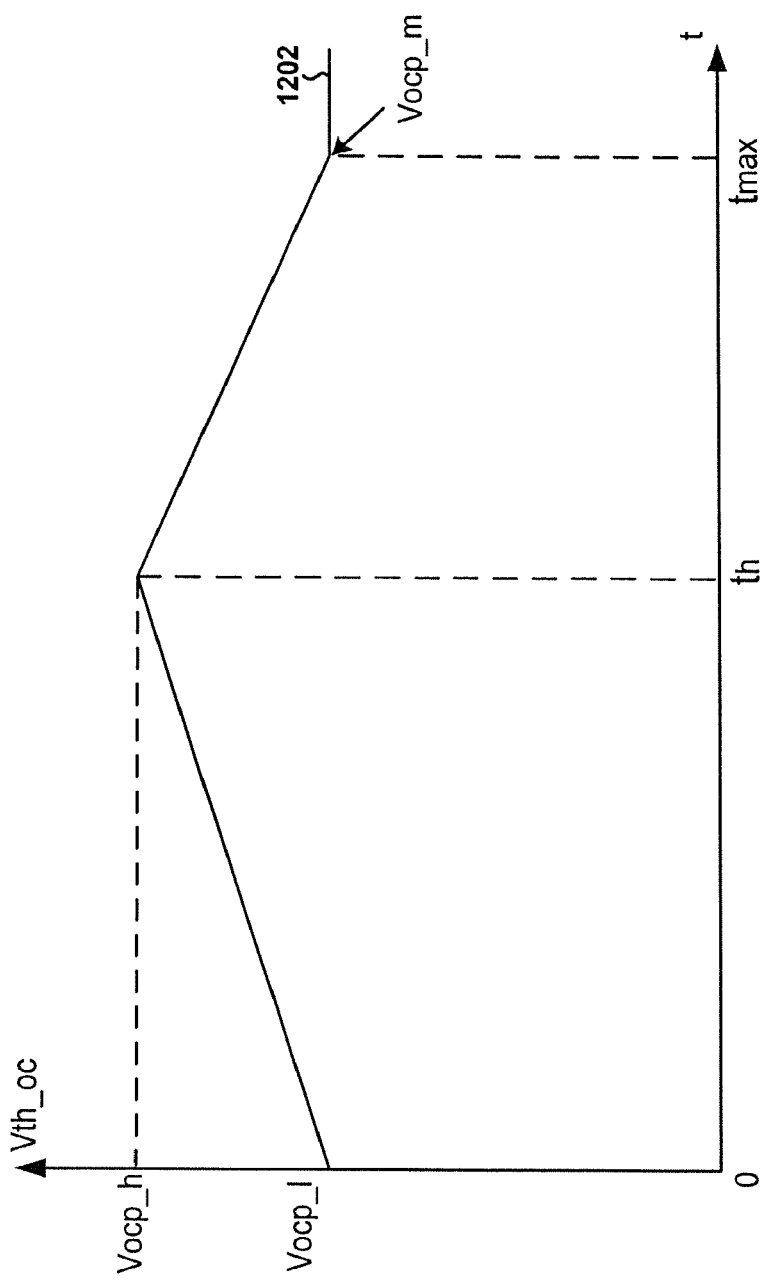
FIG. 22(a) is a simplified diagram showing the over-current threshold signal as shown in FIG. 12 as a function of time according to yet another embodiment of the present invention.
Figure 22B:
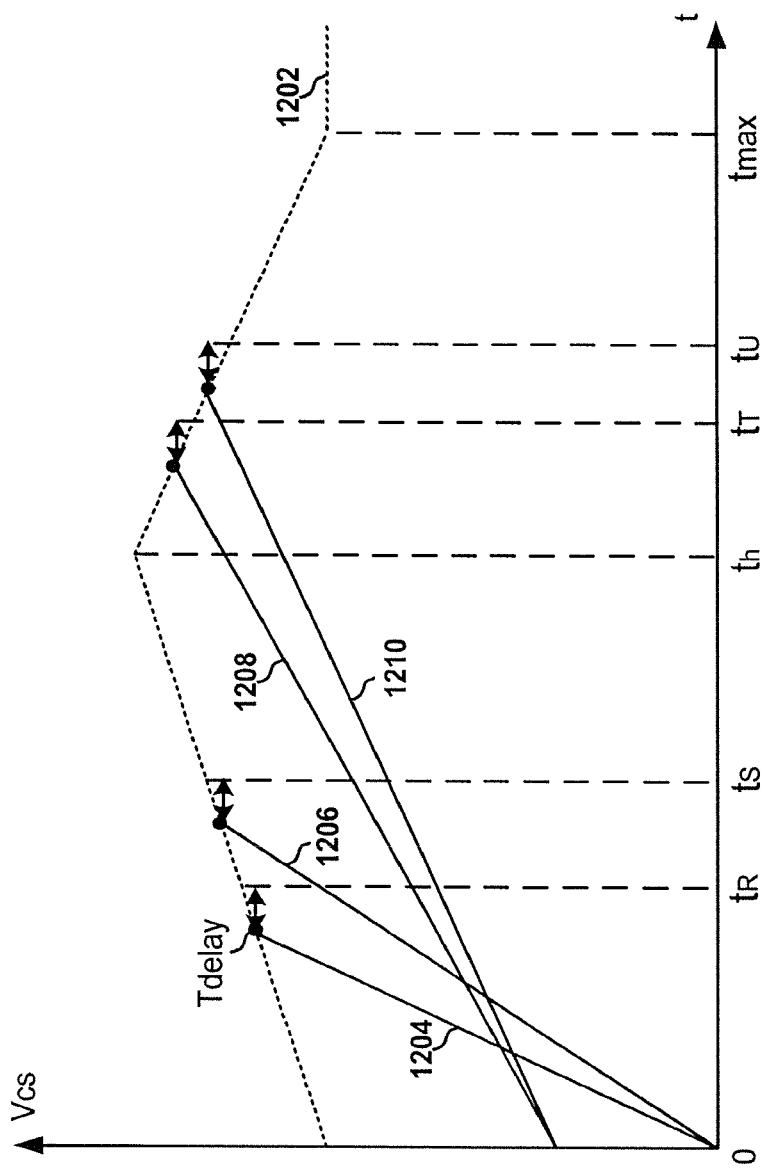
FIG. 22(b) is a simplified diagram showing the current sensing signal as shown in FIG. 12 as a function of time under different values for bulk voltage according to yet another embodiment of the present invention.

As shown in FIG. 22(a) and FIG. 22(b), negative-slope compensation is applied when the duty cycle of the signal 2582 exceeds a duty cycle threshold for reducing sub-harmonic oscillation in order to keep the maximum output power consistent for a wide range of bulk voltages, according to some embodiments.

FIG. 22(a) is a simplified diagram showing the over-current threshold signal 2512 as a function of time within a switching period according to yet another embodiment of the present invention. This diagram is merely an example, which should not unduly limit the scope of the claims. One of ordinary skill in the art would recognize many variations, alternatives, and modifications. The waveform 1202 represents the over-current threshold signal 2512 (e.g., $V_{th\_oc}$) as a function of time within an on-time period, where the time is measured from the beginning of the on-time period.

According to one embodiment, between 0 and a time threshold (e.g., $t_h$), a positive slope of the over-current threshold signal 2512 (e.g., $V_{th\_oc}$) with respect to time is properly chosen to compensate for the effects of "delay to output." For example, the over-current threshold signal 2512 (e.g., $V_{th\_oc}$) increases with time from a minimum value (e.g., $V_{ocp\_1}$ at 0) to a maximum value (e.g., $V_{ocp\_h}$ at the time threshold $t_h$), as shown by the waveform 1202. Between the time threshold (e.g., $t_h$) and a maximum time (e.g., $t_{max}$), a negative slope of the over-current threshold signal 2512 (e.g., $V_{th\_oc}$) with respect to time is properly chosen to compensate for the effects of "delay to output," in some embodiments. For example, the over-current threshold signal 2512 (e.g., $V_{th\_oc}$) decreases from the maximum value (e.g., $V_{ocp\_h}$ at the time threshold $t_h$) to a low value (e.g., $V_{ocp\_m}$ at the maximum time, $t_{max}$), as shown by the waveform 1202. In yet another example, $V_{ocp\_m} < V_{ocp\_h}$, and $V_{ocp\_1} < V_{ocp\_h}$. In yet another example, Vocp_m is smaller than, equal to, or larger than Vocp_1.

FIG. 22(b) is a simplified diagram showing determination of an on-time period using the over-current threshold signal 2512 as a function of time within a switching period as shown in FIG. 22(a) according to yet another embodiment of the present invention. This diagram is merely an example, which should not unduly limit the scope of the claims. One of ordinary skill in the art would recognize many variations, alternatives, and modifications. The waveforms 1204, 1206, 1208 and 1210 represent the current sensing signal 2514 (e.g., $V_{CS}$) as a function of time corresponding to bulk voltages $V_{in13}$, $V_{in14}$, $V_{in15}$ and $V_{in16}$ respectively. For example, the slopes shown in the waveforms 1204, 1206, 1208 and 1210 are $S_{13}$, $S_{14}$, $S_{15}$, and $S_{16}$ respectively.

According to one embodiment, with respect to a particular bulk voltage, the current sensing signal 2514 (e.g., $V_{CS}$) increases with time, as shown by the waveforms 1204, 1206, 1208 and 1210. As shown in FIG. 22 (b), the slope of the current sensing signal 2514 (e.g., $V_{CS}$) with respect to time increases with the bulk voltage, in some embodiments. For example, $V_{in13} > V_{in14} > V_{in15} > V_{in16}$, and correspondingly $S_{13} > S_{14} > S_{15} > S_{16}$. In another example, when the switch is closed (e.g., turned on), the current sensing signal 2514 (e.g., $V_{CS}$) increases with time in magnitude (e.g., as shown by the waveform 1202, 1204, 1206 or 1208). In yet another example, when the current sensing signal 2514 (e.g., $V_{CS}$) exceeds in magnitude the over-current threshold signal 2512 (e.g., as shown by the waveform 1202, 1204, 1206 or 1208), the over-current protection is triggered. In yet another example, during $T_{delay}$ (e.g., the "delay to output"), the current sensing signal 2514 (e.g., $V_{CS}$) continues to increase in magnitude. The end of $T_{delay}$ is the end of an on-time period of the switch 2540 during a switching period (e.g., $T_{on}$) which corresponds to a time, in some embodiments. For example, the end of $T_{delay}$ for the bulk voltages $V_{in13}$, $V_{in14}$, $V_{in15}$ and $V_{in16}$ correspond to the times, $t_R$, $t_S$, $t_T$ and $t_U$, respectively.

According to another embodiment, a system controller for protecting a power converter includes a signal generator a comparator, and a modulation and drive component. The signal generator is configured to generate a threshold signal. The comparator is configured to receive the threshold signal and a current sensing signal and generate a comparison signal based on at least information associated with the threshold signal and the current sensing signal, the current sensing signal indicating a magnitude of a primary current flowing through a primary winding of a power converter. The modulation and drive component is coupled to the signal generator and configured to receive at least the comparison signal, generate a drive signal based on at least information associated with the comparison signal, and output the drive signal to a switch in order to affect the primary current, the drive signal being associated with one or more first switching periods and a second switching period following the one or more first switching periods, the one or more first switching periods corresponding to one or more first duty cycles. The signal generator is further configured to, for the second switching period, determine a first threshold signal value based on at least information associated with the one or more first duty cycles, and generate the threshold signal equal to the determined first threshold signal value, the threshold signal being constant in magnitude as a function of time for the second switching period. For example, the system controller is implemented according to at least FIG. 13(a), FIG. 13(b), FIG. 14(a), FIG. 14(b), FIG. 14(c), FIG. 15(a), FIG. 15(b), FIG. 16(a), FIG. 16(b), and/or FIG. 17.

According to another embodiment, a system controller for protecting a power converter includes a signal generator, a comparator, and a modulation and drive component. The signal generator is configured to generate a threshold signal. The comparator is configured to receive the threshold signal and a current sensing signal and generate a comparison signal based on at least information associated with the threshold signal and the current sensing signal, the current sensing signal indicating a magnitude of a primary current flowing through a primary winding of a power converter. The modulation and drive component is coupled to the signal generator and configured to receive at least the comparison signal, generate a drive signal based on at least information associated with the comparison signal, and output the drive signal to a switch in order to affect the primary current, the drive signal being associated with one or more first switching periods and a second switching period following the one or more first switching periods, the one or more first switching periods corresponding to one or more first duty cycles, the second switching period including an on-time period and an off-time period. The signal generator is further configured to, for the second switching period, determine a first threshold signal value based on at least information associated with the one or more first duty cycles, set a time to zero at a beginning of the on-time period, if the time satisfies one or more first predetermined conditions, generate the threshold signal equal to the determined first threshold signal value so that the threshold signal is constant in magnitude as a function of the time, and if the time satisfies one or more second predetermined conditions, generate the threshold signal so that the threshold signal decreases with the increasing time in magnitude. For example, the system controller is implemented according to at least FIG. 18(a), FIG. 18(b), FIG. 19(a), and/or FIG. 19(b).

According to yet another embodiment, a system controller for protecting a power converter includes a signal generator, a comparator, and a modulation and drive component. The signal generator is configured to generate a threshold signal. The comparator is configured to receive the threshold signal and a current sensing signal and generate a comparison signal based on at least information associated with the threshold signal and the current sensing signal, the current sensing signal indicating a magnitude of a primary current flowing through a primary winding of a power converter. The modulation and drive component is coupled to the signal generator and configured to receive at least the comparison signal, generate a drive signal based on at least information associated with the comparison signal, and output the drive signal to a switch in order to affect the primary current, the drive signal being associated with one or more first switching periods and a second switching period following the one or more first switching periods, the one or more first switching periods corresponding to one or more first duty cycles, the second switching period including an on-time period and an off-time period. The signal generator is further configured to, for the second switching period, determine a first threshold signal value based on at least information associated with the one or more first duty cycles, set a time to zero at a beginning of the on-time period, and if the time satisfies one or more first predetermined conditions, generate the threshold signal so that the threshold signal decreases, from the determined first threshold signal value, with the increasing time in magnitude. For example, the system controller is implemented according to at least FIG. 20(a), FIG. 20(b), FIG. 21(a), and/or FIG. 21(b).

According to yet another embodiment, a system controller for protecting a power converter includes a signal generator, a comparator, and a modulation and drive component. The signal generator is configured to generate a threshold signal.

The comparator is configured to receive the threshold signal and a current sensing signal and generate a comparison signal based on at least information associated with the threshold signal and the current sensing signal, the current sensing signal indicating a magnitude of a primary current flowing through a primary winding of a power converter. The modulation and drive component is coupled to the signal generator and configured to receive at least the comparison signal, generate a drive signal based on at least information associated with the comparison signal, and output the drive signal to a switch in order to affect the primary current, the drive signal being associated with a plurality of switching periods, each of the plurality of switching periods including an on-time period and an off-time period. The signal generator is further configured to, for each of the plurality of switching periods, set a time to zero at a beginning of the on-time period, if the time satisfies one or more first predetermined conditions, generate the threshold signal so that the threshold signal increases with the increasing time in magnitude, and if the time satisfies one or more second predetermined conditions, generate the threshold signal so that the threshold signal decreases with the increasing time in magnitude. For example, the system controller is implemented according to at least FIG. 22(a), and/or FIG. 22(b).

According to yet another embodiment, a signal generator for protecting a power converter includes a modulation and drive component, a ramping-signal generator, a sampling-signal generator, and a sample-and-hold component. The modulation and drive component is configured to generate a modulation signal to output a drive signal to a switch in order to affect a primary current flowing through a primary winding of a power converter. The ramping-signal generator is configured to receive the modulation signal and generate a ramping signal based on at least information associated with the modulation signal. The sampling-signal generator is configured to receive the modulation signal and generate a sampling signal including a pulse in response to a falling edge of the modulation signal. The sample-and-hold component is configured to receive the sampling signal and the ramping signal and output a sampled-and-held signal associated with a magnitude of the ramping signal corresponding to the pulse of the sampling signal. For example, the signal generator is implemented according to at least FIG. 14(a), FIG. 14(c), FIG. 16(a), FIG. 19(a), and/or FIG. 21(a).

According to yet another embodiment, a signal generator for protecting a power converter includes a modulation and drive component, a ramping-signal generator, a sample-and-hold component, a filter-signal generator, and a low-pass filter. The modulation and drive component is configured to generate a modulation signal to output a drive signal to a switch in order to affect a primary current flowing through a primary winding of a power converter. The ramping-signal generator is configured to receive the modulation signal and generate a ramping signal based on at least information associated with the modulation signal. The sample-and-hold component is configured to receive the ramping signal and the modulation signal and output a sampled-and-held signal associated with a magnitude of the ramping signal in response to the modulation signal. The filter-signal generator is configured to receive the modulation signal and generate a filter signal based on at least information associated with the modulation signal. The low-pass filter is configured to receive the filter signal and the sampled-and-held signal and, in response to the filter signal, generate a first signal based on at least information associated with the sampled-and-held signal. For example, the signal generator is implemented according to at least FIG. 15(a), FIG. 15(b), and/or FIG. 17.

In one embodiment, a method for protecting a power converter includes, generating a threshold signal, receiving the threshold signal and a current sensing signal, the current sensing signal indicating a magnitude of a primary current flowing through a primary winding of a power converter, and generating a comparison signal based on at least information associated with the threshold signal and the current sensing signal. In addition, the method includes receiving at least the comparison signal, generating a drive signal based on at least information associated with the comparison signal, the drive signal being associated with one or more first switching periods and a second switching period following the one or more first switching periods, the one or more first switching periods corresponding to one or more duty cycles, and outputting the drive signal to a switch in order to affect the primary current. The process for generating a threshold signal includes, for the second switching period, determining a threshold signal value based on at least information associated with the one or more duty cycles; and generating the threshold signal equal to the determined threshold signal value, the threshold signal being constant in magnitude as a function of time for the second switching period. For example, the method is implemented according to at least FIG. 13(a), FIG. 13(b), FIG. 14(a), FIG. 14(b), FIG. 14(c), FIG. 15(a), FIG. 15(b), FIG. 16(a), FIG. 16(b), and/or FIG. 17.

In another embodiment, a method for protecting a power converter includes, generating a threshold signal, receiving the threshold signal and a current sensing signal, the current sensing signal indicating a magnitude of a primary current flowing through a primary winding of a power converter, and generating a comparison signal based on at least information associated with the threshold signal and the current sensing signal. The method further includes receiving at least the comparison signal, generating a drive signal based on at least information associated with the comparison signal, the drive signal being associated with one or more first switching periods and a second switching period following the one or more first switching periods, the one or more first switching periods corresponding to one or more duty cycles, the second switching period including an on-time period and an off-time period, and outputting the drive signal to a switch in order to affect the primary current. The process for generating a threshold signal includes, for the second switching period, determining a threshold signal value based on at least information associated with the one or more duty cycles, setting a time to zero at a beginning of the on-time period, if the time satisfies one or more first predetermined conditions, generating the threshold signal equal to the determined threshold signal value so that the threshold signal is constant in magnitude as a function of the time, and if the time satisfies one or more second predetermined conditions, generating the threshold signal so that the threshold signal decreases with the increasing time in magnitude. For example, the method is implemented according to at least FIG. 18(a), FIG. 18(b), FIG. 19(a), and/or FIG. 19(b).

In yet another embodiment, a method for protecting a power converter includes, generating a threshold signal, receiving the threshold signal and a current sensing signal, the current sensing signal indicating a magnitude of a primary current flowing through a primary winding of a power converter, and generating a comparison signal based on at least information associated with the threshold signal and the current sensing signal. The method further includes, receiving at least the comparison signal, generating a drive signal based on at least information associated with the comparison signal, the drive signal being associated with one or more first switching periods and a second switching period following the one or more first switching periods, the one or more first switching periods corresponding to one or more duty cycles, the second switching period including an on-time period and an off-time period, and outputting the drive signal to a switch in order to affect the primary current. The process for generating a threshold signal includes, for the second switching period, determining a threshold signal value based on at least information associated with the one or more duty cycles, setting a time to zero at a beginning of the on-time period, and if the time satisfies one or more predetermined conditions, generating the threshold signal so that the threshold signal decreases, from the determined threshold signal value, with the increasing time in magnitude. For example, the method is implemented according to at least FIG. 20(a), FIG. 20(b), FIG. 21(a), and/or FIG. 21(b).

In yet another embodiment, a method for protecting a power converter includes, generating a threshold signal, receiving the threshold signal and a current sensing signal, the current sensing signal indicating a magnitude of a primary current flowing through a primary winding of a power converter, and generating a comparison signal based on at least information associated with the threshold signal and the current sensing signal. The method further includes, receiving at least the comparison signal, generating a drive signal based on at least information associated with the comparison signal, the drive signal being associated with a plurality of switching periods, each of the plurality of switching periods including an on-time period and an off-time period, and outputting the drive signal to a switch in order to affect the primary current. The process for generating a threshold signal includes, for each of the plurality of switching periods, setting a time to zero at a beginning of the on-time period, if the time satisfies one or more first predetermined conditions, generating the threshold signal so that the threshold signal increases with the increasing time in magnitude, and if the time satisfies one or more second predetermined conditions, generating the threshold signal so that the threshold signal decreases with the increasing time in magnitude. For example, the method is implemented according to at least FIG. 22(a), and/or FIG. 22(b).

In yet another embodiment, a method for generating a signal for protecting a power converter includes, generating a modulation signal to output a drive signal to a switch in order to affect a primary current flowing through a primary winding of a power converter, receiving the modulation signal, and processing information associated with the modulation signal. The method further includes, generating a ramping signal based on at least information associated with the modulation signal, generating a sampling signal including a pulse in response to a falling edge of the modulation signal, receiving the sampling signal and the ramping signal, and outputting a sampled-and-held signal associated with a magnitude of the ramping signal corresponding to the pulse of the sampling signal. For example, the method is implemented according to at least FIG. 14(a), FIG. 14(c), FIG. 16(a), FIG. 19(a), and/or FIG. 21(a).

In yet another embodiment, a method for generating a signal for protecting a power converter includes, generating a modulation signal to output a drive signal to a switch in order to affect a primary current flowing through a primary winding of a power converter, receiving the modulation signal, and processing information associated with the modulation signal. The method further includes, generating a ramping signal based on at least information associated with the modulation signal, generating a filter signal based on at least information associated with the modulation signal, and receiving the ramping signal and the modulation signal. In addition, the method includes, outputting a sampled-and-held signal associated with a magnitude of the ramping signal in response to the modulation signal, receiving the filter signal and the sampled-and-held signal, and generating, in response to the filter signal, a first signal based on at least information associated with the sampled-and-held signal. For example, the method is implemented according to at least FIG. 15(a), FIG. 15(b), and/or FIG. 17.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for protecting a power converter, the system controller comprising:
   a signal generator configured to generate a threshold signal;
   a comparator configured to receive the threshold signal and a current sensing signal and generate a comparison signal based on at least information associated with the threshold signal and the current sensing signal, the current sensing signal indicating a magnitude of a primary current flowing through a primary winding of a power converter; and
   a modulation and drive component coupled to the signal generator and configured to receive at least the comparison signal, generate a drive signal based on at least information associated with the comparison signal, and output the drive signal to a switch in order to affect the primary current, the drive signal being associated with one or more first switching periods and a second switching period following the one or more first switching periods, the one or more first switching periods corresponding to one or more first duty cycles, the second switching period including an on-time period and an off-time period;
   wherein the signal generator is further configured to, for the second switching period,
      determine a first threshold signal value based on at least information associated with the one or more first duty cycles;
      set a time to zero at a beginning of the on-time period;
      if the time satisfies one or more first predetermined conditions, generate the threshold signal equal to the determined first threshold signal value so that the threshold signal is constant in magnitude as a function of the time; and if the time satisfies one or more second predetermined conditions, generate the threshold signal so that the threshold signal decreases with the increasing time in magnitude.

2. The system controller of claim 1 wherein, for the second switching period, if the time is smaller than a first predetermined value, the time satisfies one or more first predetermined conditions.

3. The system controller of claim 1 wherein, for the second switching period, if the time is larger than the first predetermined value and smaller than a second predetermined value, the time satisfies one or more second predetermined conditions.

4. The system controller of claim 1 wherein the signal generator is further configured to, for the second switching period, if the time satisfies one or more third predetermined conditions, generate the threshold signal equal to a second threshold signal value so that the threshold signal is constant in magnitude as a function of the time, the second threshold signal value being smaller than the first threshold signal value.

5. The system controller of claim 4 wherein, for the second switching period, if the time is larger than the second predetermined value, the time satisfies one or more third predetermined conditions.

6. The system controller of claim 1 wherein:
the drive signal is further associated with a third switching period following the one or more first switching periods and the second switching period, the second switching period corresponding to a second duty cycle, the third switching period including a second on-time period and a second off-time period;
wherein the signal generator is further configured to, for the third switching period,
determine a second threshold signal value based on at least information associated with the second duty cycle;
set the time to zero at a beginning of the second on-time period;
if the time satisfies the one or more first predetermined conditions, generate the threshold signal equal to the determined second threshold signal value so that the threshold signal is constant in magnitude as a function of the time; and
if the time satisfies the one or more second predetermined conditions, generate the threshold signal so that the threshold signal decreases with the increasing time in magnitude.

7. The system controller of claim 6 wherein the second threshold signal value is equal to the first threshold signal value.

8. The system controller of claim 6 wherein the second threshold signal value is different from the first threshold signal value.

9. A system controller for protecting a power converter, the system controller comprising:
a signal generator configured to generate a threshold signal;
a comparator configured to receive the threshold signal and a current sensing signal and generate a comparison signal based on at least information associated with the threshold signal and the current sensing signal, the current sensing signal indicating a magnitude of a primary current flowing through a primary winding of a power converter; and
a modulation and drive component coupled to the signal generator and configured to receive at least the comparison signal, generate a drive signal based on at least information associated with the comparison signal, and output the drive signal to a switch in order to affect the primary current, the drive signal being associated with one or more first switching periods and a second switching period following the one or more first switching periods, the one or more first switching periods corresponding to one or more first duty cycles, the second switching period including an on-time period and an off-time period;
wherein the signal generator is further configured to, for the second switching period,
determine a first threshold signal value based on at least information associated with the one or more first duty cycles;
set a time to zero at a beginning of the on-time period; and
if the time satisfies one or more first predetermined conditions, generate the threshold signal so that the threshold signal decreases, from the determined first threshold signal value, with the increasing time in magnitude.

10. The system controller of claim 9 wherein, for the second switching period, if the time is smaller than a first predetermined value, the time satisfies one or more first predetermined conditions.

11. The system controller of claim 10 wherein the signal generator is further configured to, for the second switching period, if the time satisfies one or more second predetermined conditions, generate the threshold signal equal to a second threshold signal value so that the threshold signal is constant in magnitude as a function of the time, the second threshold signal value being smaller than the first threshold signal value.

12. The system controller of claim 11 wherein, for the second switching period, if the time is larger than the first predetermined value, the time satisfies one or more second predetermined conditions.

13. The system controller of claim 9 wherein:
the drive signal is further associated with a third switching period following the one or more first switching periods and the second switching period, the second switching period corresponding to a second duty cycle, the third switching period including a second on-time period and a second off-time period;
wherein the signal generator is further configured to, for the third switching period,
determine a second threshold signal value based on at least information associated with the second duty cycle; and
set the time to zero at a beginning of the second on-time period; and
if the time satisfies the one or more first predetermined conditions, generate the threshold signal so that the threshold signal decreases, from the determined second threshold signal value, with the increasing time in magnitude.

14. The system controller of claim 13 wherein the second threshold signal value is equal to the first threshold signal value.

15. The system controller of claim 13 wherein the second threshold signal value is different from the first threshold signal value.

16. A system controller for protecting a power converter, the system controller comprising:
 a signal generator configured to generate a threshold signal;
 a comparator configured to receive the threshold signal and a current sensing signal and generate a comparison signal based on at least information associated with the threshold signal and the current sensing signal, the current sensing signal indicating a magnitude of a primary current flowing through a primary winding of a power converter; and
 a modulation and drive component coupled to the signal generator and configured to receive at least the comparison signal, generate a drive signal based on at least information associated with the comparison signal, and output the drive signal to a switch in order to affect the primary current, the drive signal being associated with a plurality of switching periods, each of the plurality of switching periods including an on-time period and an off-time period;
 wherein the signal generator is further configured to, for each of the plurality of switching periods,
  set a time to zero at a beginning of the on-time period;
  if the time satisfies one or more first predetermined conditions, generate the threshold signal so that the threshold signal increases with the increasing time in magnitude; and
  if the time satisfies one or more second predetermined conditions, generate the threshold signal so that the threshold signal decreases with the increasing time in magnitude.

17. The system controller of claim 16 wherein the signal generator is further configured to, for each of the plurality of switching periods, if the time is smaller than a first predetermined value and larger than a second predetermined value, generate the threshold signal so that the threshold signal decreases with the increasing time in magnitude.

18. The system controller of claim 17 wherein the signal generator is further configured to, for each of the plurality of switching periods, if the time is smaller than the first predetermined value and larger than the second predetermined value, generate the threshold signal so that the threshold signal decreases linearly with the increasing time in magnitude.

19. The system controller of claim 17 wherein the signal generator is further configured to, for each of the plurality of switching periods, if the time is smaller than the second predetermined value and larger than a third predetermined value, generate the threshold signal so that the threshold signal increases with the increasing time in magnitude.

20. The system controller of claim 19 wherein the signal generator is further configured to, for each of the plurality of switching periods, if the time is smaller than the second predetermined value and larger than the third predetermined value, generate the threshold signal so that the threshold signal increases linearly with the increasing time in magnitude.

21. The system controller of claim 19 wherein the third predetermined value is equal to zero.

22. A method for protecting a power converter, the method comprising:
 generating a threshold signal;
 receiving the threshold signal and a current sensing signal, the current sensing signal indicating a magnitude of a primary current flowing through a primary winding of a power converter;
 generating a comparison signal based on at least information associated with the threshold signal and the current sensing signal;
 receiving at least the comparison signal;
 generating a drive signal based on at least information associated with the comparison signal, the drive signal being associated with one or more first switching periods and a second switching period following the one or more first switching periods, the one or more first switching periods corresponding to one or more duty cycles, the second switching period including an on-time period and an off-time period; and
 outputting the drive signal to a switch in order to affect the primary current;
 wherein the process for generating a threshold signal includes, for the second switching period,
  determining a threshold signal value based on at least information associated with the one or more duty cycles;
  setting a time to zero at a beginning of the on-time period;
  if the time satisfies one or more first predetermined conditions, generating the threshold signal equal to the determined threshold signal value so that the threshold signal is constant in magnitude as a function of the time; and
  if the time satisfies one or more second predetermined conditions, generating the threshold signal so that the threshold signal decreases with the increasing time in magnitude.

23. A method for protecting a power converter, the method comprising:
 generating a threshold signal;
 receiving the threshold signal and a current sensing signal, the current sensing signal indicating a magnitude of a primary current flowing through a primary winding of a power converter;
 generating a comparison signal based on at least information associated with the threshold signal and the current sensing signal;
 receiving at least the comparison signal;
 generating a drive signal based on at least information associated with the comparison signal, the drive signal being associated with one or more first switching periods and a second switching period following the one or more first switching periods, the one or more first switching periods corresponding to one or more duty cycles, the second switching period including an on-time period and an off-time period; and
 outputting the drive signal to a switch in order to affect the primary current;
 wherein the process for generating a threshold signal includes, for the second switching period,
  determining a threshold signal value based on at least information associated with the one or more duty cycles;
  setting a time to zero at a beginning of the on-time period; and
  if the time satisfies one or more predetermined conditions, generating the threshold signal so that the threshold signal decreases, from the determined threshold signal value, with the increasing time in magnitude.

24. A method for protecting a power converter, the method comprising:
- generating a threshold signal;
- receiving the threshold signal and a current sensing signal, the current sensing signal indicating a magnitude of a primary current flowing through a primary winding of a power converter;
- generating a comparison signal based on at least information associated with the threshold signal and the current sensing signal;
- receiving at least the comparison signal;
- generating a drive signal based on at least information associated with the comparison signal, the drive signal being associated with a plurality of switching periods, each of the plurality of switching periods including an on-time period and an off-time period; and
- outputting the drive signal to a switch in order to affect the primary current;
- wherein the process for generating a threshold signal includes, for each of the plurality of switching periods,
    - setting a time to zero at a beginning of the on-time period;
    - if the time satisfies one or more first predetermined conditions, generating the threshold signal so that the threshold signal increases with the increasing time in magnitude; and
    - if the time satisfies one or more second predetermined conditions, generating the threshold signal so that the threshold signal decreases with the increasing time in magnitude.

* * * * *